United States Patent
Negishi et al.

(10) Patent No.: US 6,613,253 B1
(45) Date of Patent: Sep. 2, 2003

(54) DEFORMATION CORRECTING METHOD, CUTTING METHOD, DEFORMATION CORRECTING APPARATUS AND CUTTING APPARATUS FOR SHEET MATERIALS

(75) Inventors: Yoshihisa Negishi, Minamiashigara (JP); Takayoshi Oyamada, Minamiashigara (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 232 days.

(21) Appl. No.: 09/676,667

(22) Filed: Oct. 2, 2000

(30) Foreign Application Priority Data

| Oct. 1, 1999 | (JP) | 11-282190 |
|---|---|---|
| Feb. 14, 2000 | (JP) | 2000-035479 |
| Feb. 21, 2000 | (JP) | 2000-043497 |
| Mar. 21, 2000 | (JP) | 2000-078901 |
| Mar. 30, 2000 | (JP) | 2000-093618 |
| Mar. 31, 2000 | (JP) | 2000-099577 |
| Sep. 4, 2000 | (JP) | 2000-267836 |

(51) Int. Cl.$^7$ .......................... B29C 53/18; B29C 53/84
(52) U.S. Cl. ................ 264/40.1; 264/40.6; 264/345; 264/348; 425/135; 425/143; 425/363; 425/384; 425/446
(58) Field of Search ............... 264/40.1, 40.6, 264/345, 348; 425/135, 143, 363, 384, 446

(56) References Cited

U.S. PATENT DOCUMENTS

| 3,939,000 A | 2/1976 | Arvidson, Jr. et al. |
| 4,141,735 A | 2/1979 | Schrader et al. |
| 4,660,964 A | 4/1987 | Yoshikawa et al. |
| 5,325,144 A | 6/1994 | Yoshikawa et al. |
| 5,861,083 A | 1/1999 | Klockenkemper et al. |
| 5,876,827 A | 3/1999 | Fink et al. |

FOREIGN PATENT DOCUMENTS

| EP | 0 679 947 A1 | 11/1995 |
| EP | 08-142209 A | 6/1996 |
| EP | 0 887 701 A1 | 12/1998 |
| EP | 0 962 812 A1 | 12/1999 |
| JP | 51-16358 | 2/1976 |
| JP | 60-002559 A | 1/1985 |
| JP | 62-031653 | 2/1987 |
| JP | 06-064808 A | 3/1994 |
| JP | 11-15105 | 1/1999 |

OTHER PUBLICATIONS

Japanese Abstract No. 09085680, dated Mar. 31, 1997.
Japanese Abstract No. 06064145 dated Mar. 8, 1994.
Patent Abstract of Japan, 62031653, 02/87.
Patent Abstract of Japan, 60002559 A, 01/85.
Patent Abstract of Japan, 06064808 A, 03/94.
Patent Abstract of Japan, 08142209 A, 06/96.

*Primary Examiner*—Leo B. Tentoni
(74) *Attorney, Agent, or Firm*—Sughrue Mion, PLLC

(57) ABSTRACT

A decurl apparatus includes a heating device to heat an image recording carrier web at a constant temperature, which exceeds the glass transition temperature of a support for a constant time period; and a cooling device for subsequent cooling of the image recording carrier web to a temperature equal to or lower than the glass transition temperature, while the image recording carrier web maintains a predetermined shape. The heating device includes an induction-heated heating roller and holding rollers arranged at arbitrary angular positions with respect to the outer circumference of the heating roller. As a result, the image recording carrier web is reliably decurled by a simple construction without being influenced by a transfer velocity or the like.

47 Claims, 65 Drawing Sheets

[DSC MEASUREMENT]

FIG. 8

[DRY X-RAY FILM]

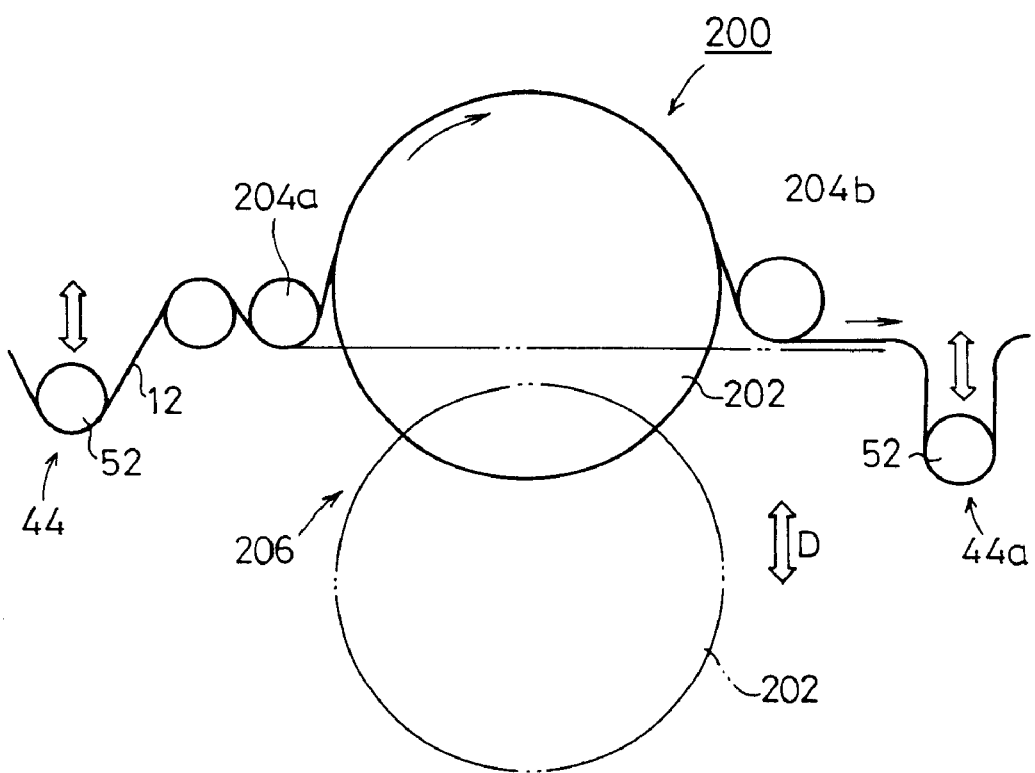
F I G.15

F I G. 16
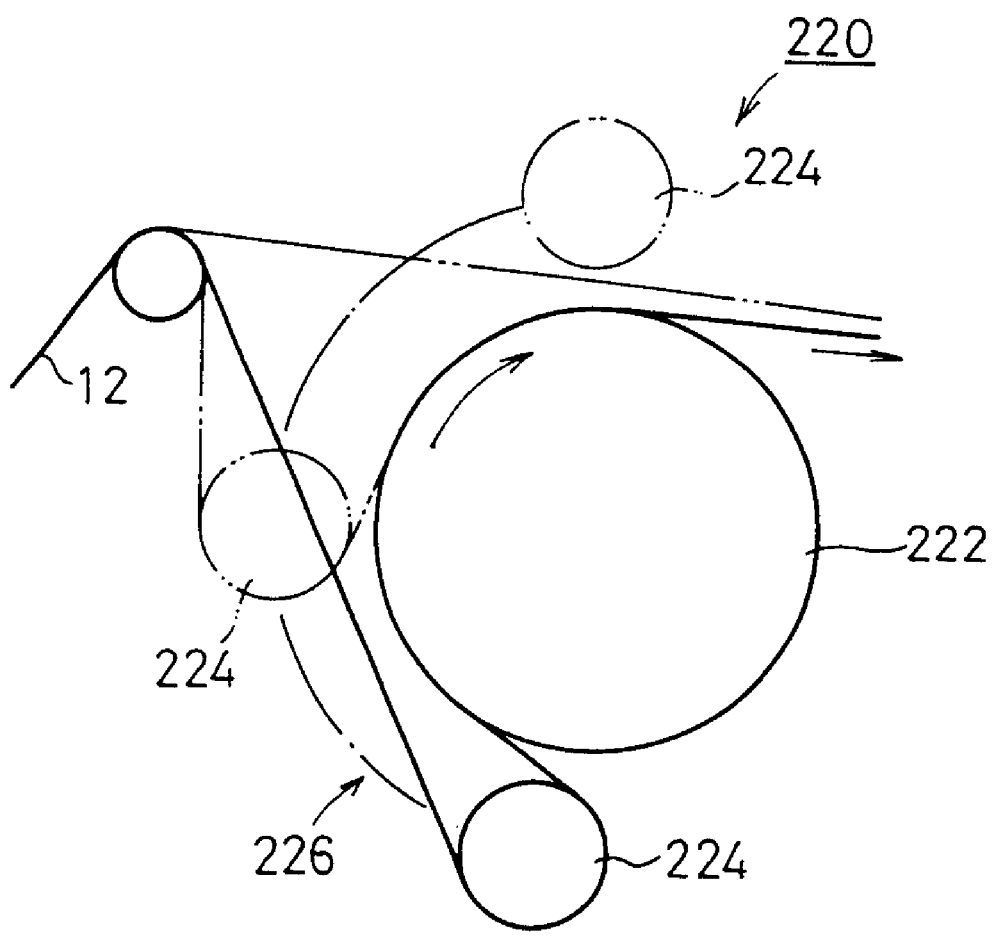

FIG. 26

| TYPES OF SENSITIZED MATERIALS | KINDS | HEATING TEMPERATURE (°C) | HEATING TIME (SECS.) |
|---|---|---|---|
| DRY | THIRST | 92 | 0.7 |
| WET, SINGLE | CR9 | 92 | 0.5 |
| WET, DOUBLE | REX | 87 | 1.0 |

DEFORMATION CORRECTING METHOD, CUTTING METHOD, DEFORMATION CORRECTING APPARATUS AND CUTTING APPARATUS FOR SHEET MATERIALS

BACKGROUND OF THE INVENTION

1. Field of the Invention

The present invention relates to sheet material deformation correcting method, cutting method, deformation correcting apparatus and cutting apparatus for correcting a deformation such as a curl of a rolled sheet material and for cutting the rolled sheet material.

2. Description of the Related Art

Generally, the various image recording carriers (or sheet materials) such as photographic photosensitive material, heat-sensitive sheets of paper or pressure-sensitive sheets of paper having polymer supports (or polymer sheet materials) are formed, for example, by applying a recording layer (or photographic emulsion layer) to the support. This support is made of polyethylene terephthalate (PET), polyethylene naphthalate (PEN) or polyethylene laminate paper, a triacetate cellulose film, a polyester film, or the like.

The aforementioned image recording carrier or paper material is usually manufactured as a web and is employed as a rolled film. Therefore, the image recording carrier is aged by the rolled state to curl the support so that this curled state is left in the image recording carrier after the carrier is cut to sheets. This raises a problem that the transferability and stackability of the image recording carrier sheets are seriously deteriorated. When the image recording carrier sheet is treated by various machines such as a developer or printer, moreover, its transfer or image formation is so troubled that it cannot be subjected to a desired treatment. As the case may be, the existence of the curl after the image formation may cause a problem in the quality.

In order to eliminate the curl of this kind, therefore, there have been made a variety of proposals. In Japanese laid-open patent publication No. 51-16358 (as will be called the "Prior Art 1"), there is disclosed a method, by which the polymer film is heated for 0.1 to 1,500 hrs. within a temperature range lower by 30 to 5° C. than the middle point of the glass transition temperature range of the film or the glass transition temperature (Tg) relating to the endothermic maximum.

In Japanese laid-open patent publication No. 62-31653 (as will be called the "Prior Art 2"), on the other hand, there is disclosed a decurl method, by which a rolled photographic photosensitive material is heated and then cooled. Specifically, the photographic photosensitive material is heated at a heating temperature of its melting point or lower (50 to 100° C.) for 2 to 20 secs. and is then cooled down at a temperature lower by 15° C. or more than that heating temperature.

In the aforementioned Prior Art 1, however, the polymer film is heated at the temperature lower than 30 to 5° C. than its Tg. For the practical decurl operation, it takes a considerably long heating time. As a result, the decurl treatment is not efficient to cause problems that the stock loss of the film occurs, and that the facilities become large-sized. Still the worse, the elongated heating time may deteriorate the image characteristics of the recording layer.

In the aforementioned Prior Art 2, on the other hand, the heating temperature rises to a considerably high level. If the heating treatment for the time period as long as 2 to 20 secs. is performed at such high temperature, the image recording layer is affected to raise a problem that the image characteristics are seriously deteriorated. Moreover, though the cooling temperature is defined relative to the heating temperature, the photosensitive material may be cooled at a temperature higher than the glass transition temperature of the support. As a result, the photosensitive material is frequently curled by the handling after the cooling treatment.

In the Prior Art 2, moreover, the heating conditions are individually set according to the materials of the supports so that the recording layer of the photographic photosensitive material cannot be properly matched when it has a different kind. If the kind of the recording layer is different, specifically, the heat resistance is different. Depending upon the kind, therefore, there is pointed out a problem that the quality is troubled by the thermal fogging, the color tone fluctuation, the crack, or the like. According to the change in the processing rate, moreover, the heating conditions may change to make the calorie short or excessive. Thus, there are various problems that the desired decurl effect cannot be obtained, and that the quality is degraded.

For example, in Japanese laid-open patent publication No. 60-2559 (as will be called the "Prior Art 3"), on the other hand, there is disclosed a roll paper decurl apparatus which includes: a correcting member for bending the roll paper rolled on a core, backward of its rolling direction; and heating means for heating the roll paper bent by the correcting member. This heating means is equipped with a fan to be driven by a motor, and a heater for heating the air blown from the fan. On the basis of the information such as the diameter or quality of the roll paper, there is calculated the curl extent, according to which the speed of the motor and the calorific value of the heater are controlled.

In the aforementioned Prior Art 3, however, it is extremely difficult to control the temperature or flow of the hot wind highly responsively and precisely according to the curl of the roll paper, as sequentially changed with the remainder or the like of the roll paper. Thus, there has been pointed out a problem that the desired decurl effect cannot be reliably obtained for the roll paper. Depending upon the kind, moreover, the rolled sheet material to be decurled may be troubled in its quality by the overheat.

In Japanese laid-open patent publication No. 6-64808 (as will be called the "Prior Art 4"), still moreover, a rotatable semicircular shaft is used so that its radially smaller shaft portion may come into abutment against a work (or sheet material) to decurl the work, when the work is fed, and so that its radially larger shaft portion may come into abutment against the work to prevent the work from being curled backward when the work is stopped. By switching the decurl means as the line is run and stopped, specifically, the work is prevented from being curled backward (or back-curled).

In the decurl apparatus, however, the working rate may be changed for the kinds of works or may be frequently increased/decreased or stopped in a repeated manner. There is pointed out a problem that the aforementioned Prior Art 4 cannot be applied to the apparatus of this kind. This is because the change in the working rate will change the curl-removing (or decurl) effect so that the desired decurl treatment cannot be efficiently effected.

On the other hand, there have been widely performed the operations, in which a support web is unwinded from a polymer support (as will be called the "rolled support") in a rolled shape and in which a recording layer (or photographic emulsion layer) is applied to the support web and is then rolled again. In the rolled support of this kind, there will easily occur the so-called "cut end mark" phenomenon, in which the portion in the vicinity of the core is deformed over several turns by the aging of the rolled support. This cut end mark phenomenon affects the aforementioned step of applying the recording layer thereby to raise a problem that a coating unevenness of the recording layer is caused to deteriorate the quality. At the working step, therefore, the several turns in the vicinity of the roll core are generally dumped to raise a disadvantage that the production yield drops to an uneconomical level.

As disclosed in Japanese laid-open patent publication No. 8-142209 (as will be called the "Prior Art 5"), for example, there is known a flatness improving method for a thermoplastic film. In this method, a film web is guided to pass continuously through: a roller heating step of flattening the film web by transferring and heating it with an infrared ray heater and a heating roller; and a roller cooling step of solidifying the film web, just after heated, by transferring and cooling it by a cooling roller. Moreover, the infrared ray heater of the roller heating step is widthwise divided so that its divided portions are individually set to different temperatures according to the flatness of the film.

In the aforementioned Prior Art 5. however, the heating conditions for the film are hard to promptly change when the material or thickness of the film changes, when the film velocity including the acceleration/deceleration changes or when the line is stopped. As a result, the film may be over-heated and elongated.

When especially a thermal imaging material such as a thermal imaging photosensitive material is to be cut, there is adopted a method for snipping the material with an upper blade and a lower blade. Since the image forming layer (such as a photosensitive layer or a heat-sensitive layer) of the thermal imaging material is thick and fragile, however, there will easily arise degradations such as the film separation, the crack and the separation from the film base by the cutting action. As a result, there is a problem that the image forming layer is degraded.

Against these problems, there have been adopted in the prior art the methods of: adjusting the edge angle one (mainly the upper one) of the upper blade and the lower blade; adjusting the fine shape of the edge, adjusting the relative positions and the cutting angles such as the gap, the snipping angle and the intersection angle between the upper blade and the lower blade; adjusting imposing force; lowering the cutting speed, etc.

However, the adjustment of the shapes or the snipping angle of the upper blade and the lower blade of the prior art is defective in that it cannot solve the problems of the film separation, the crack and the peel from the film base by the cutting operations. On the other hand, the adjustments of the shapes and the snipping angle of the upper blade and the lower blade are so delicate that they are difficult to maintain.

Here, the method of cutting the elongated crystal film, the prepreg material and the metallic material is disclosed in Japanese laid-open patent publication No. 9-85680, Japanese patent publication No. 7-90512 and Japanese laid-open patent publication No. 5-111898, in which the material is heated when cut.

In the thermal imaging material to be cut by the invention, however, the image forming layer (or applied film) is laminated over the base layer to form a multi-layered film so that the application thickness of the image forming layer grows thick but fragile. At the time of cutting the thermal imaging material, therefore, there will easily arise a trouble that the surface film peels in a beard shape, comes out as chips or cracks in the image forming layer.

Specifically, as shown in FIG. 64, a thermal imaging material 1 is composed of a base layer 2 and an image forming layer 3 having a photosensitive layer or a heat-sensitive layer. When this thermal imaging material 1 is to be cross-cut, moreover, there has been pointed out a problem that beard-shaped peels 4 or surface cracks 5 occur, on the side cut by the upper blade, on the surface layer of the image forming layer 3 whereas cracks 6 occur, on the side cut by the lower blade, in the image forming layer 3.

As shown in FIG. 65, on the other hand, there is another problem that when the thermal imaging material 1 is to be slit, there is a problem that a banking 7 occurs, on the side cut by the upper blade, on the image forming layer whereas a crack 8 occurs, on the side cut by the lower blade, in the image forming layer 3.

SUMMARY OF THE INVENTION

A general object of the invention is to provide a sheet material deformation correcting method and apparatus which can correct the deformation such as the curl of a sheet material reliably for a short time and can reduce the size of the entire facilities.

On the other hand, a main object of the invention is to provide a sheet material deformation correcting method and apparatus which can subject a recording medium having various recording layers of different heat resistances to a desired decurl treatment without affecting the quality of the recording medium adversely.

Another main object of the invention is to provide a sheet material deformation correcting method and apparatus which can decurl the sheet material reliably and easily and can keep the sheet material in a high quality.

Still another main object of the invention is to provide a sheet material deformation correcting method and apparatus which can decurl the sheet material reliably and easily without being influenced by the change in the treating rate.

A further main object of the invention is to provide a sheet material deformation correcting method and apparatus which can flatten a polymer sheet material reliably without being influenced by the change in the kind of the polymer sheet material or the running situation.

A further main object of the invention is to provide a sheet material cutting method and apparatus which can cut a thermal imaging sheet material satisfactorily without depending upon the shapes of blades or the adjusting conditions of upper and lower blades.

The above and other objects, features and advantages of the present invention will become more apparent from the following description when taken in conjunction with the accompanying drawings, in which preferred embodiments of the invention are shown by way of illustrative example.

BRIEF DESCRIPTION OF THE DRAWINGS

FIG. 8 is a diagram plotting the curl changes against the heating of a dry X-ray film;

FIG. 15 is a schematic diagram for explaining the heating means composing the decurl apparatus according to a fifth embodiment of the invention;

FIG. 16 is a schematic diagram for explaining the heating means composing the decurl apparatus according to a sixth embodiment of the invention;

FIG. 26 is a diagram for explaining the corresponding relations between the kinds of sensitized webs and the working conditions;

DESCRIPTION OF THE PREFERRED EMBODIMENTS

Figure 1:
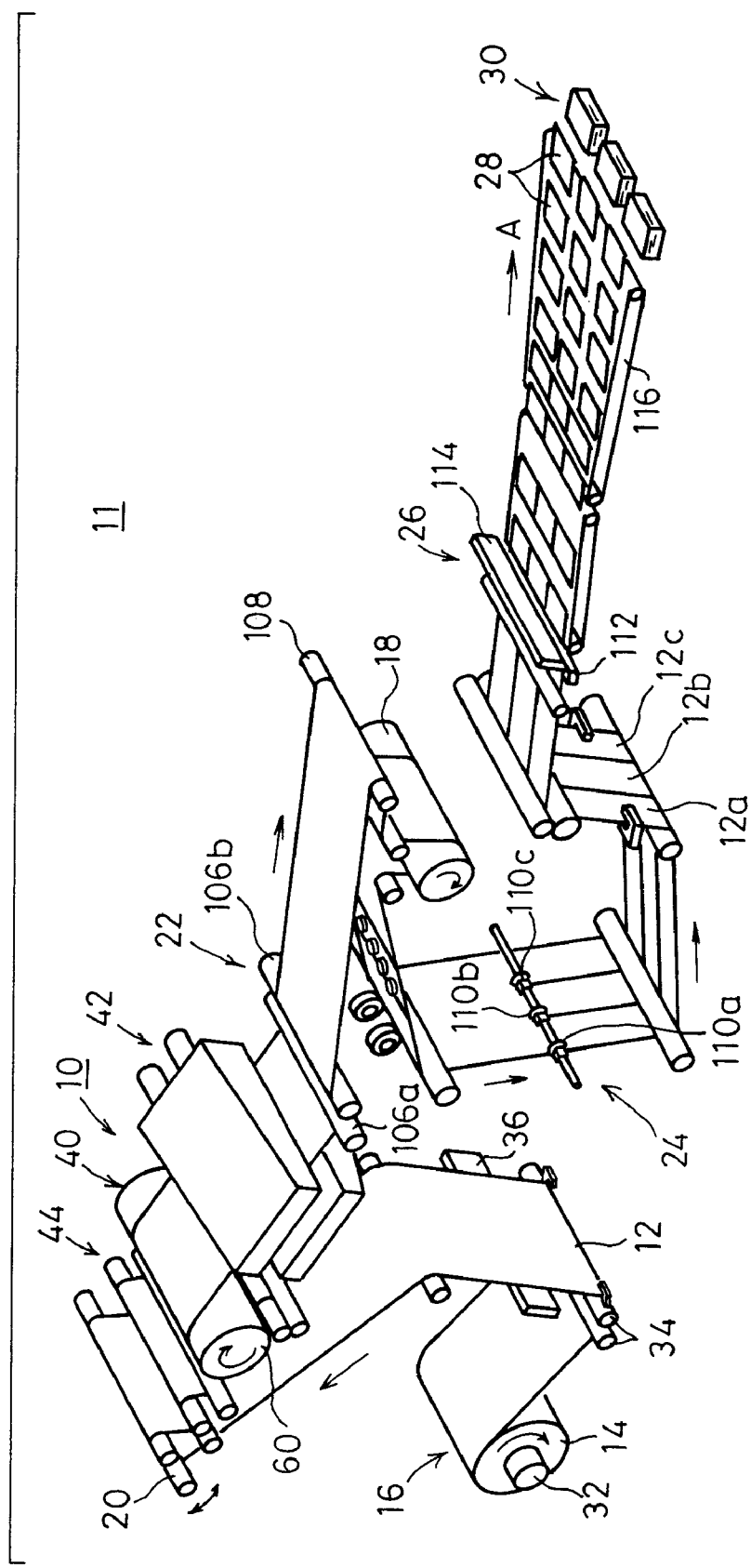
FIG. 1. is a perspective explanatory view showing a schematic construction of a sheet film processing system into which a decurl apparatus according to a first embodiment of the invention is incorporated.

FIG. 1 is a perspective explanatory view showing a schematic construction of a sheet film processing system 11, into which a decurl apparatus (or deformation correcting apparatus) 10 according to a first embodiment of the invention is incorporated.

This sheet material processing system 11 is constructed to include: a web unwinder 16, in which a roll film 14 having an image recording carrier web (or sheet material) 12 rolled thereon is mounted, for letting off the image recording carrier web 12 from the roll film 14; a main feeding suction drum 18 for feeding the image recording carrier web 12 at a predetermined velocity from the web let-off unit 16; a dancer roller 20 for adjusting the tension of the image recording carrier web 12; the decurl apparatus 10, as arranged downstream of the dancer roller 20, and a cooler unit 22 for cooling the image recording carrier web 12, as let off the decurl apparatus 10; a slitter unit 24 arranged downstream of the suction drum 18, for slitting the image recording carrier web 12 in three strips, for example, in the width direction; a cutter unit 26 for cutting the image recording carrier webs 12a to 12c, as slit in the three strips by the slitter unit 24, individually, to every predetermined lengths in the transfer direction (as taken in the direction of arrow A); and a stacker unit 30 for stacking a predetermined number of sheet-shaped X-ray films 28, as cut by the cutter unit 26.

The image recording carrier web 12 is a film material having an image recording layer on at least one side of a support made of PET or PEN, and the roll film 14 having the image recording carrier web 12 rolled thereon is mounted on a let-off shaft 32 composing the web unwinder 16. Between the let-off shaft 32 and the dancer roller 20, there are arranged a plurality of rollers 34 for guiding the image recording carrier web 12, as let off the web unwinder 16. Midway of this path, there is disposed a splicing plate 36.

Figure 2:
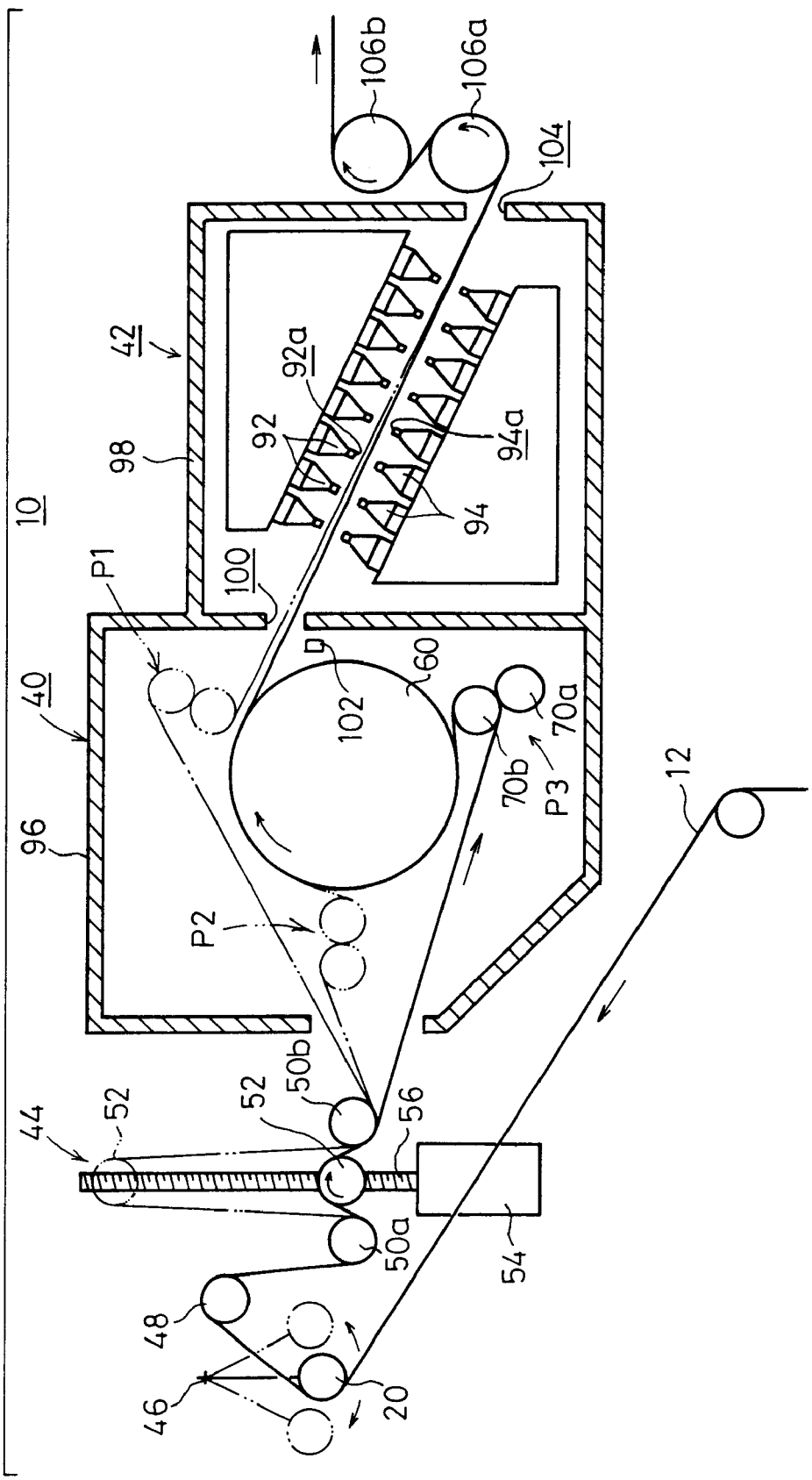
FIG. 2 is a diagram for explaining a schematic construction of the decurl system.

As shown in FIGS. 1 and 2, the decurl apparatus 10 is constructed to include: heating means 40 for heating the image recording carrier web 12 at a constant temperature exceeding the glass transition temperature (Tg) of the support and only for a constant time period; and cooling means 42 for cooling the heated image recording carrier web 12 to the glass transition or lower temperature while keeping it in a predetermined shape. Between the heating means 40 and the dancer roller 20, there is arranged path length adjusting means 44 for adjusting the path length of the image recording carrier web 12.

The dancer roller 20 can rock on a support shaft 46, as shown in FIG. 2, and the path length adjusting means 44 is arranged downstream of the dancer roller 20 through a guide roller 48. The path length adjusting means 44 is constructed to include: guide rollers 50a and 50b held at fixed positions; and an adjusting roller 52 arranged between the guide rollers 50a and 50b and made able to go up and down. As the means for moving the adjusting roller 52 up and down, there is provided a first servo motor 54, to which an upward extending ball screw 56 is connected and fastened in the not-shown nut supporting the adjusting roller 52.

Figure 3:
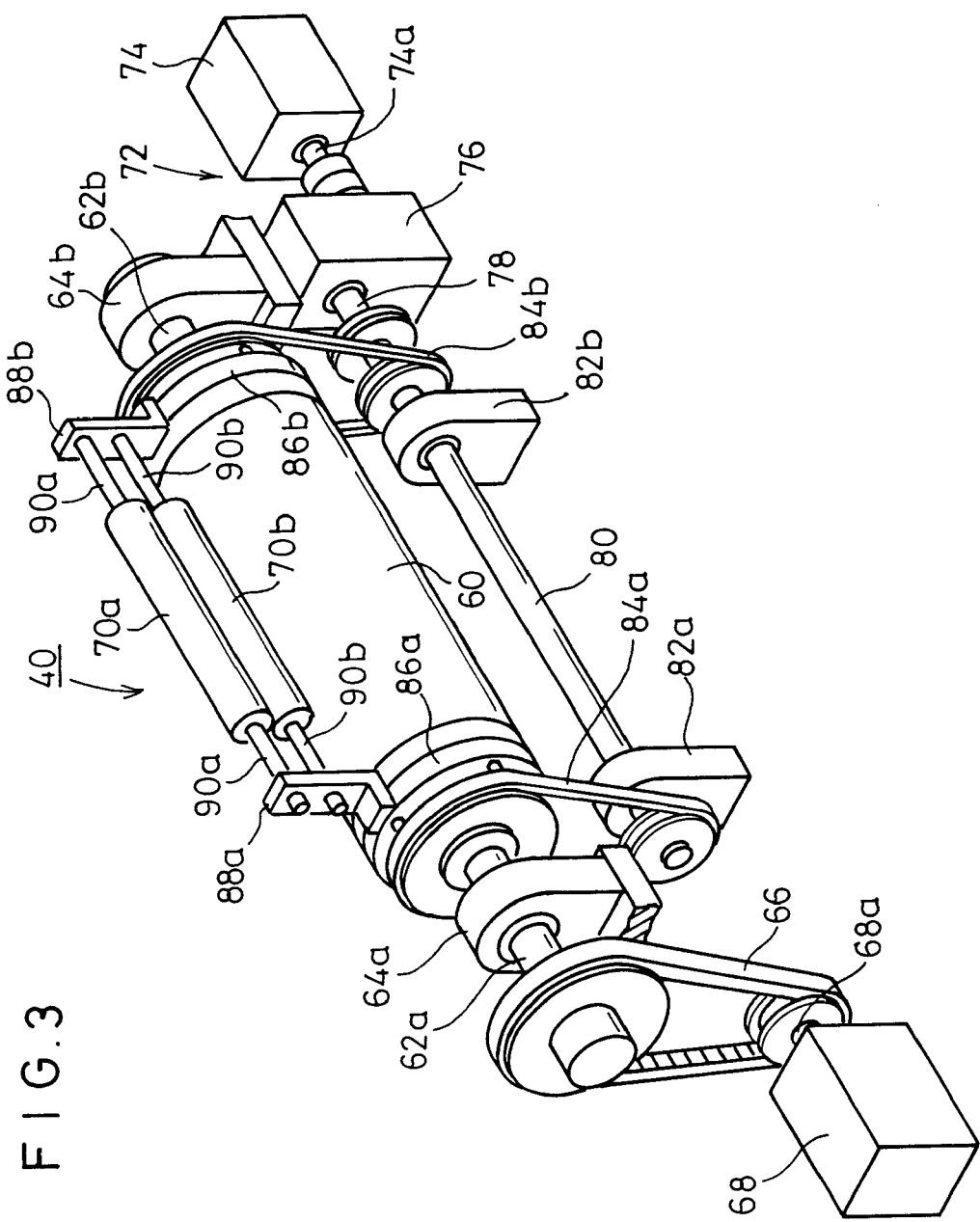
FIG. 3 is a perspective view for explaining heating means composing the decurl apparatus.
Figure 4:
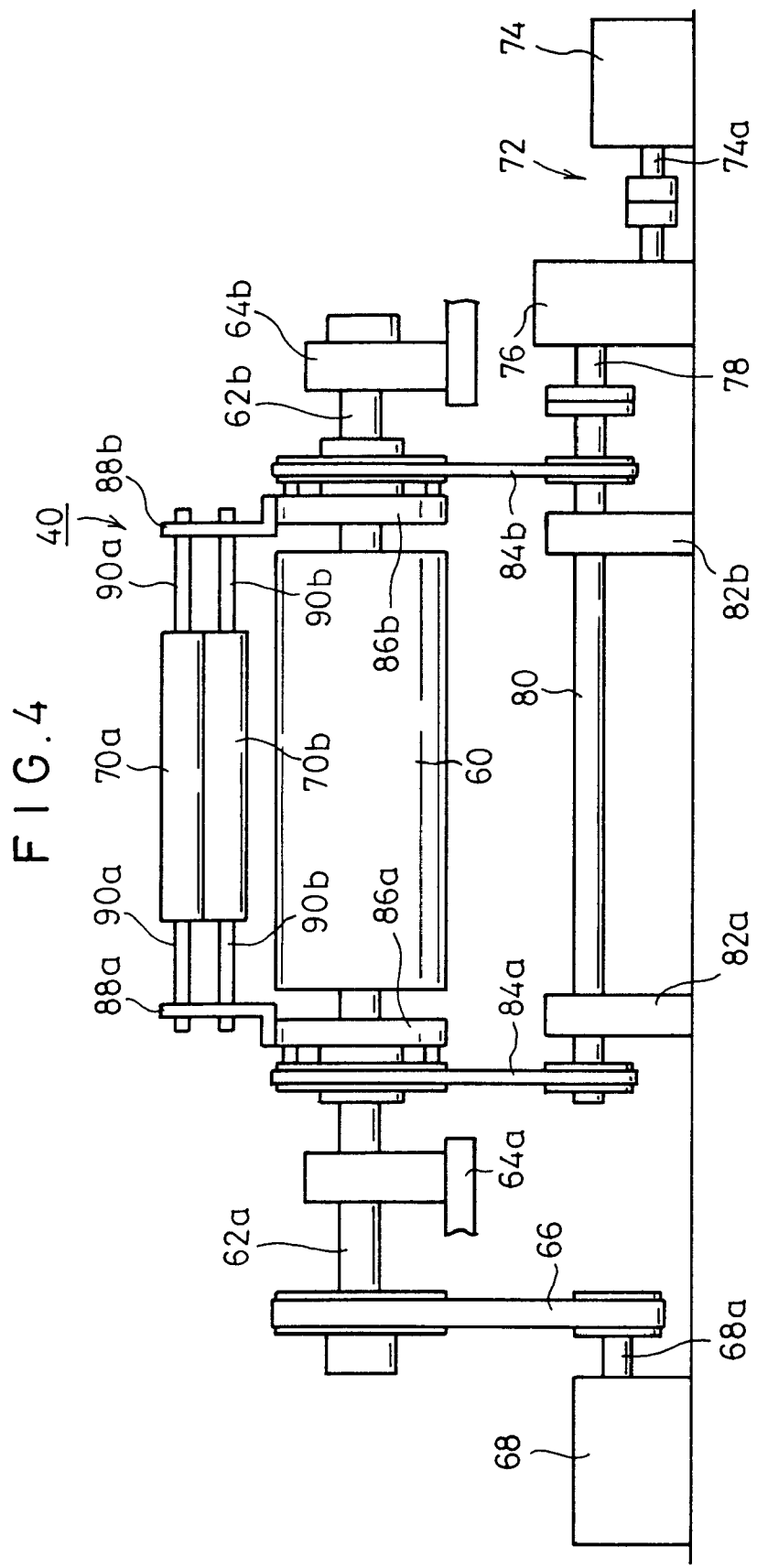
FIG. 4 is a side elevation for explaining the heating means.

The heating means 40 is equipped with a heating roller 60 which is induction-heated to heat the image recording carrier web 12 from the support side, as shown in FIGS. 3 and 4, and which is rotatably supported at its two end portions 62a and 62b by support stands 64a and 64b. To the end portion 62a of the heating roller 60, there is connected the drive shaft 68a of a second servo motor 68 through a belt/pulley 66. Around the heating roller 60, there are arranged a pair of holding rollers 70a and 70b for lapping the image recording carrier web 12 on the outer circumference of the heating roller 60 and for changing the lapping angle of the image recording carrier web 12 with respect to the circumference of the heating roller 60.

The holding rollers 70a and 70b are so arranged as to turn to a predetermined angle position with respect to the heating roller 60 through holding roller displacing means 72. This holding roller displacing means 72 is equipped with a third servo motor 74, the drive shaft 74a of which is connected to a reducing mechanism 76. This reduction mechanism 76 is connected at its output shaft 78 to a rotary shaft 80, which is rotatably supported by support stands 82a and 82b.

To the two ends of the rotary shaft 80, there are connected through belt/pulleys 84a and 84b turning discs 86a and 86b, which are rotatably arranged on the two end portions 62a and 62b of the heating roller 60. On the outer circumferences of the turning discs 86a and 86b, there are fixed mounting plates 88a and 88b, by which the holding rollers 70a and 70b are rotatably supported at their two ends 90a and 90b.

As shown in FIG. 2, the cooling means 42 is equipped with an upstream cooling wind nozzle 92 and a downstream cooling wind nozzle 94 for injecting cooling winds to the image recording carrier web 12 while keeping the heated image recording carrier web 12 in a predetermined shape, e.g., in a flattened shape. The upstream cooling wind nozzle 92 and the downstream cooling wind nozzle 94 are arranged in plurality to confront the both sides of the image recording carrier web 12 and are provided with nozzle slits 92a and 94a which extend in a direction perpendicular to the paper sheet of FIG. 2.

The heating means 40 and the cooling means 42 are isolated from each other through insulation casings 96 and 98, of which the insulation casing 96 has an opening 100 formed to transfer the image recording carrier web 12 from the heating means 40 to the cooling means 42. In the vicinity of this opening 100, there is arranged a temperature detecting sensor 102 for detecting the temperature in the heating means 40.

The insulation casing 98 has an opening 104 formed for discharging the cooled image recording carrier web 12 from the decurl apparatus 10. In the vicinity of the opening 104, there are arranged a pair of cooling rollers 106a and 106b. These cooling rollers 106a and 106b are given a condensation preventing function by feeding cooling water at a predetermined temperature through a heat pipe system.

As shown in FIG. 1, the suction drum 18 is arranged downstream of the cooling rollers 106a and 106b through a plurality of guide rollers 108. The slitter unit 24 is equipped with three slitter blades 110a to 110c, whereas the cutter unit 26 is equipped with a lower blade 112 and an upper blade 114 which is associated with the lower blade 112 to cut the image recording carrier webs 12a to 12c. Between the cutter unit 26 and the stacker unit 30, there is arranged a conveyor belt 116, for example.

Figure 5:
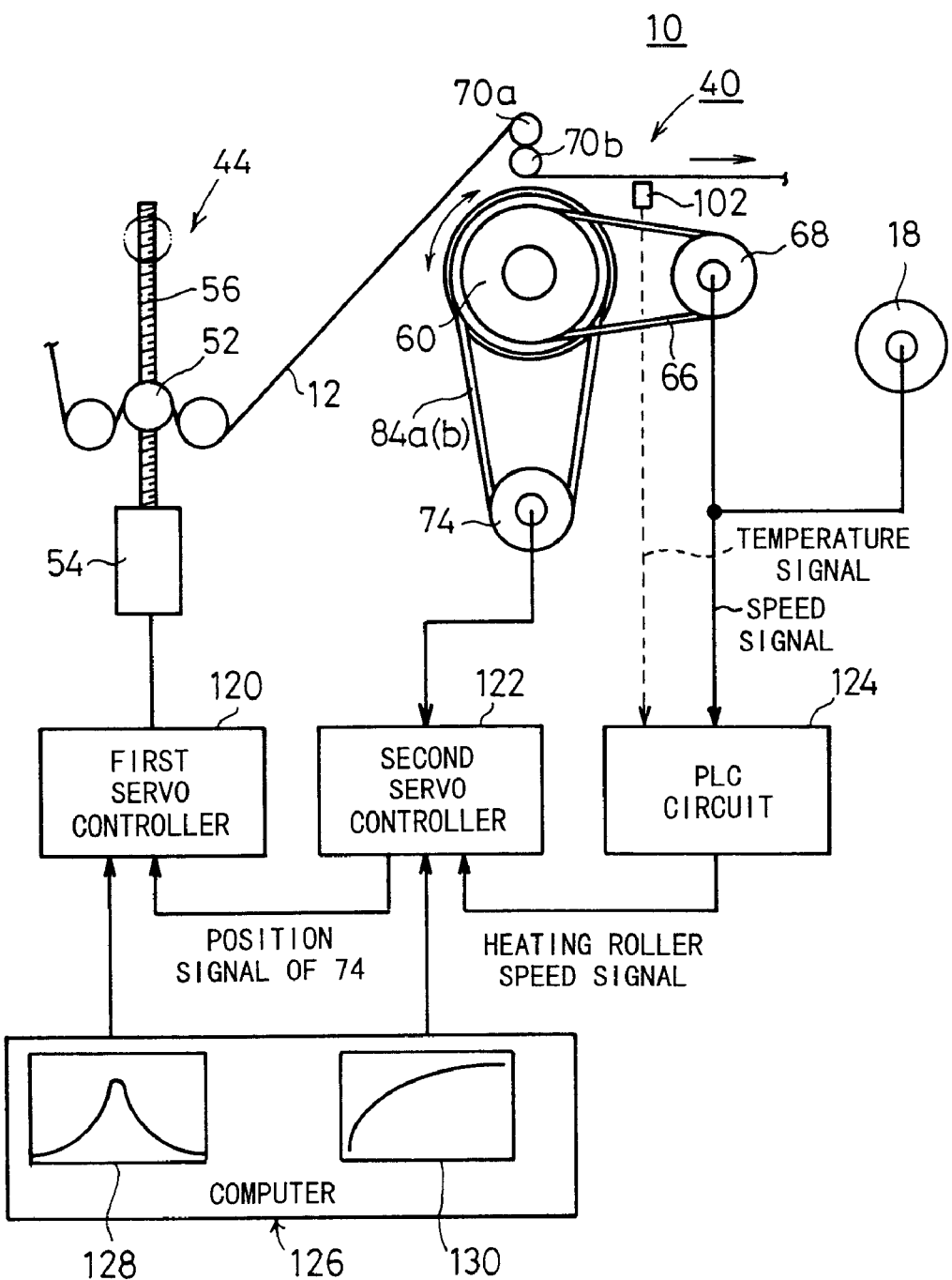
FIG. 5 is a diagram for explaining a control block of the decurl apparatus.

As shown in FIG. 5, the first servo motor 54 is controlled in its drive by a first servo controller 120, and the third servo motor 74 is controlled by a second servo controller 122. The second servo motor 68 is controlled in synchronism with the suction drum 18, and its speed signal is inputted to a PLC circuit 124. To this PLC circuit 124, there is also inputted a temperature signal from the temperature detecting sensor 102 which is arranged in the heating means 40.

The speed signal of the heating roller 60 (or the suction drum 18) is inputted from the PLC circuit 124 to the second servo controller 122, whereas the position signal of the servo motor 74 is inputted from the second servo controller 122 to the first servo controller 120. To these first and second servo controllers 120 and 122, there are inputted from a computer 126 spline curve data 128 and 130 for controlling the first and third servo motors 54 and 74.

The actions of the decurl apparatus 10 thus constructed according to the first embodiment will be described in connection with the sheet material processing system 11 incorporating it.

There is set the glass transition temperature (Tg) of the support which composes the image recording carrier web 12. Specifically, the measurements are performed in the following procedures by using the DSC (Differential Scanning Calorimeter). First of all, a sample of 20 mg is weighed and confined in an aluminum pan. Next, the sample is heated to 300° C. at a rate of 10° C./min. and is then quenched to cancel the hysteresis. Moreover, the sample is heated again to 300° C. at a rate of 10° C./min. and is measured in a nitrogen gas flow by the DSC.

Figure 6:
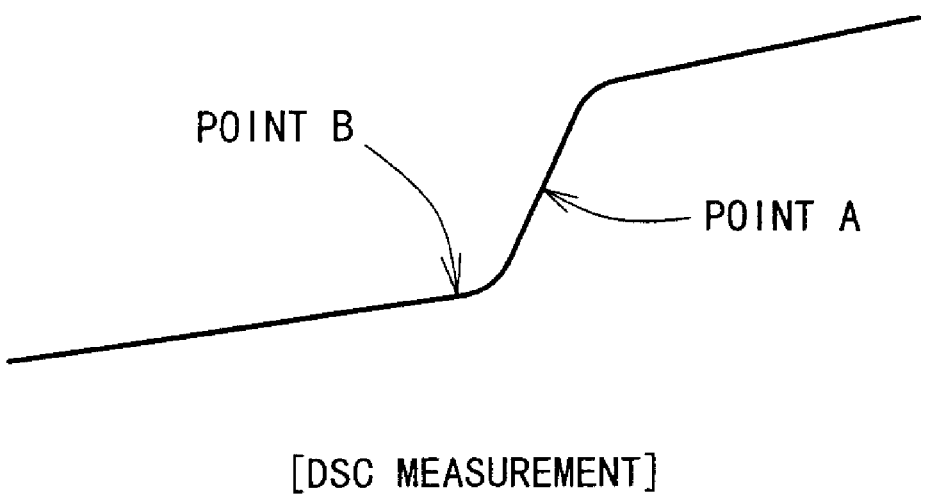
FIG. 6 is a diagram for explaining a method for measuring a glass transition temperature.

In this case, the glass transition temperature (Tg) is defined, as illustrated in FIG. 6, either as point A or a middle point between the start point, at which the base line starts to deviate, and the end point or as point B or a first changing point. In the case of the sample of PET, the point A is at 80° C., and the point B is at 69° C. so that the point A is set as the glass transition temperature (Tg) in the first embodiment.

Next, the actions of the sheet material processing system 11 will be described in the following. On the let-off shaft 32 composing the web unwinder 16, there is fitted the roll film 14, from which the image recording carrier web 12 is let off. The image recording carrier web 12 thus let off is transferred under the rotary action of the suction drum 18 at a predetermined transfer velocity so that it is conveyed under the guiding action of the roller 34 from the dancer roller 20 to the decurl unit 10.

In this decurl unit 10, the image recording carrier web 12 is inserted through the path length adjusting means 44 into the clearance between the holding rollers 70a and 70b composing the heating means 40 and is then lapped at a predetermined lapping angle on the circumference of the heating roller 60. The image recording carrier web 12 is further threaded through the clearance between the upstream cooling wind nozzle 92 and the downstream cooling wind nozzle 94 composing the cooling means 42, until it is rolled in an S-shape on the cooling rollers 106a and 106b.

The heating roller 60, as composing the heating means 40, is rotationally driven by the action of the second servo motor 68, as driven in synchronism with the suction drum 18, through the belt pulley 66 which is connected to the drive shaft 68a. As a result, the image recording carrier web 12, as kept for a predetermined time period in sliding contact with the circumference of the heating roller 60 from the support side, is conveyed to the cooling means 42. At this time, the heating roller 60 is heated by the induction heating so that the image recording carrier web 12 is subjected to the heat treatment at a constant temperature higher than the glass transition temperature (Tg) of its support, e.g., at a surface temperature of the heating roller 60 exceeding the glass transition temperature (Tg) by +10 to 30° C., and for a constant time period, e.g., for 0.1 to 3 secs. According to this heating method, both the heated side and the other side of the support are raised to 80° C., for example, by the heating of the heating roller 60 having a surface temperature of 95° C. for 0.5 secs.

The heated image recording carrier web 12 is introduced, as shown in FIG. 2, into the insulation casing 98 from the opening 100 formed in the insulation casing 96, and is blown with the cooling wind, while being held in a predetermined shape such as a flattened shape, by the upstream cooling wind nozzle 92 and the downstream cooling wind nozzle 94, which compose the cooling means 42. As a result, the image recording carrier web 12 is cooled down to the glass transition temperature (Tg) or lower and is lapped from the opening 104 of the insulation casing 98 into the S-shape on the circumferences of the cooling rollers 106a and 106b so that it is cooled down under the cooling actions of the cooling rollers 106a and 106b, until it is transferred to the suction drum 18. At the line velocity of 70 m/min., specifically, the image recording carrier web 12 is cooled down to 35° C. under the conditions of the image recording carrier web 12 having a (web) width of 1.5 m, a cooling wind temperature of 18° C., individual fourteen rows of upstream cooling wind nozzles 92 and downstream cooling wind nozzles 94 and a wind flow of 210 m$^3$/min.

Downstream of the suction drum 18, as shown in FIG. 1, the image recording carrier web 12 is slit into the image recording carrier webs 12a to 12c through the slitter blades 110a to 110c composing the slitter unit 24, and the sheet-shaped X-ray films 28 are formed under the cutting actions of the lower blade 112 and the upper blade 114, which compose the cutting unit 26. These X-ray films 28 are transferred through the conveyor belt 116 to the stacker unit 30, at which a predetermined number of them are individually stacked.

Here in the sheet material processing system 11, the drive of the suction drum 18 may be stopped for a short or long time period, when the system 11 is troubled by the transfer malfunction of the image recording carrier web 12. In this case, the holding roller displacing means 72 is driven to bring the image recording carrier web 12 out of the sliding contact from the circumference of the heating roller 60.

As shown in FIGS. 3 and 4, specifically, the third servo motor 74 is driven to rotate the rotary shaft 80 through the drive shaft 74a, the reduction mechanism 76 and the output shaft 78. To the rotary shaft 80, there are connected through the belt/pulleys 84a and 84b the turning discs 86a and 86b, which are arranged under the rotary actions of the rotary shaft 80 at a predetermined angular position (as should be referred to position P1) with respect to the outer circumference of the heating roller 60. As a result, the image recording carrier web 12, as lapped in the S-shape on the outer circumferences of the holding rollers 70a and 70b, neither leaves the circumference of the heating roller 60 nor is unnecessarily heated through the heating roller 60.

When the drive of the second servo motor 68 is started in synchronism with the suction drum 18, therefore, the velocity signal of the heating roller 60 is inputted from the PLC circuit 124 to the second servo controller 122, as shown in FIG. 5. The drive of the third servo motor 74 is controlled so that the lapping angle of the image recording carrier web 12, as lapped on the circumference of the heating roller 60, may be adjusted to match the velocity of the heating roller 60. Therefore, the holding rollers 70a and 70b are arranged at a predetermined angular position with respect to the outer circumference of the heating roller 60, e.g., at position P2 in FIG. 2, so that the image recording carrier web 12 is lapped at the predetermined lapping angle on the circumference of the heating roller 60.

When the heating roller 60 takes the predetermined transfer velocity, moreover, the holding rollers 70a and 70b are arranged at position P3 in FIG. 2 under the action of the third servo motor 74 so that the lapping angle of the image recording carrier web 12 becomes larger as the velocity of the heating roller 60 grows higher. This is intended to retain a contact time period for the image recording carrier web 12 to be in sliding contact with the heating roller 60.

In this case, the drive control of the third servo motor 74 is made along the spline curve data 130 which are inputted through the computer 126 to the second servo controller 122. To the first servo controller 120, on the other hand, there is inputted from the second servo controller 122 the position signal of the third servo motor 74 to adjust the height position of the adjusting roller 52 composing the path length adjusting means 44, in a manner to match the angular position of the holding rollers 70a and 70b.

To the first servo controller 120, specifically, there are inputted from the computer 126 the spline curve data 128. along which the drive of the first servo motor 54 is controlled to adjust the height position of the adjusting roller 52 continuously. As a result, the angular position of the holding rollers 70a and 70b with respect to the circumference of the heating roller 60 is changed to fluctuate the path length of the image recording carrier web 12, and then the path length fluctuation can be absorbed easily but reliably by the upward and downward actions of the adjusting roller 52.

Thus, in the first embodiment, the third servo motor 74 composing the holding roller displacing means 72 and the first servo motor 54 composing the path length adjusting means 44 are controlled through the spline curve data 130 and 128, respectively. This raises an advantage that the positions of the holding rollers 70a and 70b and the adjusting roller 52 are highly accurately adjusted by the extremely simple controls.

In the first embodiment, moreover, the heating roller 60 is induction-heated to the constant temperature exceeding the glass transition temperature of the support, and the image recording carrier web 12 is brought into the sliding contact with the circumference of the heating roller 60 so that it is subjected to the heat treatment. As a result, the image recording carrier web 12 can be reliably decurled without being influenced by the fluctuation of its transfer velocity, so that the degradation of the image characteristics can be effectively blocked.

Figure 7:
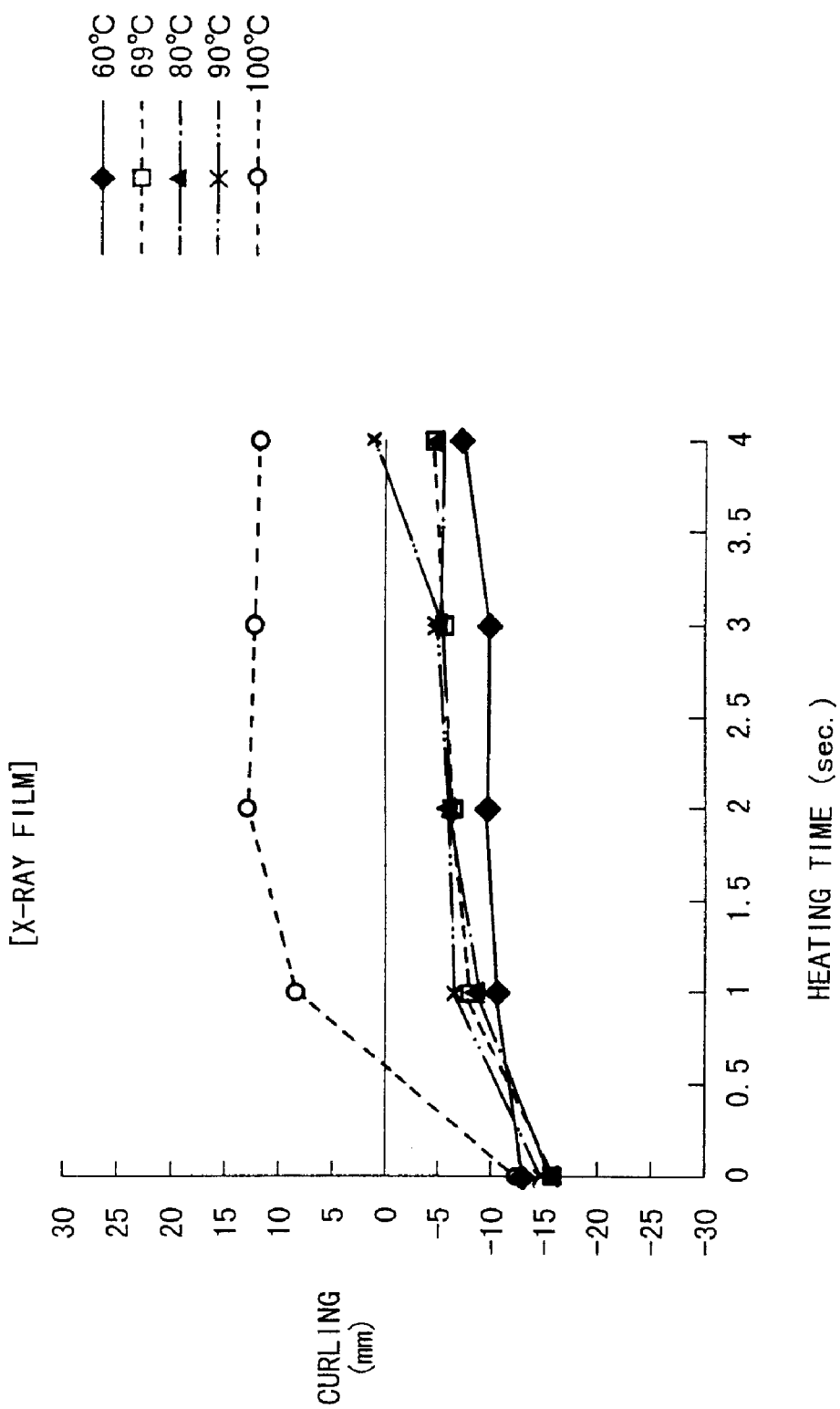
FIG. 7 is a diagram plotting the curl changes against the heating of an X-ray film.
Figure 8:
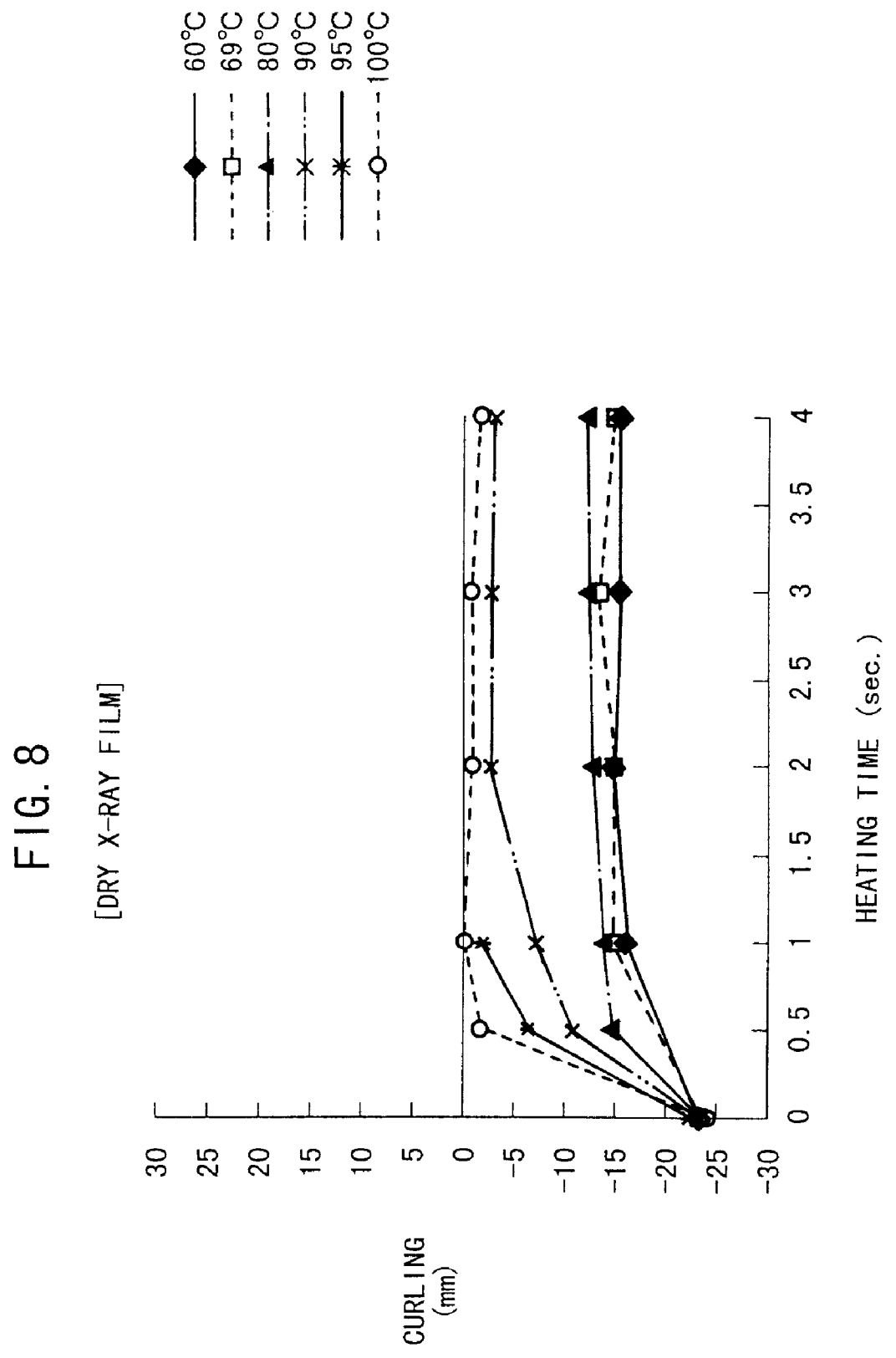
Figure 9:
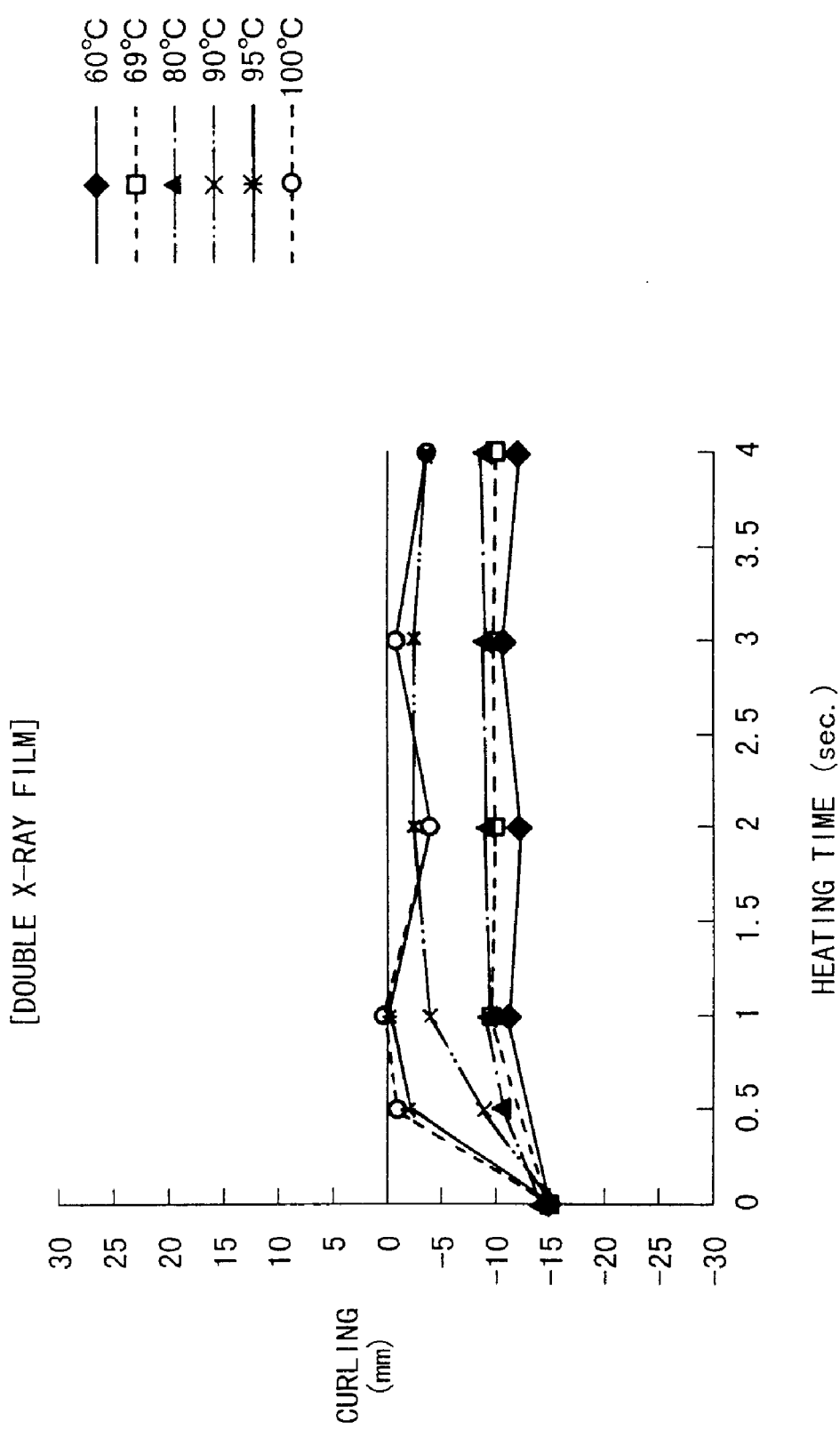
FIG. 9 is a diagram plotting the curl changes against the heating of a double X-ray film.

Here, it has been experimentally verified how the curl and the quality are changed by heating the X-ray film 28. The experiments have detected the changes in the curls of not only the X-ray film 28 but also the dry X-ray film and the double X-ray film (i.e., the X-ray film having image recording layers on the two sides of the support), as plotted in FIGS. 7, 8 and 9. Here, the temperatures in FIGS. 7, 8 and 9 indicate the surface temperature of the heating roller which has been used for heating the films.

It has been revealed that the desired decurl effect cannot be achieved when the film heating temperature is so low as is close to the glass transition temperature (Tg).

Moreover, the following Tables 1, 2 and 3 enumerate the relations between the film heating temperatures and the qualities. Here, the symbol "○" indicates that the satisfactory quality is kept, and the symbol "X" indicates that the quality is degraded.

TABLE 1

X-Ray Film (Heated on the Back)

| Roller Surface Temp. (° C.) | Roller Contact Time (secs.) | | | | |
|---|---|---|---|---|---|
| | 1 | 2 | 3 | 5 | 10 |
| 60° C. | ○ | | ○ | ○ | ○ |
| 69° C. | ○ | | ○ | ○ | ○ |
| 80° C. | ○ | | ○ | ○ | ○ |
| 85° C. | | | | | |
| 90° C. | ○ | ○ | ○ | | |
| 95° C. | ○ | ○ | ○ | | |
| 100° C. | ○ | ○ | X | X | X |
| 120° C. | X | | X | X | X |
| 140° C. | X | | X | X | X |

TABLE 2

Dry X-Ray Film (Heated on the Back)

| Roller Surface Temp. (° C.) | Roller Contact Time (secs.) | | | | |
|---|---|---|---|---|---|
| | 1 | 2 | 3 | 5 | 10 |
| 60° C. | | | | | |
| 69° C. | | | | | |
| 80° C. | ○ | | ○ | ○ | ○ |
| 85° C. | | | | | |
| 90° C. | ○ | ○ | ○ | X | X |
| 95° C. | ○ | ○ | ○ | | |
| 100° C. | ○ | ○ | ○ | | |
| 120° C. | | | | | |
| 140° C. | | | | | |

TABLE 3

Double X-Ray Film

| Roller Surface Temp. (° C.) | Roller Contact Time (secs.) | | | | |
|---|---|---|---|---|---|
| | 1 | 2 | 3 | 5 | 10 |
| 60° C. | ○ | | ○ | ○ | ○ |
| 69° C. | ○ | | ○ | ○ | ○ |
| 80° C. | ○ | | ○ | ○ | ○ |
| 85° C. | | | | | |
| 90° C. | ○ | ○ | ○ | | |
| 95° C. | ○ | ○ | Δ | | |
| 100° C. | ○ | X | X | X | X |
| 120° C. | X | | X | X | X |
| 140° C. | X | | X | X | X |

Moreover, the test results including the curls and the qualities are enumerated in Tables 4, 5 and 6.

TABLE 4

X-Ray Film (Heated on the Back)

| Roller Surface Temp. (° C.) | Roller Contact Time (secs.) | | |
|---|---|---|---|
| | 1 | 2 | 3 |
| 90° C. | ○ | ○ | ○ |
| 95° C. | ○ | ○ | ○ |
| 100° C. | ○ | ○ | X |

TABLE 5

Dry X-Ray Film (Heated on the Back)

| Roller Surface Temp. (° C.) | Roller Contact Time (secs.) | | |
|---|---|---|---|
| | 1 | 2 | 3 |
| 90° C. | ○ | ○ | ○ |
| 95° C. | ○ | ○ | ○ |
| 100° C. | ○ | ○ | ○ |

TABLE 6

Double X-Ray Film

| Roller Surface Temp. (° C.) | Roller Contact Time (secs.) | | |
|---|---|---|---|
| | 1 | 2 | 3 |
| 90° C. | ○ | ○ | ○ |
| 95° C. | ○ | ○ | Δ |
| 100° C. | ○ | X | X |

Figure 10:
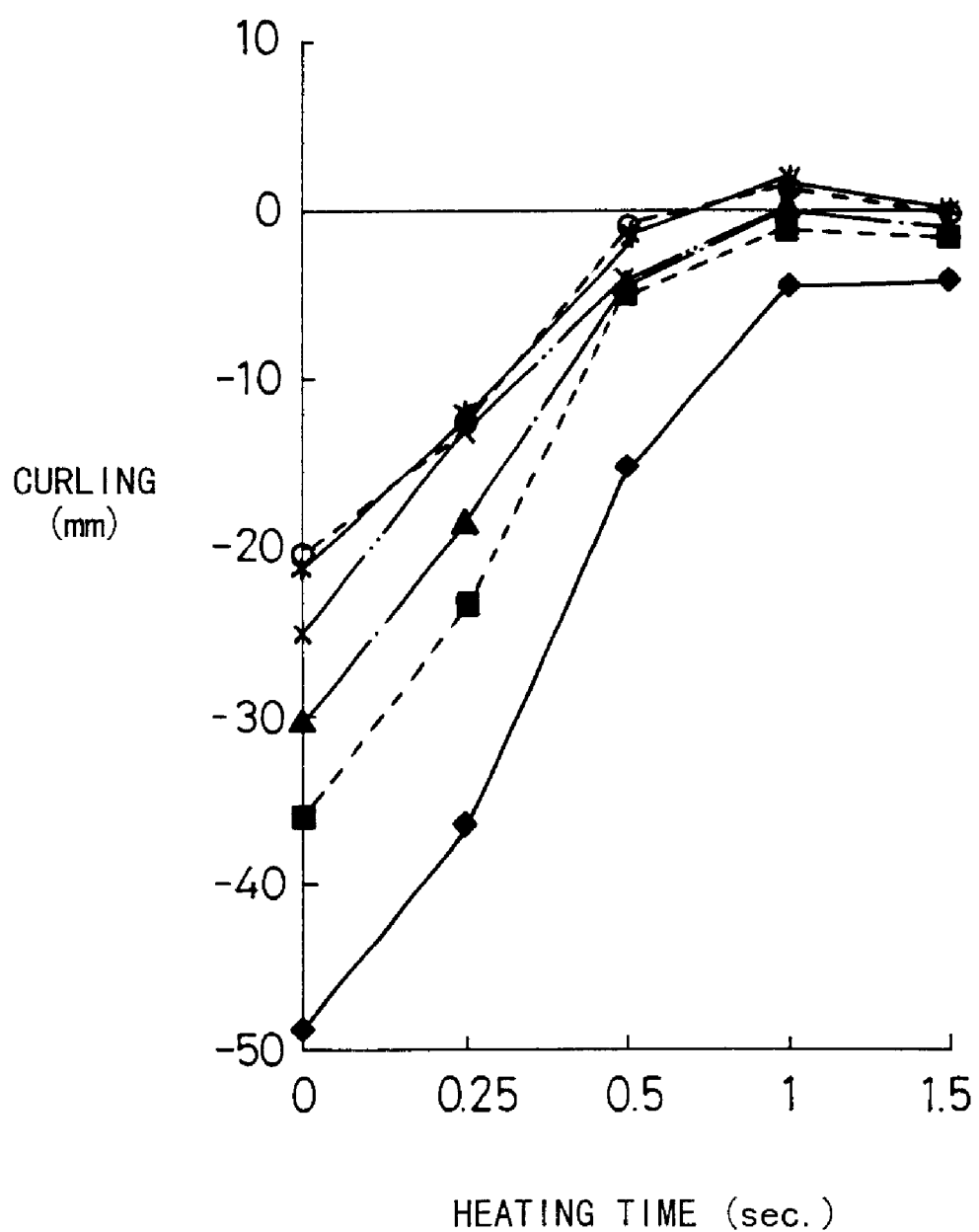
FIG. 10 is a diagram plotting relations between the heating time when the heating roller surface temperature is set at 100° C. and the decurl effect, by using the initial curl of an image recording carrier web as a parameter.

When the surface heating temperature of the image recording carrier web 12 is set to a level exceeding the glass transition temperature (Tg) of the support by 10 to 30° C. (wherein the temperature Tg has a width of 69 to 80° C. or higher. However, it is apparent from the data that the decurl is the more effective for the higher temperature.) and when the heating time is set to 0.1 to 3 sec., therefore, there can be obtained the effects that the decurl is ensured and that the degradation of the image characteristics is blocked. FIG. 10 plots the relations between the heating time and the initial decurl effect by using the curl of the image recording carrier web 12 as the parameter when the surface of the heating roller 60 is set at 100° C.

Figure 11:
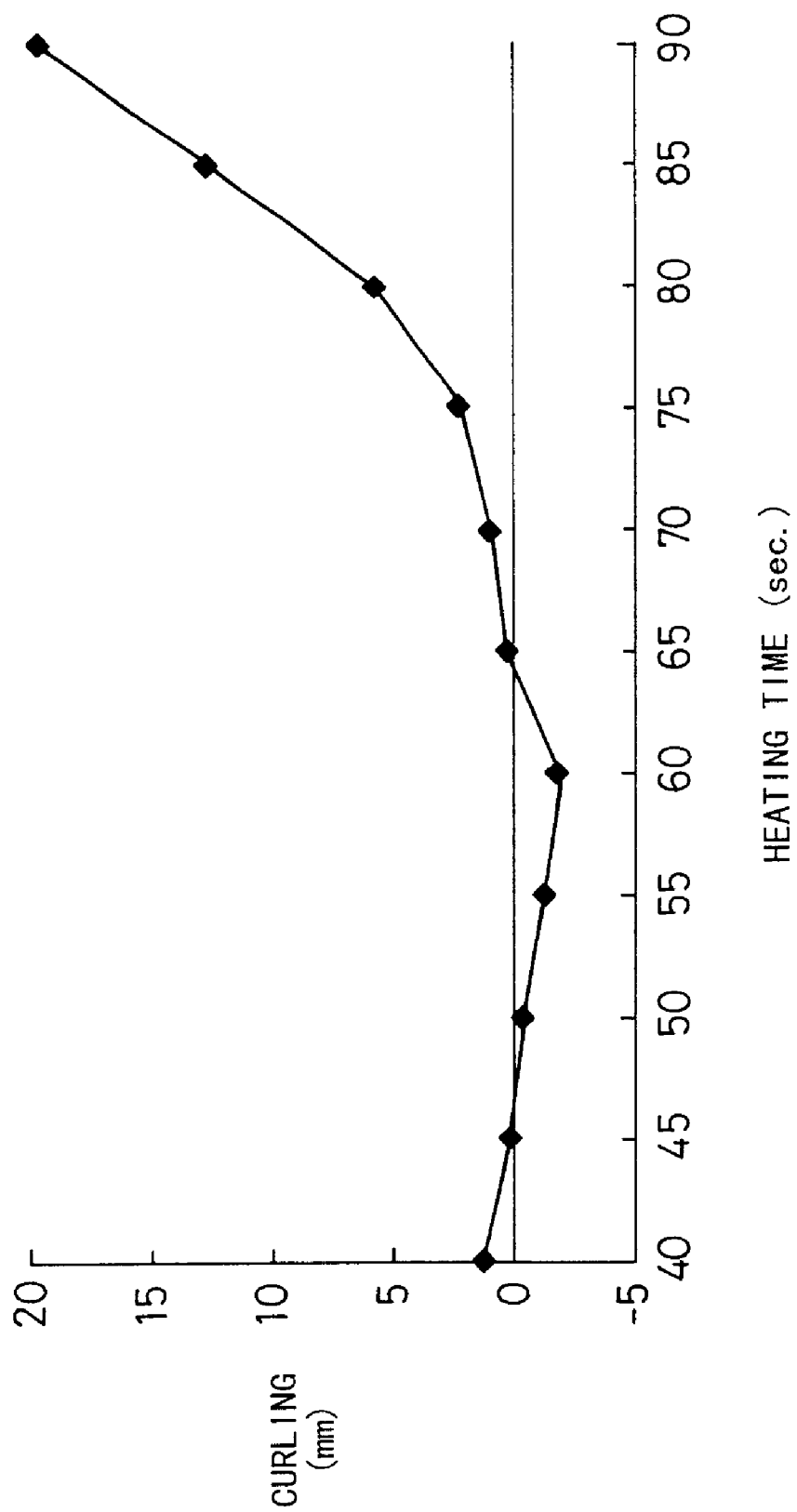
FIG. 11 is a diagram plotting a relation between the temperature of the image recording carrier web and the curl change.

In the first embodiment, on the other hand, the heated image recording carrier web 12 is cooled down in the cooling means 42 to the glass transition temperature (Tg) or lower while being kept in the predetermined shape. Therefore, the image recording carrier web 12, as guided out of the cooling means 42, is neither cooled down nor curled again. As a result, there arises an advantage that the X-ray film 28 of the desired shape or the flattened shape can be efficiently produced in a high quality. As illustrated in FIG. 11, the heated image recording carrier web 12 is so fixed in its shape by cooling it to about 70° C. that it can be prevented from being curled again.

Figure 12:
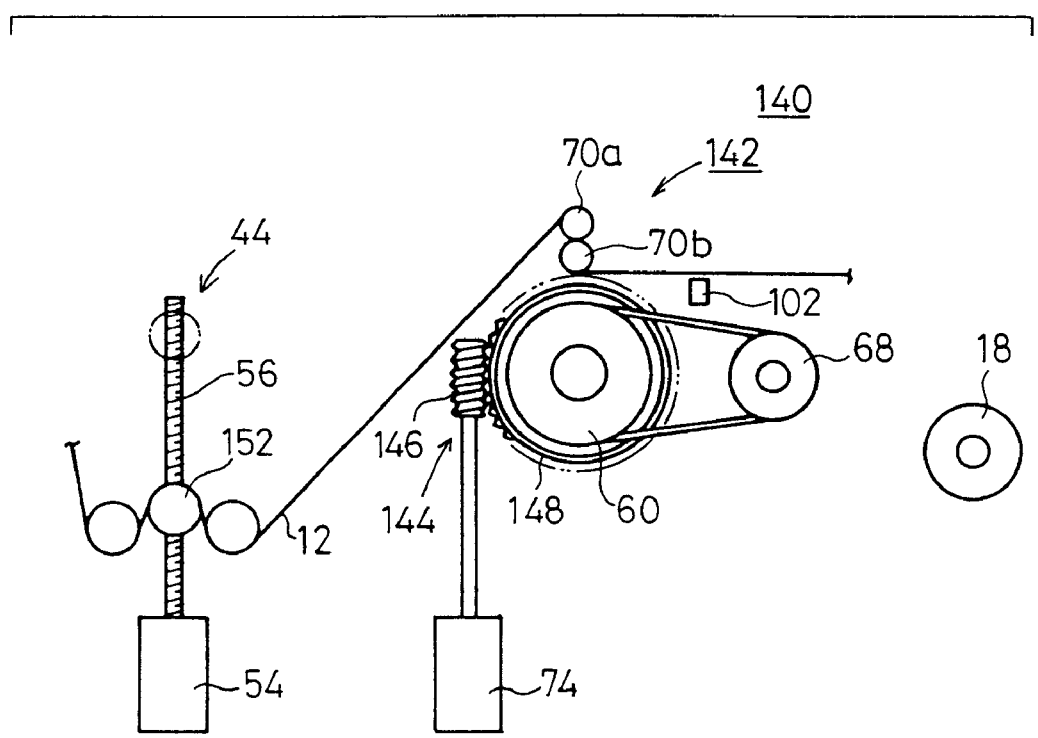
FIG. 12 is a schematic diagram for explaining a decurl apparatus according to a second embodiment of the invention.

FIG. 12 is a schematic diagram for explaining a decurl apparatus 140 according to a second embodiment of the invention. Here, the same components as those of the decurl apparatus 10 according to the first embodiment are designated by the common reference numerals, and their detailed description will be omitted.

Heating means 142, as composing the decurl apparatus 140, is equipped with holding roller displacing means 144 for arranging the holding rollers 70a and 70b at a predetermined angular position with respect to the outer circumference of the heating roller 60. The holding roller displacing means 144 is equipped with a worm 146 connected to the third servo motor 74 and a worm wheel 148 meshing with the worm 146 and supporting those holding rollers 70a and 70b.

In the decurl apparatus 140 thus constructed, the third servo motor 74 is controlled in its drive in accordance with the rotating speed of the heating roller 60, i.e., the rotating speed of the suction drum 18 so that the worm wheel 148 meshing with the worm 146 is turned to a predetermined angular position by the rotary action of the work 146. As a result, the holding rollers 70a and 70b, as supported by the worm wheel 148, are arranged at the predetermined angular position of the outer circumference of the heating roller 60 so that the image recording carrier web 12, as tensed between the holding rollers 70a and 70b, is adjusted highly accurately and reliably to a predetermined lapping angle with respect to the circumference of the heating roller 60.

Figure 13:
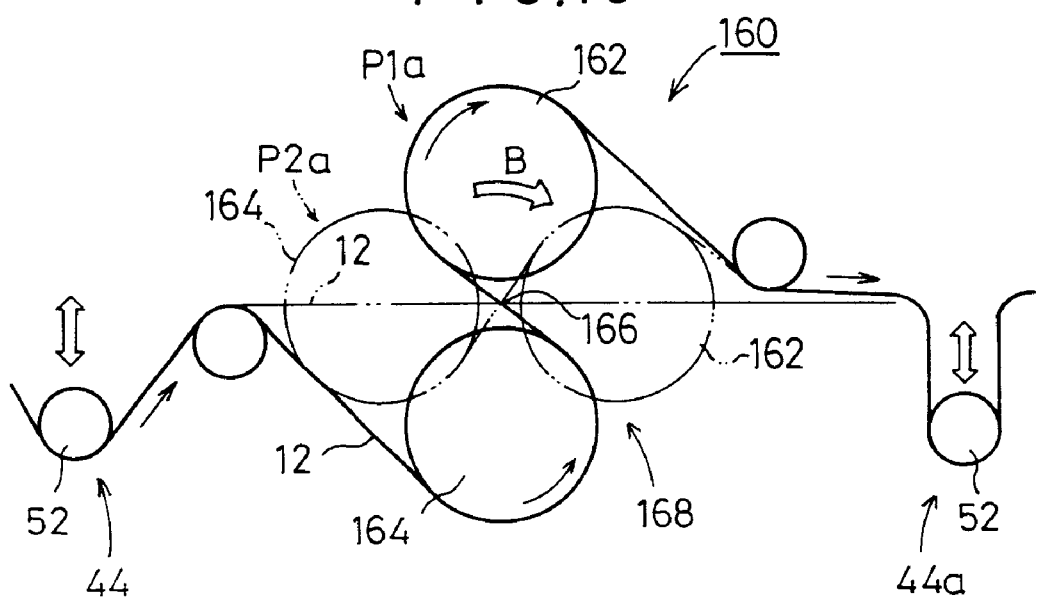
FIG. 13 is a schematic diagram for explaining the heating means composing the decurl apparatus according to a third embodiment of the invention.

FIG. 13 is a schematic diagram for explaining heating means 160 composing a decurl apparatus according to a third embodiment of the invention.

The heating means 160 is equipped with: first and second heating rollers 162 and 164 for lapping the image recording carrier web 12 thereon in the S-shape at a predetermined spacing from each other; and drive means 168 for turning the first and second heating rollers 162 and 164 integrally on a middle point 166 of the straight line joining the individual centers of the first and second heating rollers 162 and 164.

These first and second heating rollers 162 and 164 are heated like the heating roller 60 by the induction heating method to a temperature exceeding the glass transition temperature (Tg) of the support of the image recording carrier web 12. On the other hand, the drive means 168 is provided with the (not-shown) worm gear, as in the holding roller displacing means 144 composing the decurl apparatus 140 according to the second embodiment.

In the heating means 160 thus constructed, when the first and second heating rollers 162 and 164 are arranged at a position P1a, as indicated by solid lines, the image recording carrier web 12 is lapped within a predetermined range (of a lapping angle of 200 degrees, for example) around the first and second heating rollers 162 and 164 so that it is subjected to the heating treatment from its support side.

When the image recording carrier web 12 is transferred at a low velocity, the first and second heating rollers 162 and 164 are turned in the direction of arrow B to a position P2a through the drive means 168. This reduces the lapping angle of the image recording carrier web 12 with respect to the circumferences of the first and second heating rollers 162 and 164. When the facilities are stopped for troubles or emergencies, moreover, the image recording carrier web 12 can be removed from the circumferences of the first and second heating rollers 162 and 164 by turning these rollers 162 and 164 by 90 degrees in the direction of arrow B from the position P2a.

Figure 14:
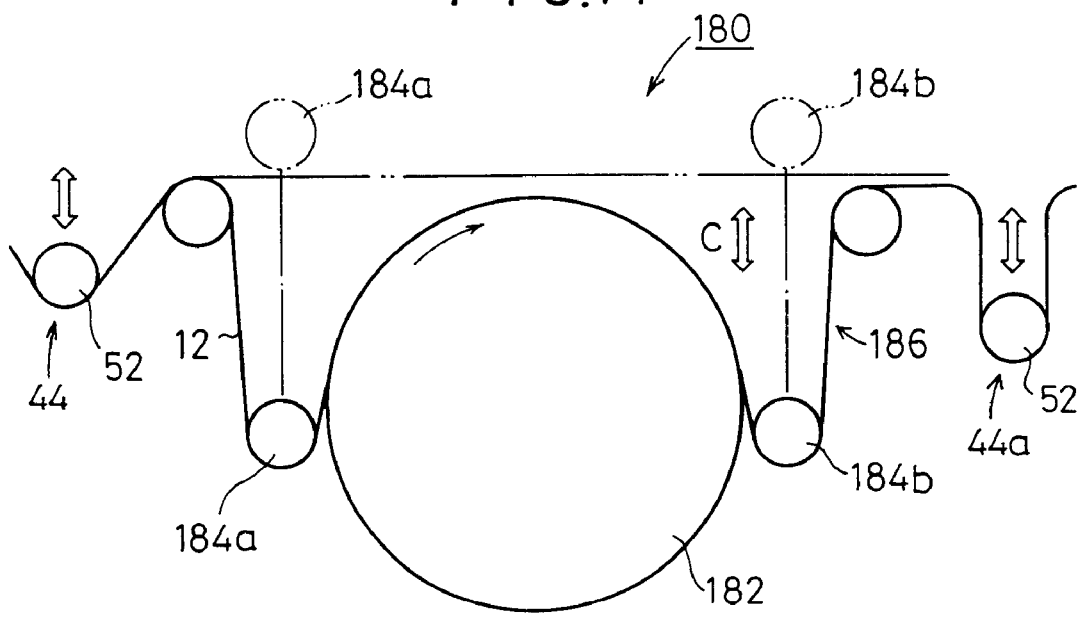
FIG. 14 is a schematic diagram for explaining the heating means composing the decurl apparatus according to a fourth embodiment of the invention.

FIG. 14 is a schematic diagram for explaining heating means 180 composing a decurl apparatus according to a fourth embodiment of the invention.

The heating means 180 is equipped with: a heating roller 182 adapted to be induction-heated; and holding rollers 184a and 184b enabled to move integrally in the direction of arrow C to and from the heating roller 182. These holding rollers 184a and 184b are integrally displaced back and forth through drive means 186. There is provided the (not-shown) ball screw which is connected to the servo motor, as in the path length adjusting means 44 composing the decurl apparatus 10 according to the first embodiment, for example.

In the heating means 180 thus constructed, the holding rollers 184a and 184b are displaced in the direction of arrow C under the action of the drive means 186 in accordance with the transfer velocity of the image recording carrier web 12 so that the lapping angle of the image recording carrier web 12 with respect to the circumference of the heating roller 182 is changed. As a result, the image recording carrier web 12 is always subjected to the heating treatment under constant conditions without being influenced by the fluctuation in the transfer velocity.

FIG. 15 is a schematic diagram for explaining heating means 200 composing a decurl apparatus according to a fifth embodiment of the invention.

The heating means 200 is equipped with a heating roller 202 and fixed type holding rollers 204a and 204b arranged across the heating roller 202, which can move back and forth in the direction of arrow D through drive means 206. This drive means 206 is equipped with the not-shown ball screw or the like, which is connected to the servo motor, for example.

In the heating means 200 thus constructed, the heating roller 202 moves back and forth in the direction of arrow D through the drive means 206 so that the lapping angle of the image recording carrier web 12 on the circumference of the heating roller 202 can be varied through the heating roller 202 and the holding rollers 204a and 204b.

Here in these third to fifth embodiments, the path length adjusting means 44 and 44a are arranged on the upstream and downstream sides of the heating means 160, 180 and 200 As a result, the change in the path length of the image recording carrier web 12 can be easily matched on the upstream and downstream sides of the heating means 160, 180 and 200.

FIG. 16 is a schematic diagram for explaining heating means 220 composing decurl apparatus according to a sixth embodiment of the invention.

The heating means 220 is equipped with a heating roller 222 and a holding roller 224, which can rock along the outer circumference of the heating roller 222 through drive means 226. This drive means 226 is constructed like the holding roller displacing means 72 which is incorporated into the decurl apparatus 10 according to the first embodiment, for example.

In the heating means 220 thus constructed, the holding roller 224 is arranged at a predetermined angular position through the holding roller displacing means 72 thereby to arbitrarily change the lapping angle of the image recording carrier web 12 on the circumference of the heating roller 222.

Figure 17:
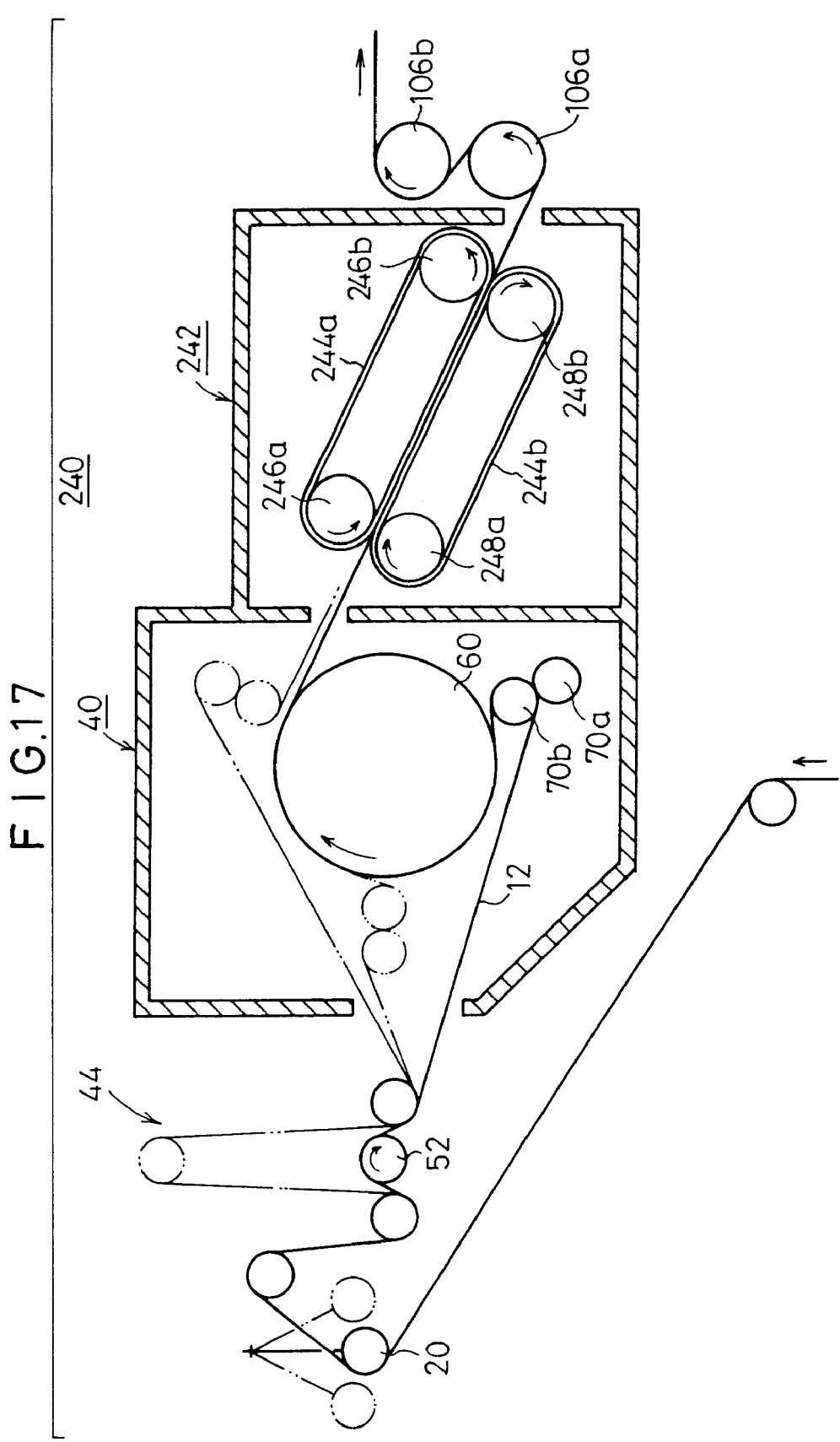
FIG. 17 is a schematic diagram for explaining the heating means composing the decurl apparatus according to a seventh embodiment of the invention.

FIG. 17 is a schematic diagram for explaining a decurl apparatus 240 according to a seventh embodiment of the invention. Here, the same components as those of the decurl apparatus 10 according to the first embodiment are designated by the common reference numerals, and their detailed description will be omitted.

The decurl apparatus 240 is provided with cooling means 242, which is equipped with endless steel belts 244a and 244b arranged to correspond to the both faces of the image recording carrier web 12. On the two ends of these steel belts 244a and 244b, there are arranged pulleys 246a, 246b, 248a and 248b.

In this construction, under the rotary actions of the pulleys 246a, 246b, 248a and 248b, the steel belts 244a and 244b come into contact with the both faces of the image recording carrier web 12 after heated, to transfer this image recording carrier web 12 to the cooling roller 106a while cooling it. As a result, the heated image recording carrier web 12 is cooled down, while being kept in the flat shape, to the glass transition temperature (Tg) or lower by the steel belts 244a and 244b so that it can be effectively prevented from being curled again.

Here, the first to seventh embodiments have been described by using the image recording carrier web 12 for manufacturing the X-ray film 28 as an image recording carrier, but a similar description applies to various sensitized photographic materials, heat-sensitive sheets of paper or pressure-sensitive sheets of paper.

Figure 18:
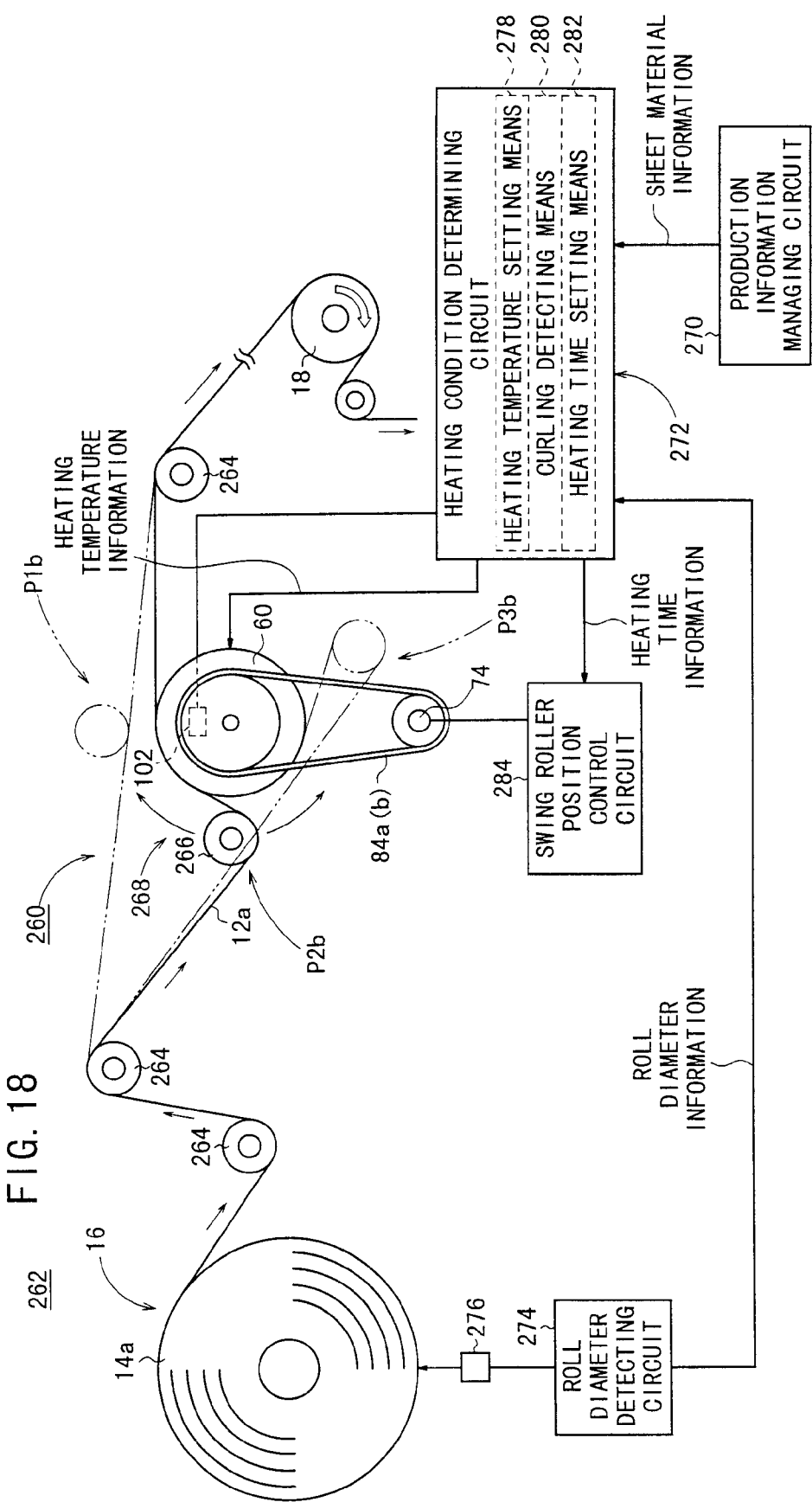
FIG. 18 is a diagram for explaining the schematic construction of a sheet material processing system into which a decurl apparatus according to an eighth embodiment of the invention is incorporated.

FIG. 18 is a diagram for explaining the schematic construction of a sheet material processing system 262 into which a decurl apparatus 260 according to an eighth embodiment of the invention is incorporated. Here, the same components as those of the sheet material processing system 11, into which the decurl apparatus 10 according to the first embodiment is incorporated, are designated by the common reference numerals, and their detailed description will be omitted.

This sheet material processing system 262 is constructed to include: the web unwinder 16, which is fitted with a rolled sheet material or roll paper 14a having the sheet paper web 12a rolled thereon for letting off the sheet paper web 12a from the roll paper 14a; the main feeding suction drum 18 for letting off the sheet paper web 12a at a predetermined velocity from the web unwinder 16; and the decurl apparatus 260 according to the eighth embodiment. Between the web unwinder 16 and the suction drum 18, there are arranged a plurality of guide rollers 264.

Figure 19:
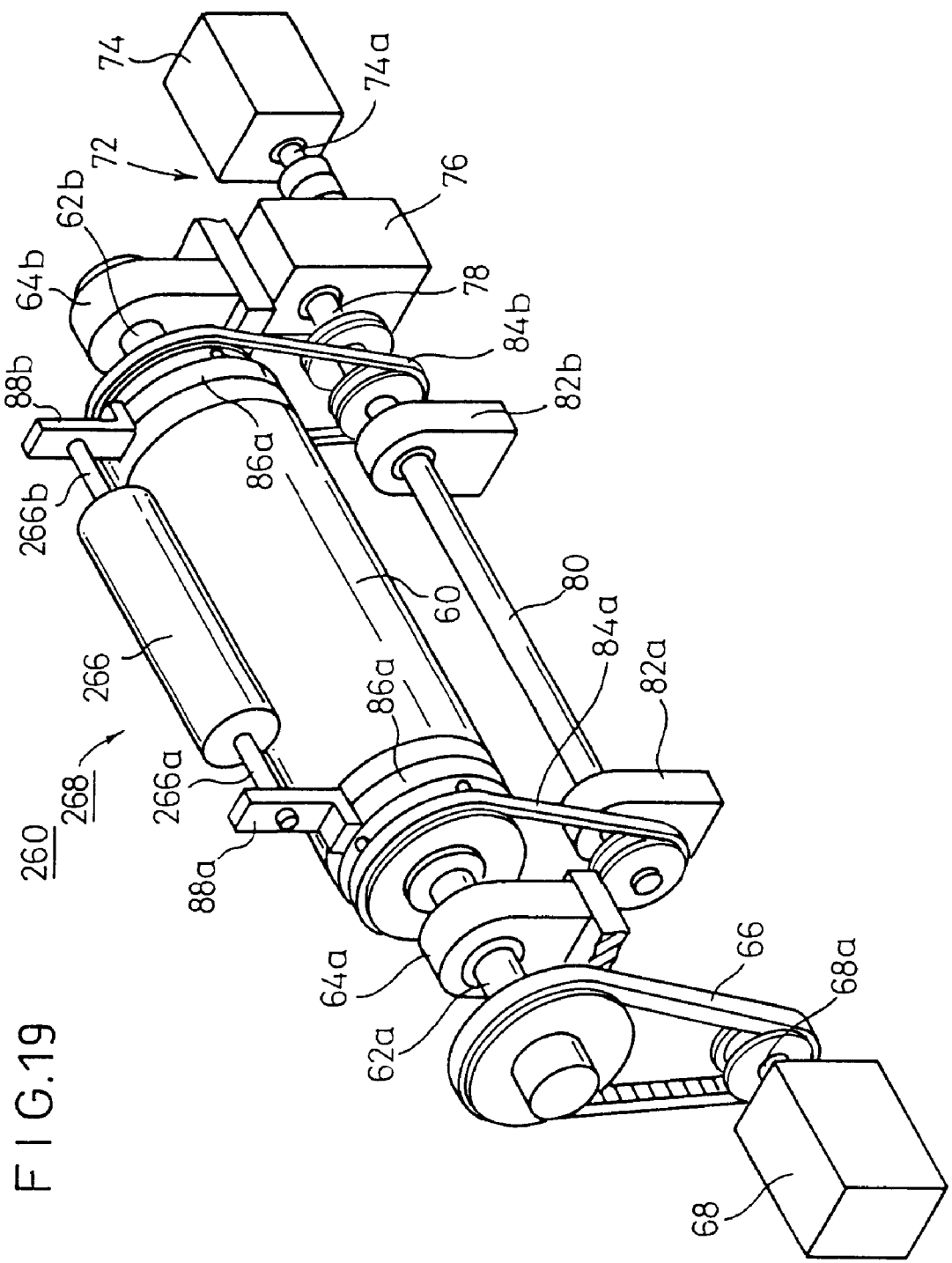
FIG. 19 is a perspective view for explaining a heating roller and a swing roller composing the decurl apparatus.
Figure 20:
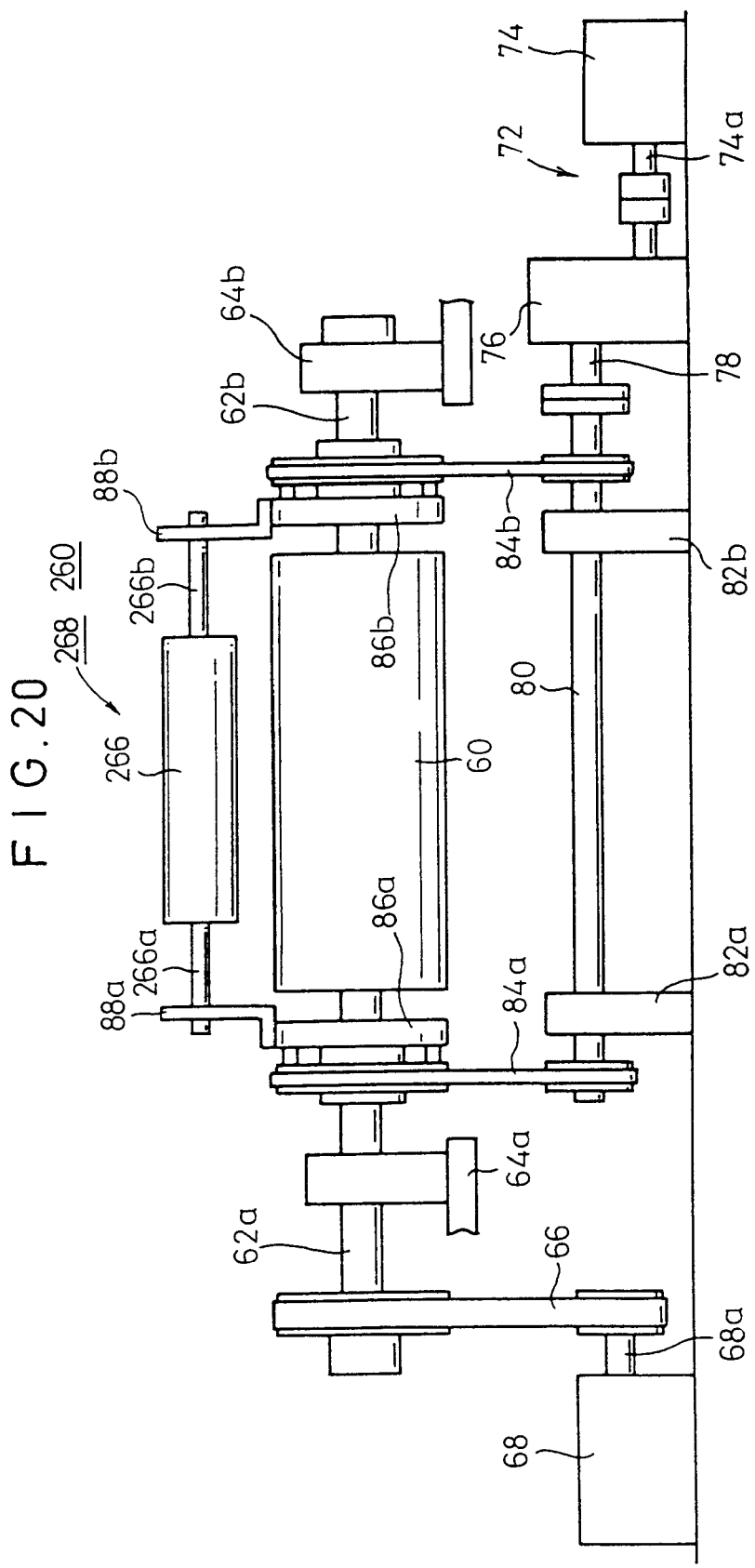
FIG. 20 is a side elevation for explaining the heating roller and the swing roller.

The decurl apparatus 260 is equipped, as shown in FIGS. 19 and 20, with the heating roller 60 which is induction-heated to heat the sheet paper web 12a. Around this heating roller 60, there is arranged a swing roller 266 for lapping the sheet paper web 12a around the heating roller 60 and for changing the lapping angle (or lapping time) of the sheet paper web 12a on the circumference of the heating roller 60 on the basis of the curl of the sheet paper web 12a.

The swing roller 266 is fixed at its two ends 266a and 266b on the mounting plates 88a and 88b and is so arranged to turn to a predetermined angular position with respect to the heating roller 60 through the swing roller drive means 72, which constructs lap means 268 together with the swing roller 266.

As shown in FIG. 18, the decurl apparatus 260 is equipped with a production information managing circuit 270 which is fed with sheet material information such as the quality or thickness of the roll paper 14a, and the sheet material information is transmitted from the production information managing circuit 270 to a heating condition determining circuit 272. With this heating condition determining circuit 272, there is connected a roll diameter detecting circuit (or roll diameter detecting means) 274 for detecting the roll diameter of the roll paper 14a arranged at the web unwinder 16. With the roll diameter detecting circuit 274, for example, there is connected a reflection type distance detecting sensor 276, which is arranged toward the center of the roll paper 14a with respect to the outer circumference of the roll paper 14a.

The heating condition determining circuit 272 is equipped with: heating temperature setting means 278 for setting the heating temperature of the heating roller 60 in advance on the basis of the sheet material information transmitted from the production information managing circuit 270; curl detecting means 280 for calculating the curl the roll paper 14a on the basis of the roll diameter information transmitted from the roll diameter detecting circuit 274; and heating time (or lapping time) setting means 282 for setting the time period for which the sheet paper web 12a is lapped on the circumference of the heating roller 60, in accordance with the curl. The heating condition determining circuit 272 transmits the preset heating temperature information to the heating roller 60 and controls the heating roller 60 in the feedback manner on the basis of the temperature of the heating roller 60, as detected by the temperature detecting sensor 102. With the heating condition determining circuit 272, there is connected a swing roller position control circuit 284 which is fed with the heating time information. The swing roller position control circuit 284 has a function to control the drive of the second servo motor 74 thereby to control the angular position of the swing roller 266.

Figure 21:
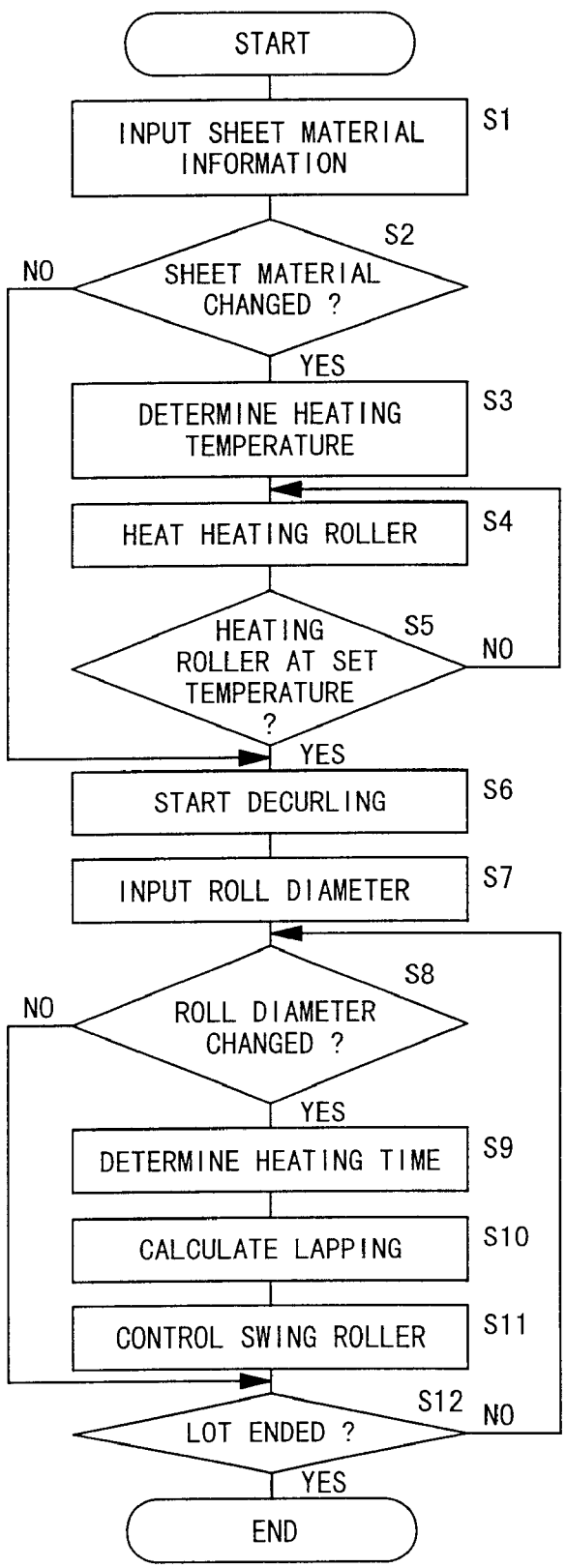
FIG. 21 is a flow chart for explaining a decurl method according to the invention.

The actions of the decurl apparatus 260 thus constructed will be described in the following in connection with the sheet material processing system 262 incorporating it, with reference to the flow chart shown in FIG. 21.

First of all, the sheet material information such as the quality or thickness of the roll paper 14a to be decurled is transmitted (at Step S1) from the production information managing circuit 270 to the heating condition determining circuit 272. In this heating condition determining circuit 272, it is decided (at Step S2) from the transmitted sheet material information whether or not the roll paper 14a has been changed. If it is decided that the roll paper 14a is different (that is, if the answer of Step S2 is YES), the routine advances to Step S3, at which the heating temperature of the heating roller 60, as corresponding to the roll paper 14a, is determined through the heating temperature setting means 278.

This heating temperature information is transmitted to the heating roller 60 so that the heating roller 60 is heated (at Step S4). The heated temperature of the heating roller 60 is detected through the temperature detecting sensor 102 so that the heating condition determining circuit 272 performs the feedback control on the basis of the detection signal from that temperature detecting sensor 102, to heat the heating roller 60 to the predetermined temperature.

If the heating roller 60 arrives at the set temperature (that is, if the answer of Step S5 is YES), the routine advances to Step S6, at which the decurl of the roll paper 14a is started. At this time, the roll diameter of the roll paper 14a is detected through the sensor 276 by the roll diameter detecting circuit 274, so that the roll diameter of the roll paper 14a is transmitted (at Step S7) to the heating condition determining circuit 272. In this heating condition determining circuit 272, it is decided (at Step S8), on the basis of the roll diameter information transmitted from the roll diameter detecting circuit 274, whether or not the diameter of the roll paper 14a has been changed.

If it is decided that the roll diameter has been changed (that is, if the answer of Step S8 is YES), the heating time setting means 282 determines the heating time of the heating roller 60, as corresponding to that roll diameter (at Step S9), so that the determined heating time is transmitted to the swing roller position control circuit 284. In this swing roller position control circuit 284, on the basis of the determined heating time, the lapping of the sheet paper web 12a on the circumference of the heating roller 60 is calculated (at Step S10), and the swing roller 266 is moved to the predetermined position (at Step S11). And, the sheet paper web 12a, as left off from the web unwinder 16, is decurled throughout its entire length (at Step S12).

Figure 22:
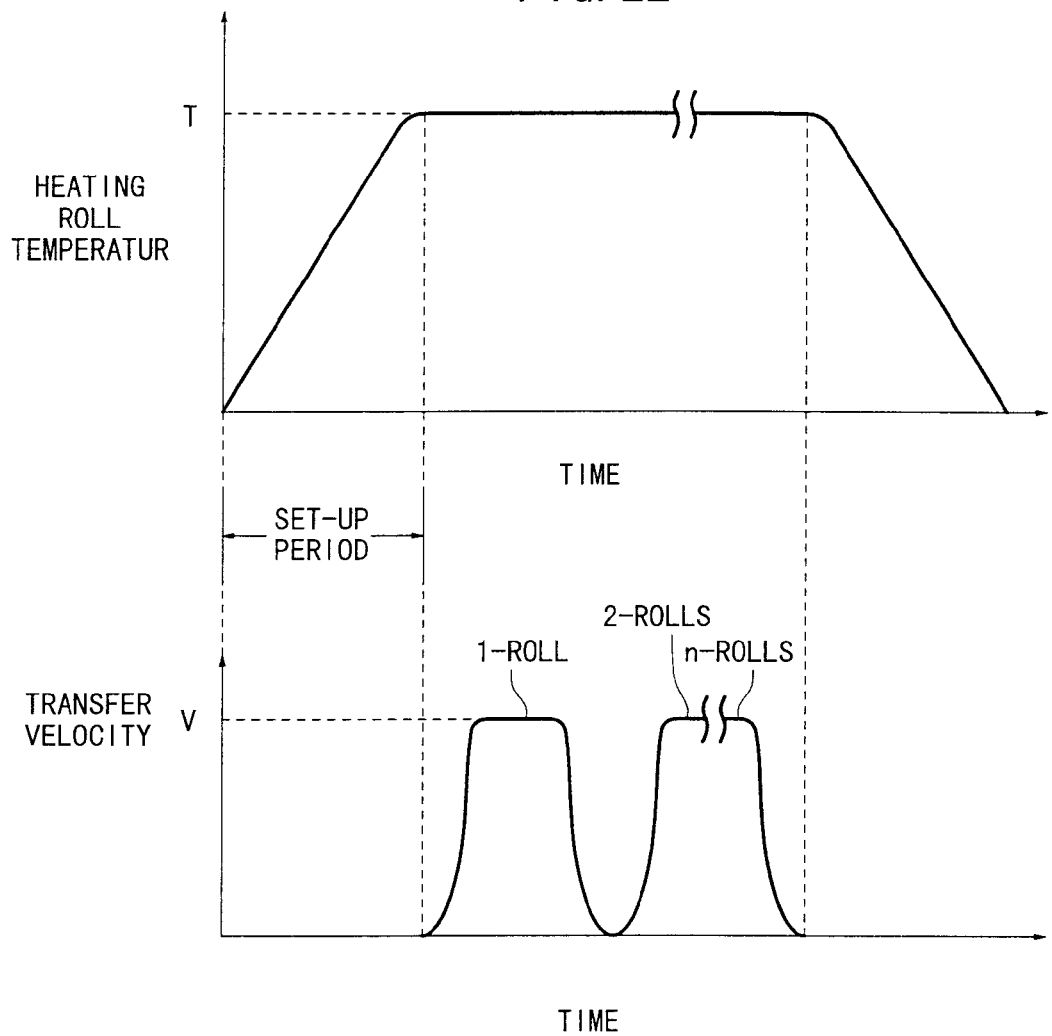
FIG. 22 is a diagram for explaining the heating state of the heating roller and the timing to start the decurl.

Here will be described in detail the decurl treatment of the roll paper 14a. As illustrated in FIG. 22, the roll paper 14a is not decurled for a set-up period while the heating roller 60 is heated to a predetermined temperature T. Therefore, the swing roller 266 is arranged at position P1b in FIG. 18, and the sheet paper web 12a leaves the circumference of the heating roller 60 so that it is not unnecessarily heated through the heating roller 60.

When the heating roller 60 reaches the predetermined temperature T, therefore, there is started the decurl treatment of the roll paper 14a of the first roll. As this roll paper 14a is accelerated in its transfer velocity from a lower value under the rotary action of the suction drum 18, the first servo motor 68 is driven in synchronism with the suction drum 18, and the second servo motor 74 is also driven.

When the second servo motor 74 is driven, as shown in FIGS. 19 and 20, the rotary shaft 80 is rotated through the drive shaft 74a, the reduction mechanism 76 and the output shaft 78. To the rotary shaft 80, there are connected through the belt/pulleys 84a and 84b the turning discs 86a and 86b, by which the swing roller 266 is supported under the rotary action of the rotary shaft 80. The swing roller 266 is arranged at a predetermined angular position (as should be referred to position P2b in FIG. 18) with respect to the outer circumference of the heating roller 60. As a result, the sheet paper web 12a, as held on the outer circumference of the swing roller 266, is lapped at the predetermined lapping angle on the circumference of the heating roller 60.

Figure 23:
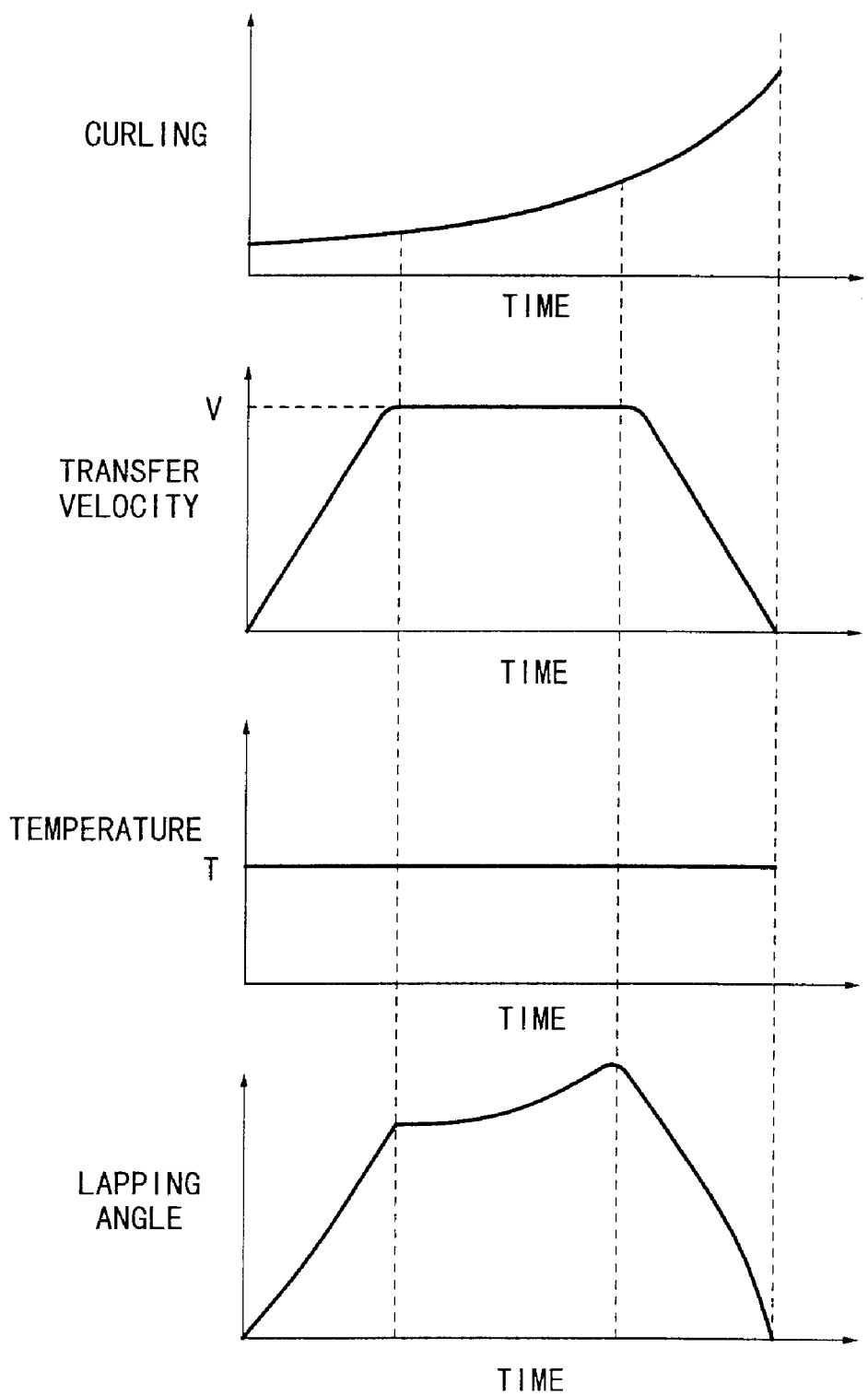
FIG. 23 is a diagram for explaining a curl, a transfer velocity, a temperature and a lapping angle.

In this case, the sheet paper web 12a, as let off from the web unwinder 16, is so curled the more toward the rolled center of the roll paper 14a that the curl in one roll of the roll paper 14a is illustrated in FIG. 23. In the eighth embodiment, therefore, the heating roller 60 is rotated at a constant transfer velocity V, and the lapping of the sheet paper web 12a on the outer circumference of the heating roller 60, i.e., the angular position of the swing roller 266 is changed according to the change in the curl.

As a result, the swing roller 266 is arranged between the position P2b and a predetermined angular position P3b with respect to the outer circumference of the heating roller 60 so that the lapping angle of the sheet paper web 12a is enlarged to elongate the time period, i.e., the heating time for which the sheet paper web 12a is in sliding contact with the heating roller 60.

Thus in the eighth embodiment, the heating temperature of the heating roller 60 is preset on the basis of the sheet material information such as the quality or thickness of the roll paper 14a. With the heating roller 60 being kept at the predetermined temperature T, according to the curl (or curl extent) of the roll paper 14a, the heating time of the sheet paper web 12a, i.e., the lapping angle of the sheet paper web 12a on the outer circumference of the heating roller 60 is changed to decurl the sheet paper web 12a (as should be referred to FIG. 23).

It is, therefore, sufficient to control the angular position of the swing roller 266 according to the curl of the roll paper 14a. There can be attained the effects that the heating time of the sheet paper web 12a can be controlled highly responsively and accurately, and that the sheet paper web 12a can be reliably decurled. At this time, the swing roller 266 has a rocking axis aligned with the rotating axis of the heating roller 60. This alignment raises an advantage that the angular position control of the swing roller 266 can be drastically simplified.

Moreover, the heating temperature, as might otherwise be difficult to control in responsiveness and precision, of the heating roller 60 is kept at a constant level. This raises other effects that the control of the entire decurl apparatus 260 can be made easily and efficiently, and that the construction of the decurl apparatus 260 can be made simple and economical. Without heating the sheet paper web 12a excessively, on the other hand, it is possible to block the degradation of the sheet paper web 12a.

Here, the eighth embodiment has been described by using the roll paper 14a as the rolled sheet material, but a similar description could apply to various sheet materials of image recording carriers such as heat-sensitive sheets of paper or pressure-sensitive sheets of paper.

Figure 24:
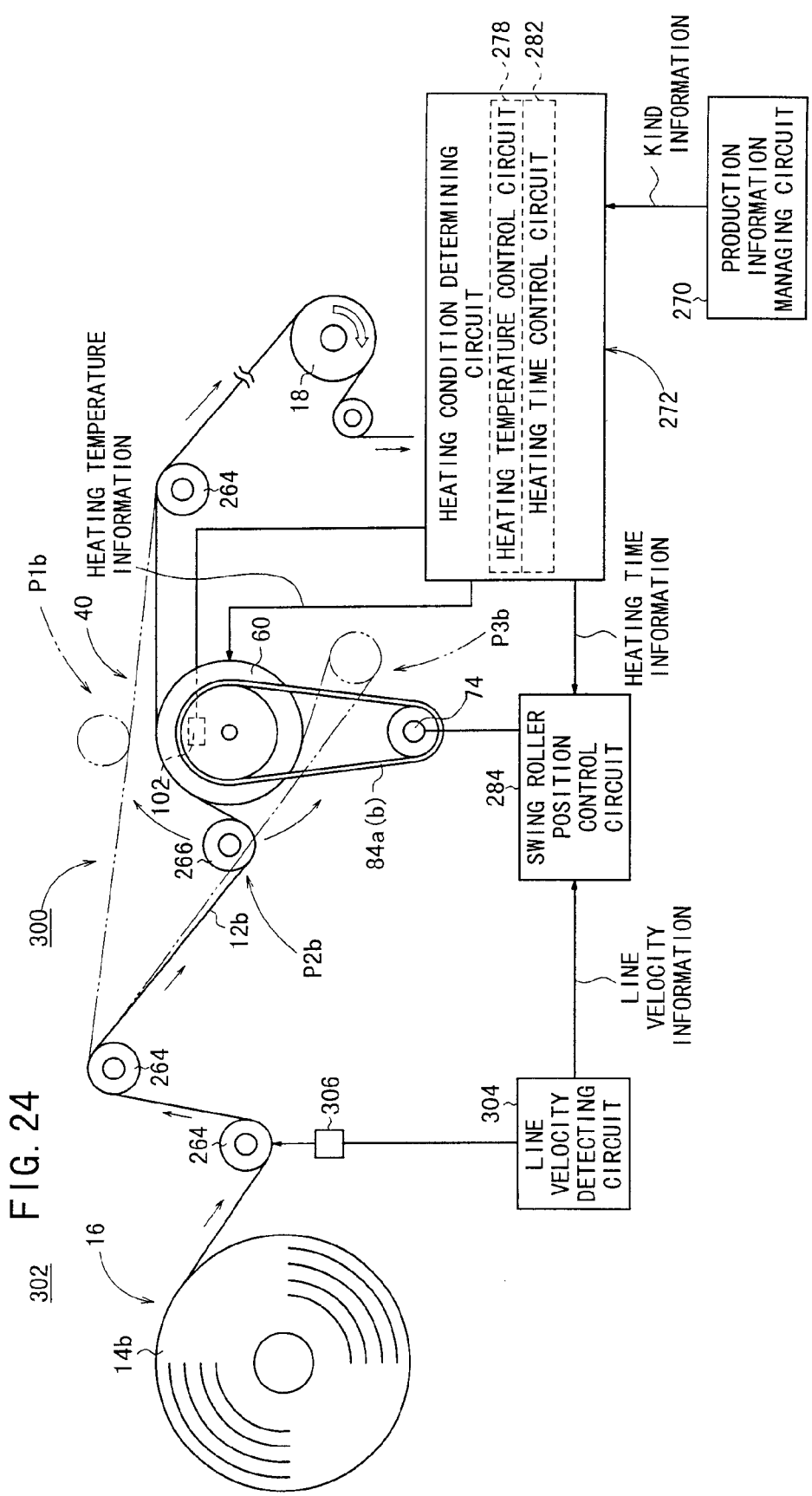
FIG. 24 is a diagram for explaining the schematic construction of a recording medium processing system into which a decurl apparatus according to a ninth embodiment of the invention is incorporated.

FIG. 24 is a diagram for explaining the schematic construction of a sheet material processing system 302 into which a decurl apparatus 300 according to a ninth embodiment of the invention is incorporated. Here, the same components as those of the sheet material processing system 262, into which the decurl apparatus 260 according to the eighth embodiment is incorporated, are designated by the common reference numerals, and their detailed description will be omitted.

In this sheet material processing system 302, there is used a recording medium web having a polymer support, such as a rolled photosensitive material 14b having a photosensitive material web 12b rolled thereon.

The decurl apparatus 300 is equipped with the production information managing circuit 270, to which the kind information of the rolled photosensitive material 14b is inputted and from which the kind information is transmitted to the heating condition determining circuit (or heating condition determining means) 272. This heating condition determining circuit 272 has a function to preset the heating conditions including the heating temperature and the heating time of the photosensitive material web 12b on the basis of the kind of the photosensitive material web 12b.

With the swing roller position control circuit 284, there is connected a line velocity detecting circuit 304 for detecting the transfer velocity (or line velocity) of the photosensitive material web 12b, as let off from the rolled photosensitive material 14b arranged at the web unwinder 16. With the line velocity detecting circuit 304, for example, there is connected a rotary encoder 306, which is fitted on the (not-shown) rotary shaft of the guide roller 264 to rotate in sliding contact with the photosensitive material web 12b.

The heating condition determining circuit 272 is equipped with: the heating temperature control circuit (or heating temperature control means) 278 for controlling the heating temperature of the heating roller 60 on the basis of the kind information transmitted from the production information managing circuit 270; and the heating time control circuit (or heating time control means) 282 for controlling the lapping time (or heating time) for which the photosensitive material web 12b is lapped on the circumference of the heating roller 60. The heating condition determining circuit 272 transmits the preset heating temperature information to the heating roller 60 and controls the heating roller 60 in the feedback manner on the basis of the temperature of the heating roller 60, as detected by the temperature detecting sensor 102.

With the heating condition determining circuit 272, there is connected the swing roller position control circuit 284, to which the heating time information is transmitted. The swing roller position control circuit 284 has a function to control the drive of the second servo motor 74 thereby to control the angular position of the swing roller 266.

Figure 25:
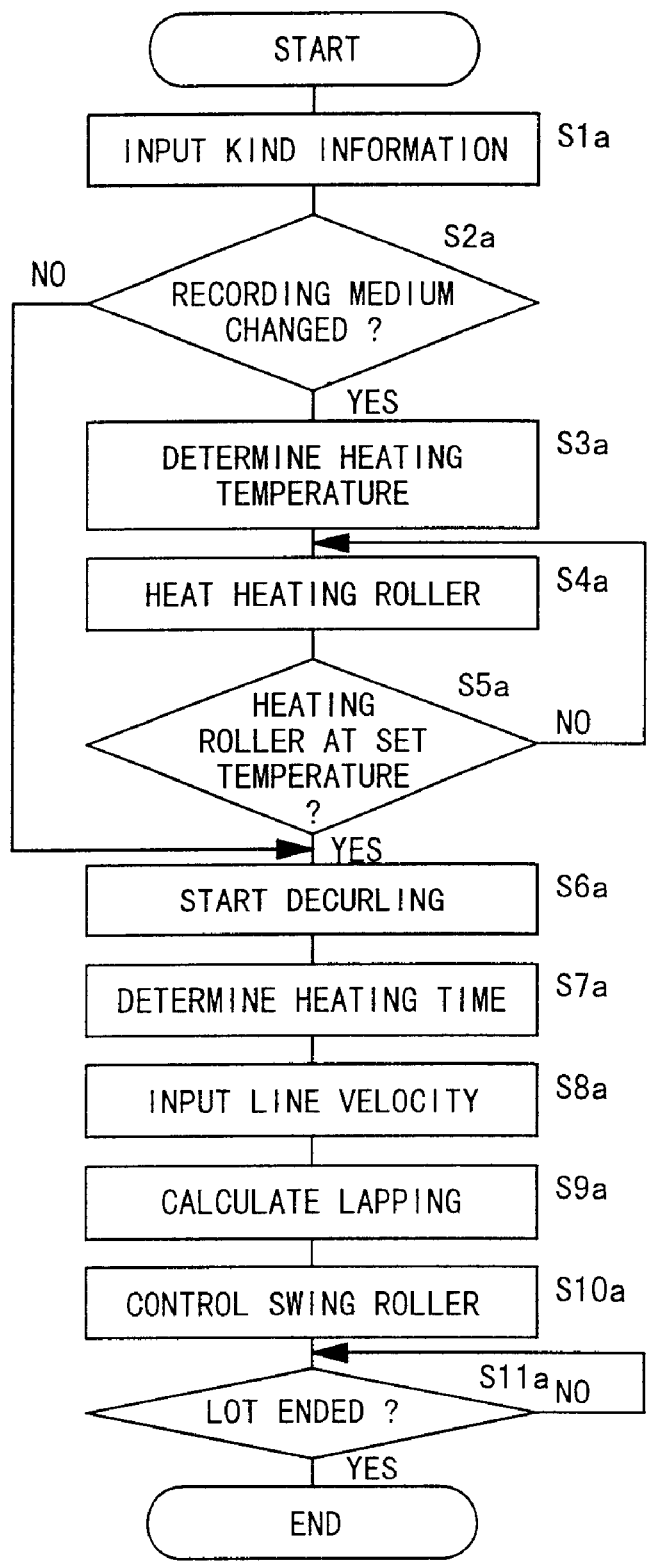
FIG. 25 is a flow chart for explaining a deformation correcting method according to the invention.

The actions of the decurl apparatus 300 thus constructed will be described in the following in connection with the sheet material processing system 302 incorporating the decurl apparatus 300, with reference to the flow chart shown in FIG. 25.

First of all, the production information managing circuit 270 is registered in advance with the corresponding information between the kinds and the heating conditions on the basis of the kind of the rolled photosensitive material 14b to be decurled, as shown in FIG. 26.

The photosensitive material web 12b is different in the heat resistance of the photosensitive layer in dependence upon its kind and is so seriously influenced by the temperature that its degradation is instantly caused if the allowable temperature is exceeded but that the longer heating can be allowed for the lower temperature. In order to decurl the photosensitive material web 12b, on the other hand, for the higher heating temperature, the treatment is executed for the shorter time period so that the higher temperature is the more suited for making the entire facilities compact and for a high-speed treatment. Therefore, the heating temperature and the heating time are set individually for the desired decurl effect by setting the heating temperature as high as possible within the range capable of avoiding the influences on the quality for the individual kinds of the photosensitive material webs 12b.

In FIG. 26, there are exemplified as the kinds of the photosensitive materials three types of photosensitive types of: a dry photosensitive material (Dry); a wet photosensitive material having a photosensitive layer on one side (Wet, Single); and a wet photosensitive material having photosensitive layers on two sides (Wet, Double), and their individual heating temperatures and times are registered in advance.

Thus, the kind information of the rolled photosensitive material 14b is transmitted from the production information managing circuit 270 to the heating condition determining circuit 272 (at Step S1a). In the heating condition determining circuit 272, it is decided (at Step S2a) from the transmitted kind information whether or not the kind of the rolled photosensitive material 14b has been changed. If it is decided that the rolled photosensitive material 14*b* is of a different kind (that is, if the answer of Step S2*a* is YES), the routine advances to Step S3*a*, at which the heating temperature of the heating roller 60 according to the kind of the rolled photosensitive material 14*b* is determined.

This heating temperature information is transmitted to the heating roller 60 to heat the heating roller 60 (at Step S4*a*). The heating temperature of the heating roller 60 is detected through the temperature detecting sensor 102, and the heating temperature control circuit 278 performs the feedback control on the basis of the detection signal from the temperature detecting sensor 102, to heat the heating roller 60 to the predetermined temperature.

If the heating roller 60 reaches the set temperature (that is, if the answer of Step S5*a* is YES), the routine advances to Step S6*a*, at which the decurl of the rolled photosensitive material 14*b* is started. At this time, the heating time information of the photosensitive material web 12*b* is transmitted from the heating time control circuit 282 to the swing roller position control circuit 284 (at Step S7*a*), and the transfer velocity (or line velocity) of the photosensitive material web 12*b* is detected by the line velocity detecting circuit 304 so that it is transmitted to the swing roller position control circuit 284 (at Step S8*a*).

In the swing roller position control circuit 284, on the basis of the determined heating time and the detected transfer velocity, the lapping of the photosensitive material web 12*b* on the circumference of the heating roller 60 is calculated (at Step S9*a*), and the swing roller 266 is moved to a predetermined position (at Step S10*a*). And, the photosensitive material web 12*b*, as let off from the web unwinder 16, is decurled throughout its length (at Step S11*a*). The decurl of the rolled photosensitive material 14*b* is similar to that of the eighth embodiment, and its detailed description will be omitted.

In the ninth embodiment, the heating temperature and the heating time of the heating roller 60 are predetermined on the basis of the kind information of each rolled photosensitive material 14*b*. When the kind of the rolled photosensitive material 14*b* to be decurled is inputted, the photosensitive material web 12*b* is decurled according to the heating temperature and the heating time for that kind. Even when the heat resistance of the recording layer is different according to the kind of the photosensitive material web 12*b*, therefore, this photosensitive material web 12*b* can be promptly heated at such a temperature without affecting the quality. As a result, the desired decurl effect can be achieved while retaining a satisfactory quality without causing the degradations such as the thermal fogging, the color tone fluctuation or the crack in the photosensitive material web 12*b*.

Moreover, it is sufficient to control the angular position of the swing roller 266 in accordance with the kind of the rolled photosensitive material 14*b*. The heating time of the photosensitive material web 12*b* can be controlled highly responsively and accurately without being influenced by the running situation of the decurl apparatus 300. There can be attained an advantage that the photosensitive material web 12*b* is reliably decurled.

Here, the ninth embodiment has been described by using the rolled photosensitive material 14*b*, but the invention should not be limited thereto but could be applied to the various recording media having a polymer support.

In the ninth embodiment. on the other hand, there is provided the heating roller 60 which composes the heating means 40 and which is induction-heated to heat the photosensitive material web 12*b*. This photosensitive material web 12*b* is decurled by lapping it on the circumference of the heating roller 60, which could be replaced by heating means having a flat heating face. This is because the photosensitive material web 12*b* has the polymer support so that it can be effectively decurled if it is heated to the glass transition temperature (Tg) or higher of the polymer support.

Figure 27:
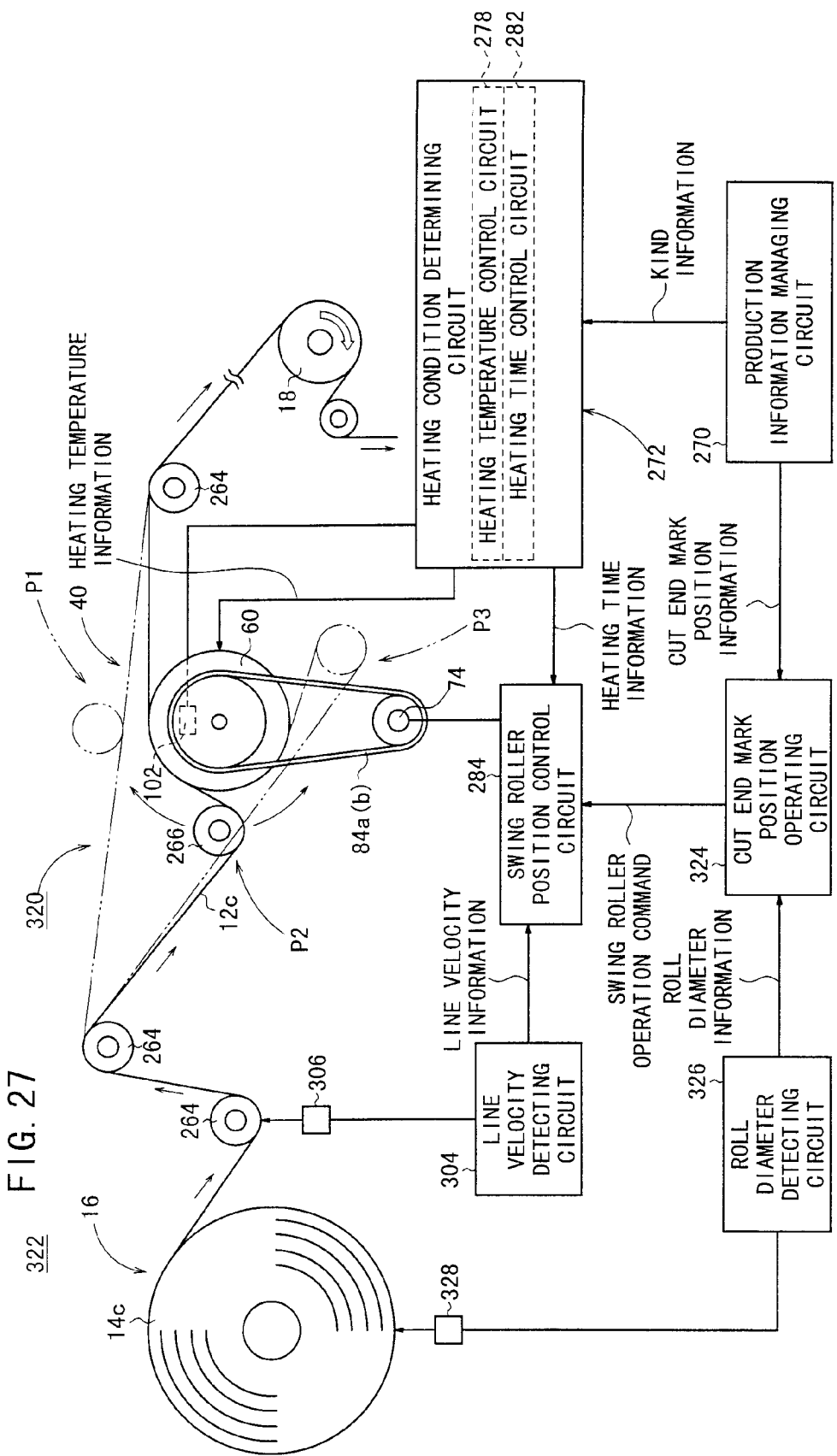
FIG. 27 is a diagram for explaining the schematic construction of a sheet material processing system into which a deformation correcting apparatus according to a tenth embodiment of the invention is incorporated.

FIG. 27 is a diagram for explaining the schematic construction of a sheet material processing system 322 into which a deformation correcting apparatus 320 according to a tenth embodiment of the invention is incorporated. Here, the same components as those of the sheet material processing system 302, into which the decurl apparatus 300 according to the ninth embodiment is incorporated, are designated by the common reference numerals, and their detailed description will be omitted. In this sheet material processing system 322, there is employed a rolled support 14*c* having a raw material such as a polymer support (or polymer sheet material) web 12*c* rolled thereon.

To the swing roller position control circuit (or swing roller position control means) 284, there is inputted a swing roller operation command from a cut end mark position calculating circuit (or deformed position operating means) 324. To this cut end mark position calculating circuit 324, there is transmitted not only the cut end mark position information of the rolled support 14*c* from the production information managing circuit 270 but also the roll diameter information from a roll diameter detecting circuit 326. This roll diameter detecting circuit 326 is arranged around the rolled support 14*c* and is connected with a sensor such as a distance sensor 328 for detecting the roll diameter of the rolled support 14*c*.

The cut end mark position calculating circuit 324 is based on the cut end mark position information (or displaced position information) and the roll diameter information (or remainder information) of the rolled support 14*c*, to calculate the cut end mark position (or deformed position) of the rolled support 14*c*, and transmits the swing roller operation command to the swing roller position control circuit 284 at the timing for the cut end mark position of the polymer support web 12*c* to reach the heating roller 60. This swing roller position control circuit 284 controls the drive of the second servo motor 74 thereby to control the angular position of the swing roller 266.

Figure 28:
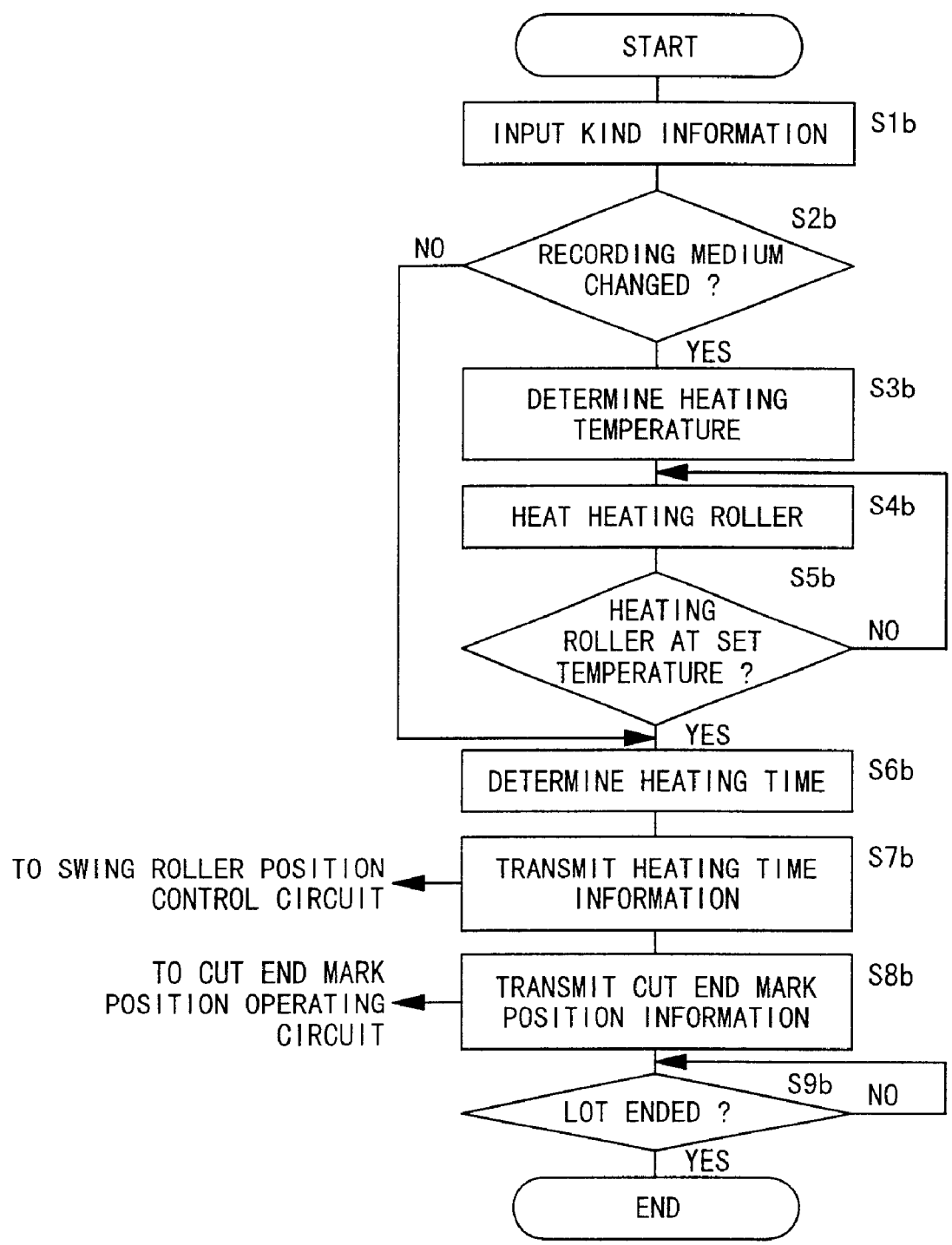
FIG. 28 is a flow chart for explaining the deformation correcting method according to the invention.

The actions of the deformation correcting apparatus 320 thus constructed will be described in the following in connection with the sheet material processing system 322 incorporating it, with reference to the flow charts shown in FIGS. 28 to 30.

First of all, the heating condition determining circuit 272 is registered in advance with the corresponding information of the kinds and heating conditions on the basis of the kind (such as the material or thickness) of the rolled support. Thus, the kind information of the rolled support 14*c* is transmitted from the production information managing circuit 270 to the heating condition determining circuit 272 (at Step S1*b*). In the heating condition determining circuit 272, it is decided (at Step S2*b*) from the transmitted kind information whether or not the kind of the rolled support 14*c* has been changed. If it is decided that the rolled support 14*c* is of a different kind (that is, if the answer of Step S2*b* is YES), the routine advances to Step S3*b*, at which the heating temperature of the heating roller 60 according to the kind of the rolled support 14*c* is determined.

This heating temperature information is transmitted to the heating roller 60 to heat the heating roller 60 (at Step S4*b*). The heating temperature of the heating roller 60 is detected through the temperature detecting sensor 102, and the heating temperature control circuit 278 performs the feedback control on the basis of the detection signal from the temperature detecting sensor 102, to heat the heating roller 60 to the predetermined temperature (at Step S5b).

If the heating roller 60 reaches the set temperature (that is, if the answer of Step S5b is YES), the routine advances to Step S6b, at which the heating time of the polymer support web 12c is determined, and this heating time information is transmitted from the heating time control circuit 282 to the swing roller position control circuit 284 (at Step S7b). On the other hand, the cut end mark position information is transmitted from the production information managing circuit 270 to the cut end mark position calculating circuit 324 (at Step S8b).

Figure 29:
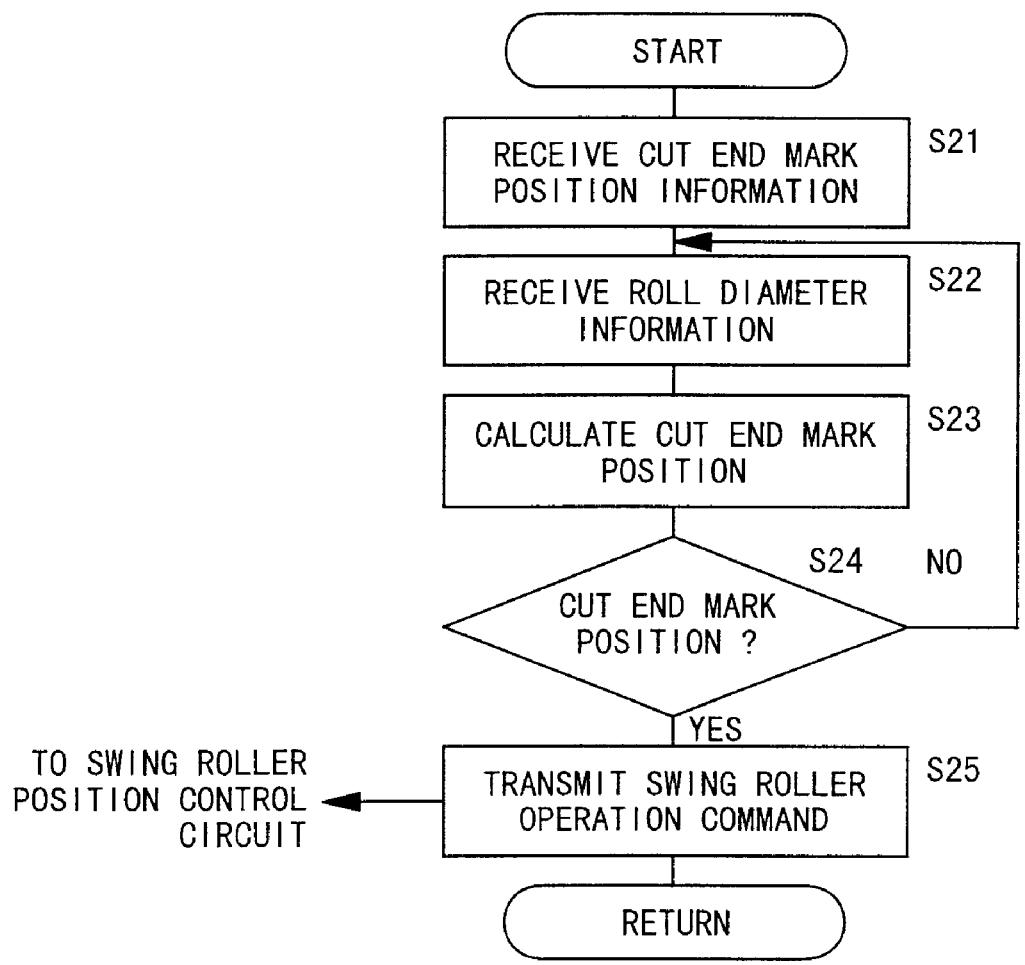
FIG. 29 is a flow chart for explaining the actions of a cut end mark position operating circuit in the deformation correcting method.

In this cut end mark position calculating circuit 324, as shown in FIG. 29, the cut end mark position information is received (at Step S21), and the roll diameter (or remainder) information of the rolled support 14c is transmitted from the roll diameter detecting circuit 326 (at Step S22). On the basis of the cut end mark position information and the roll diameter information, the cut end mark position calculating circuit 324 calculates the cut end mark position of the rolled support 14c, i.e., the cut end mark position arriving timing on the heating roller 60 (at Step S23). When the cut end mark position or the deformed portion of the polymer support web 12c arrives at the heating roller 60 (that is, if the answer of Step S24 is YES), moreover, the routine advances to Step S25, at which the swing roller operation command is transmitted to the swing roller position control circuit 284.

Figure 30:
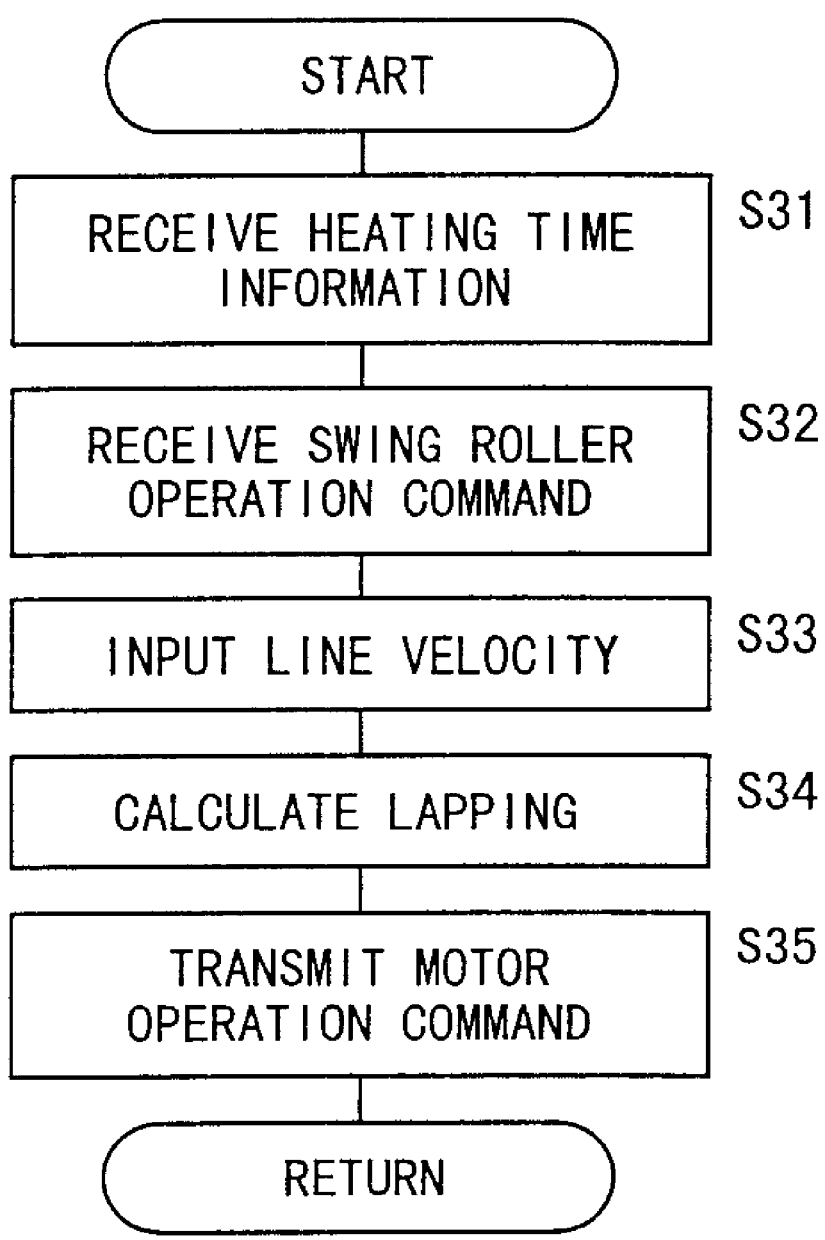
FIG. 30 is a flow chart for explaining the actions of a swing roller position control circuit in the deformation correcting method.

In the swing roller position control circuit 284, as shown in FIG. 30, when the heating time information is received from the heating condition determining circuit 272 (at Step S31) and when the swing roller operation command is received from the cut end mark position calculating circuit 324 (at Step S32), the routine advances to Step S33, at which the line velocity information is inputted from the line velocity detecting circuit 274. Next, on the basis of this line velocity and the received heating time information, the lapping angle (or lapping) of the polymer support web on the heating roller 60 is calculated (at Step S34), and the motor operation command is transmitted to the second servo motor 74 (at Step S35).

As a result, the polymer support web 12c, as held on the outer circumference of the swing roller 266, is lapped at the cut end mark portion at the predetermined lapping angle on the circumference of the heating roller 60. Moreover, the operations thus far described are performed over the entire length of the polymer support web 12c, as let off from the web unwinder 16, so that its deformation is corrected (at Step S9b in FIG. 28).

In the tenth embodiment, on the basis of the kind information of the rolled support 14c, there are set the deformation correcting heating conditions including the heating temperature and the heating time of the heating roller 60. Next, in dependence upon the cut end mark position operated by the cut end mark position calculating circuit 324, i.e., upon the cut end mark arriving timing, the swing roller position control circuit 284 is driven to correct the deformation of the polymer support web 12c.

Even when the polymer support web 12c is different in its material or thickness, therefore, it is possible to ensure the detection of the cut end mark position of the polymer support web 12c. As a result, there can be attained an effect that only the cut end mark portion can be homogeneously heated under the desired conditions, to flatten the entire polymer support web 12c easily and reliably.

Moreover, several turns in the vicinity of the roll core need not be dumped to improve the production yield effectively and economically, and the polymer support web 12c is prevented from being overheated to cause no elongation. In addition, when the recording layer is applied to the polymer support web 12c, no coating unevenness application is not caused by cut and mark, thereby to give rise to an advantage that recording media of high qualities can be efficiently produced.

In the tenth embodiment, still moreover, the swing roller position control circuit 284 controls the drive of the second servo motor 74 on the basis of the line velocity information of the polymer support web 12c and the preset heating time information. In response to the change in the line velocity and the line stop, therefore, the heating condition of the polymer support web 12c can be promptly changed to block the trouble of excessively heating the polymer support web 12c thereby to cause no degradation of the polymer support web 12c.

Moreover, it is sufficient to control the angular position of the swing roller 266 in accordance with the kind of the rolled support 14c. The heating time of the polymer support web 12c can be controlled highly responsively and accurately without being influenced by the running situation of the deformation correcting apparatus 320. There can be attained an advantage that the polymer support web 12c is reliably corrected in its deformation.

Here in the tenth embodiment, in order to detect the remainder of the rolled support 14c, the roll diameter of the rolled support 14c is detected through the distance sensor 328, but the remainder of the rolled support 14c could be detected from the change in the rotating speed or the like of the rolled support 14c. Here, the tenth embodiment has been described by using the rolled support 14c, but the invention should not be limited thereto but could be applied to the various polymer sheet materials.

Figure 31:
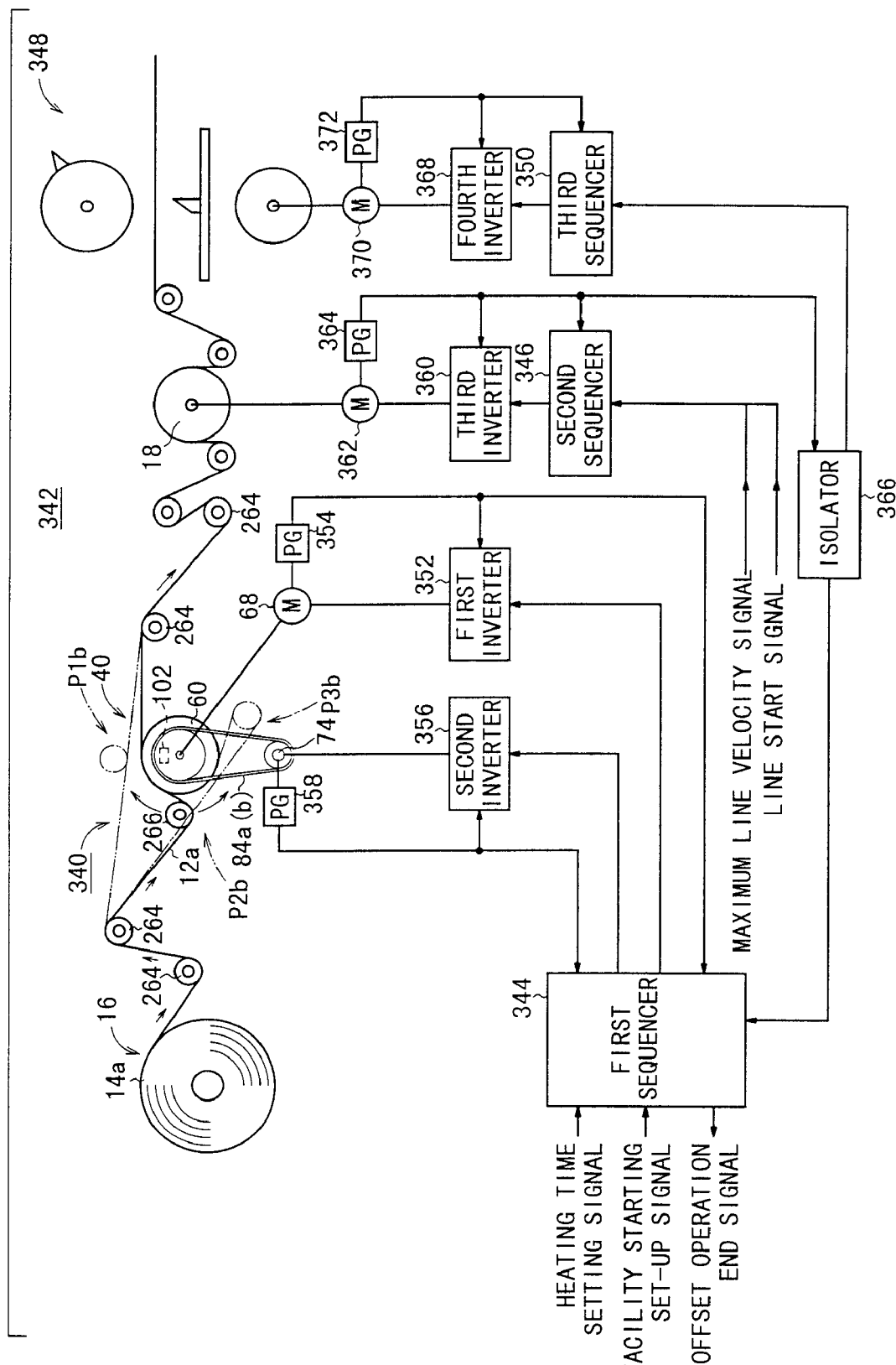
FIG. 31 is a diagram for explaining the schematic construction of a sheet material processing system into which a decurl apparatus according to an eleventh embodiment of the invention is incorporated.

FIG. 31 is a diagram for explaining the schematic construction of a sheet material processing system 342 into which a decurl apparatus 340 according to an eleventh embodiment of the invention is incorporated. Here, the same components as those of the sheet material processing system 262, into which the decurl apparatus 260 according to the eighth embodiment is incorporated, are designated by the common reference numerals, and their detailed description will be omitted.

The decurl apparatus 340 is constructed to include: a decurl first sequencer (or control means) 344 for controlling the drives of the heating roller 60 and the swing roller 266; a driving second sequencer 346 for controlling the drive of the suction drum 18; and a cutting third sequencer 350 for controlling the drive of cutter means 348. The heating time setting signal and facility starting set-up signal are inputted from the not-shown facility sequencer to the first sequencer 344, which transmits the offset operation end signal of the swing roller (or support means) 266 to the facility sequencer.

With the first sequencer 344, there is connected through a first inverter 352 the first servo motor 68, which is equipped with a first pulse generator 354 for detecting the rotary pulse (or rotating speed) of the heating roller 60. With the first sequencer 344, there is connected through a second inverter 356 the second servo motor 74, which is equipped with a second pulse generator (or position detecting means) for detecting the position of the swing roller 266.

The second sequencer 346 is equipped with a third inverter 360, with which a third servo motor 362 for rotating the suction drum 18 is connected. This third servo motor 362 is equipped with a third pulse generator (or line velocity detecting means) 364 for detecting the rotary pulse of the suction drum 18, i.e., the transfer velocity of the sheet paper web 12a. The rotary pulse, as detected by the third pulse generator 364, is transmitted as a main feed rotary pulse signal through an isolator 366 to the first and third sequencers 344 and 350. To the second sequencer 346, there are inputted the maximum line velocity signal and the line start signal from the not-shown facility sequencer.

The third sequencer 350 is equipped with a fourth servo motor 370 for driving and controlling the cutter means 348 through a fourth inverter 368, and the fourth servo motor 370 is equipped with a fourth pulse generator 372 for detecting the position information of the cutter means 348.

Figure 32:
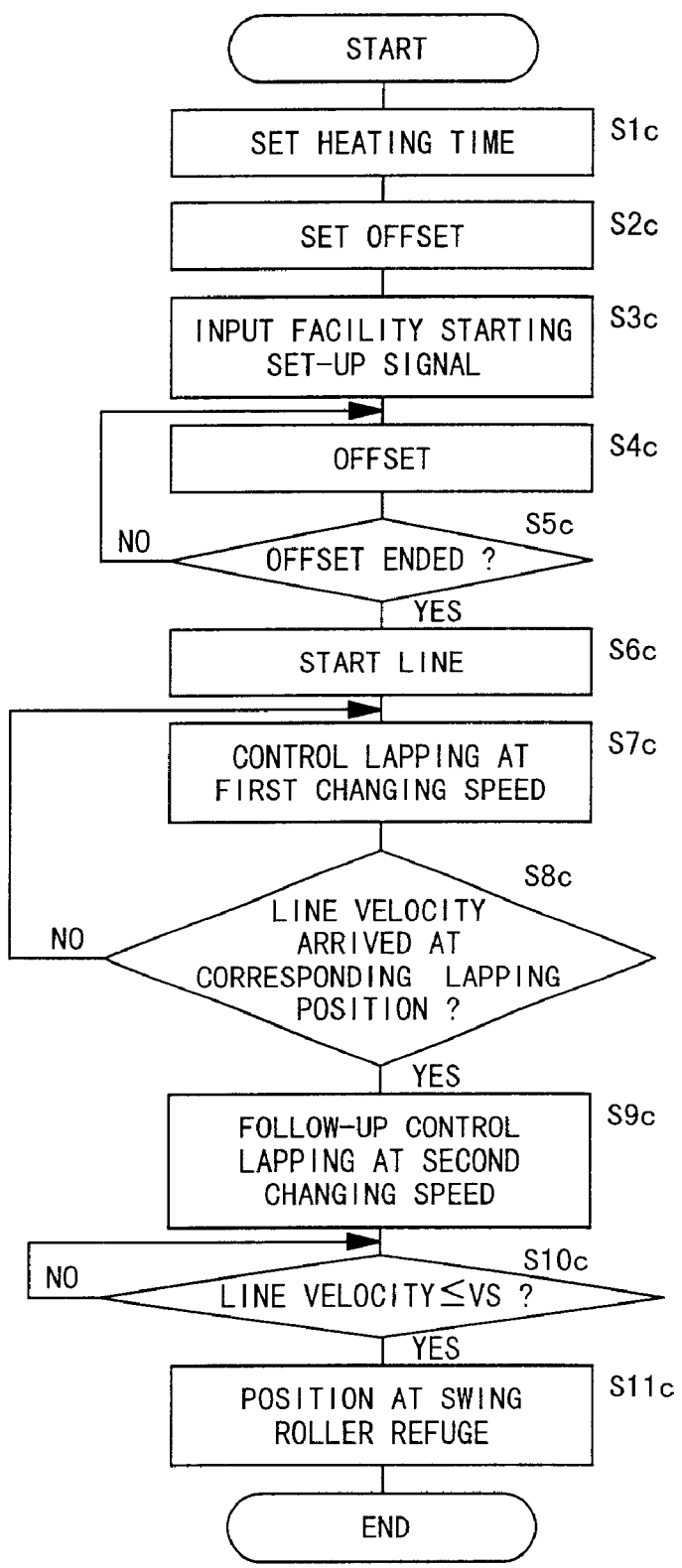
FIG. 32 is a flow chart for explaining a decurl method according to the eleventh embodiment of the invention.

The actions of the decurl apparatus 340 thus constructed will be described in the following in connection with the decurl method according to the eleventh embodiment of the invention, with reference to the flow chart shown in FIG. 32.

First of all, the heating temperature and the heating time of the sheet paper web 12a are set on the basis of the sheet material information such as the paper quality and the paper thickness of the roll paper 14a to be decurled. Next, the heating time setting signal is transmitted from the (not-shown) facility sequencer to the first sequencer 344 (at Step S1c), so that the offset of the swing roller 266 is set according to the heating time (at Step S2c).

Figure 33:
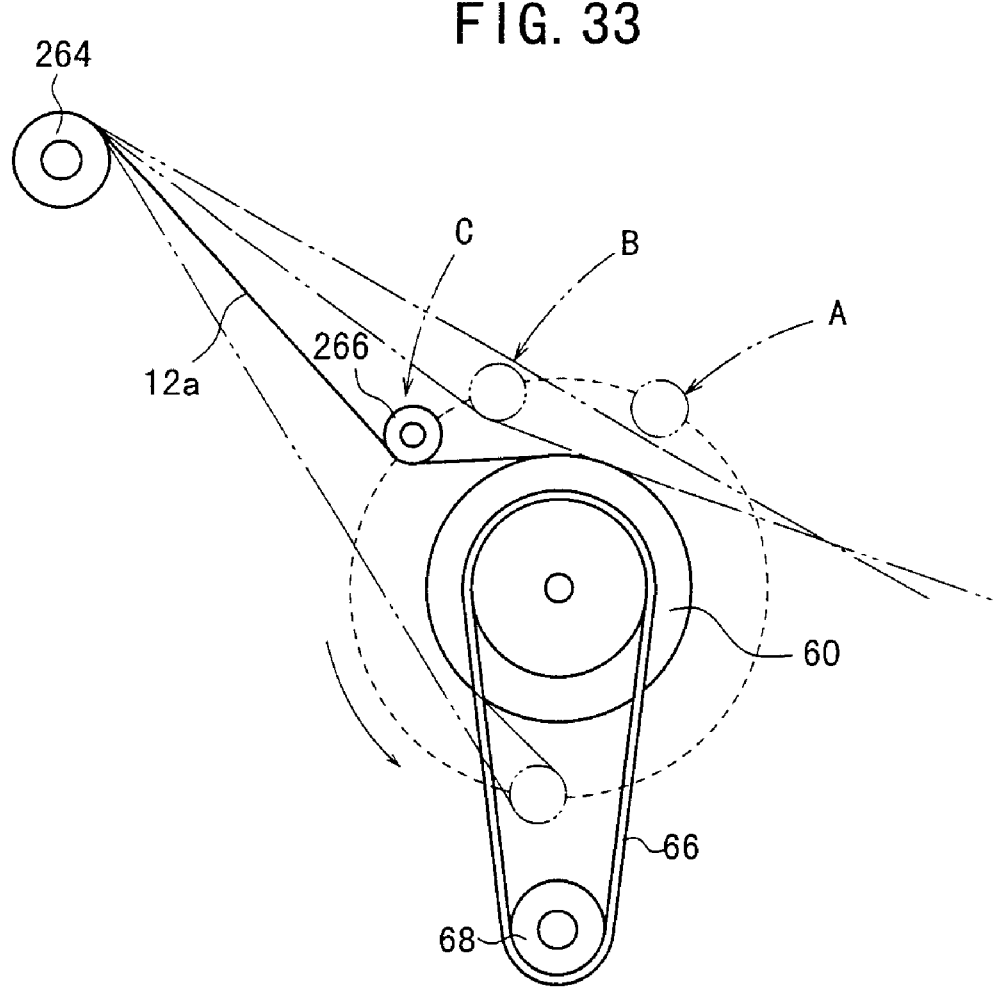
FIG. 33 is a diagram for explaining the position of the swing roller at an acceleration.

As shown in FIG. 33, specifically, the swing roller 266 during the line stop is arranged to correspond to a refuge position A spaced from the heating roller 60. Next, when the facility starting set-up signal is inputted (at Step S3c), the swing roller position command is transmitted from the first sequencer 344 to the second inverter 356. Under the action of the second servo motor 74, therefore, the swing roller 266 moves the sheet paper web 12a from a lapping starting position B between the heating roller 60 and the sheet paper web 12a to a set lapping position C (at Step S4c).

Figure 34:
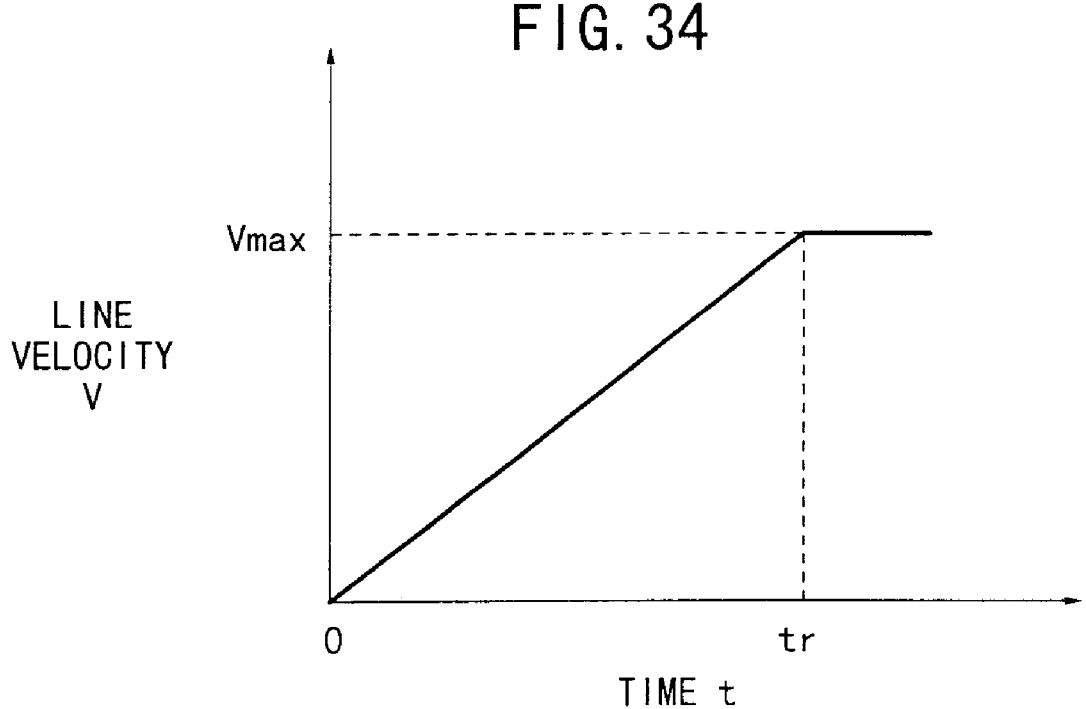
FIG. 34 is a diagram for explaining a line velocity at an acceleration.

When the offsetting action of the swing roller 266 is ended (that is, when the answer of Step S5c is YES), the routine advances to Step S6c, at which the line drive signal is inputted to the second sequencer 346 from the not-shown facility sequencer. The second sequencer 346 drives the third servo motor 362 through the third inverter 360 so that the suction drum 18 starts its rotation. Under the rotating action of the suction drum 18, the transfer velocity of the sheet paper web 12a, as let off from the roll paper 14a, i.e., the line velocity is accelerated to a line velocity Vmax on the basis of the maximum line velocity signal transmitted from the not-shown facility sequencer, as illustrated in FIG. 34, so that the transfer is effected at the constant line velocity Vmax.

The line velocity of the suction drum 18 is detected through the third pulse generator 364 disposed in the third servo motor 362 and is transmitted through the isolator 366 to the first and third sequencers 344 and 350. As a result, the first sequencer 344 drives the first servo motor 68 through the first inverter 352 thereby to drive the heating roller 60 in synchronism with the suction drum 18 and to feedback-control the same on the basis of the detection signal of the first pulse generator 354.

Figure 35:
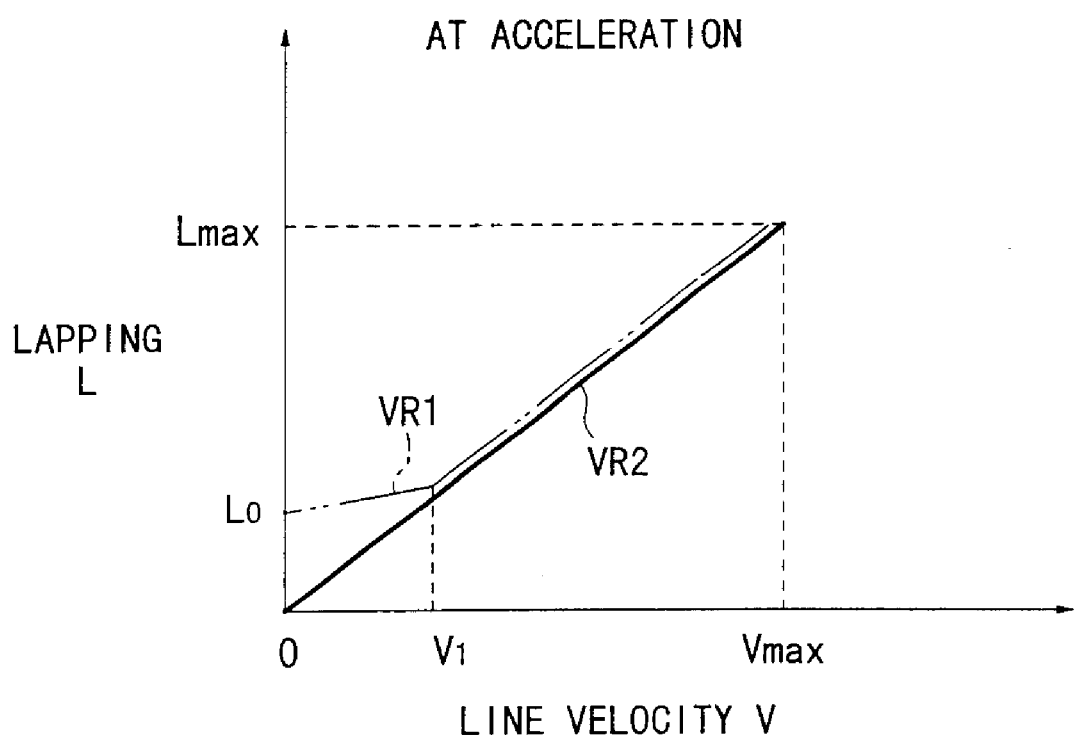
FIG. 35 is a diagram for explaining the control of a lapping at an acceleration.

The lapping of the swing roller 266, as corresponding to the line velocity, is controlled with a first changing rate VR1 and a second changing rate VR2, as illustrated in FIG. 35. After the line start, specifically, the lapping of the swing roller 266 is controlled with the first changing rate VR1 (at Step S7c). When the line velocity reaches the corresponding lapping position, i.e., the line velocity V1 (that is when the answer of Step S8c is YES) in the eleventh embodiment, the routine advances to Step S9c, at which the lapping of the swing roller 266 is follow-up controlled with the second changing speed VR2.

Figure 36:
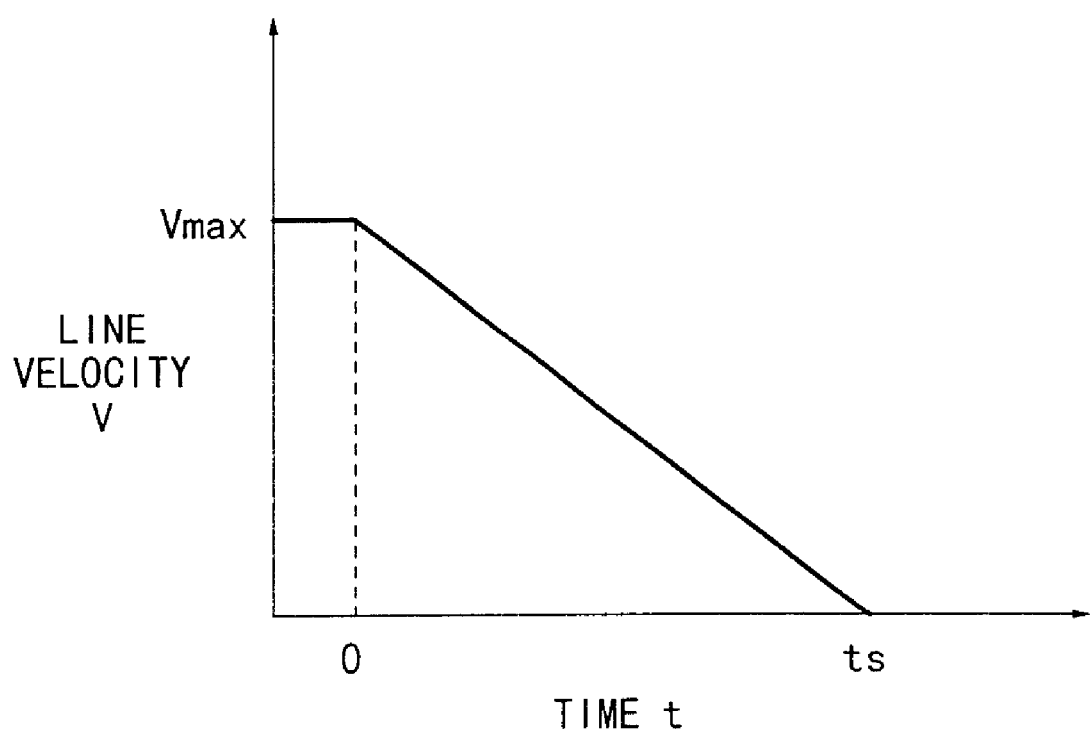
FIG. 36 is a diagram for explaining the line velocity at a deceleration.
Figure 37:
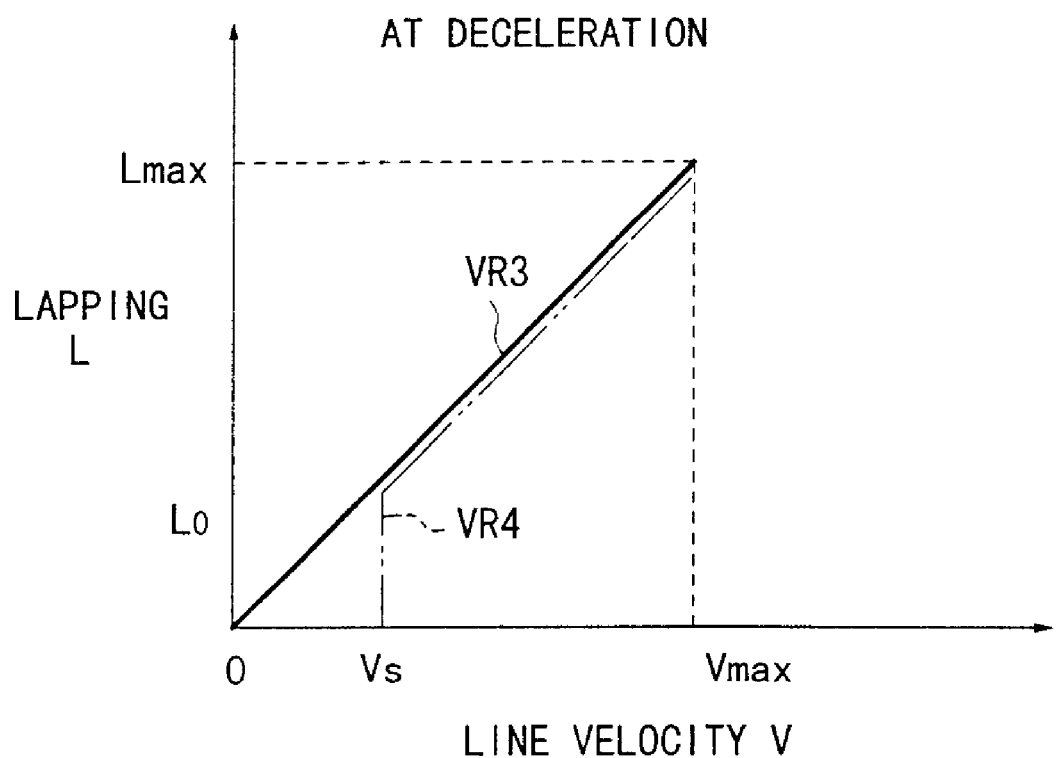
FIG. 37 is a diagram for explaining the control of the lapping at a deceleration.

When the line velocity V by the suction drum 18 is decelerated from Vmax, as illustrated in FIG. 36, the lapping of the swing roller 266 is follow-up controlled along a third changing rate VR3 to a line velocity VS, as illustrated in FIG. 37. When exceeded by this line velocity VS (that is, when the answer of Step S10c is YES), moreover, the lapping is controlled along a fourth changing rate VR4 so that the swing roller 266 is positioned at the refuge position A (at Step S11c).

Thus in the eleventh embodiment, when the line velocity V at the line rising time is to be accelerated, the length for the sheet paper web 12a to contact with the circumference of the heating roller 60 is changed just before the line stop at which the line velocity V is decelerated, thereby to control the time period (or the heating time) for the sheet paper web 12a to contact with the heating roller 60, to a constant value.

Figure 38:
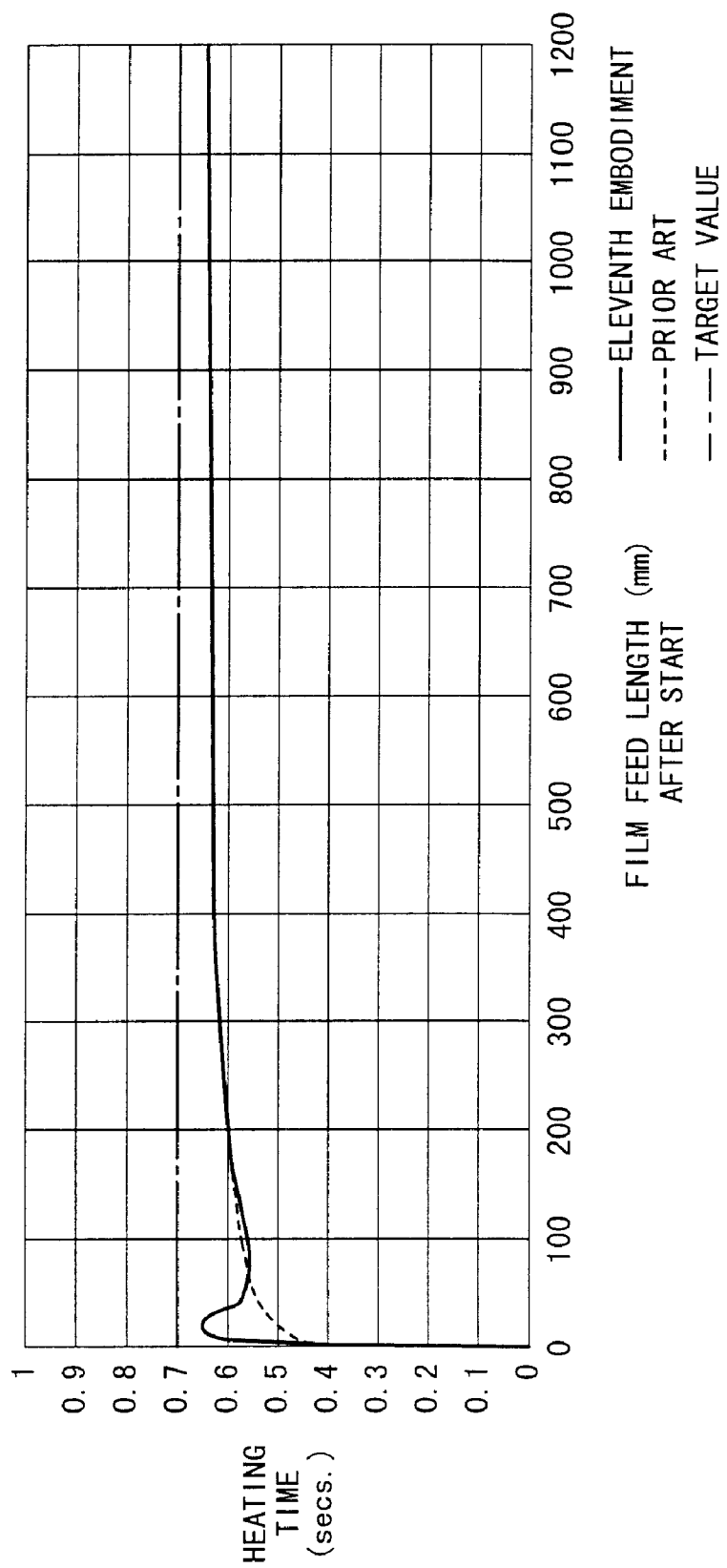
FIG. 38 is a diagram for explaining the heating time at an acceleration.

As illustrated in FIG. 35, specifically: the line velocity Vmax was set to Vmax=70 m/min.; the acceleration time to 8 secs.; the heating time to 0.7 secs.; the gradient changing rate V1 to V1=9 m/min.; an initial lapping L0=30 mm; and the initial lapping time to 0.4 secs., and experiments were performed in comparison with the prior art method. The experimental results are plotted in FIG. 38. According to the eleventh embodiment, in the vicinity of the line start at an acceleration having a high changing rate of the line velocity, the heating time of the sheet paper web 12a in the vicinity of the heating starting position can be effectively retained by presetting the lapping L0 (to 30 mm), so that the decurl effect of the sheet paper web 12a can be ensured.

Figure 39:
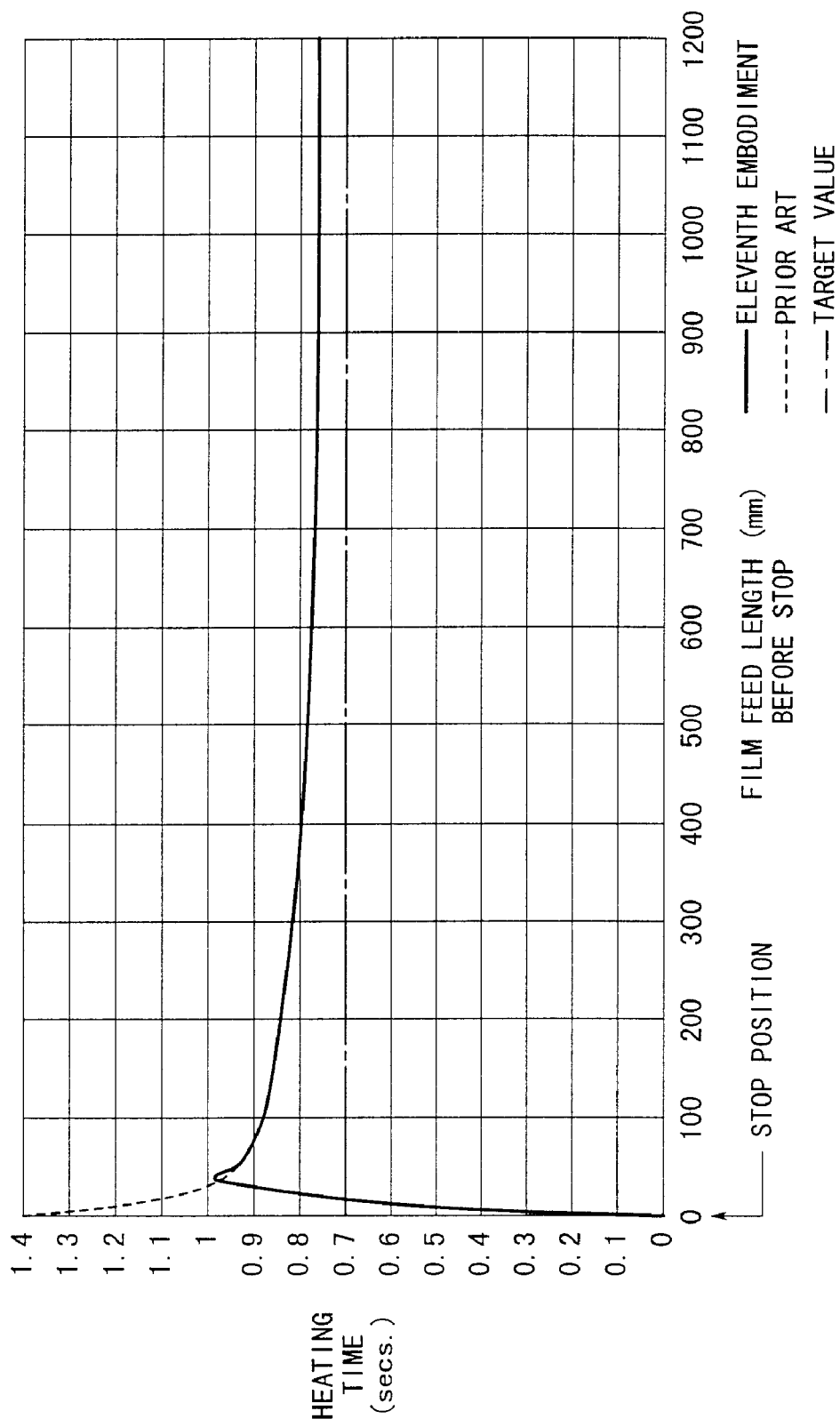
FIG. 39 is a diagram for explaining the heating time at a deceleration.

At a deceleration of the line velocity, on the other hand, as illustrated in FIG. 37: the line velocity Vmax was set to Vmax=70 m/min.; the deceleration time ts to ts=8 secs.; the heating time to 0. 7 secs.; and the lap leaving velocity VS to VS=12.25 m/min., and experiments were performed in comparison with the prior art method. The experimental results are plotted in FIG. 39. Especially according to the eleventh embodiment, there is obtained an effect that the sheet paper web 12a can be reliably prevented from being degrading, to effect the satisfactory decurl treatment without preparing the heating time more than necessary in the vicinity of the line velocity stopping position.

In the eleventh embodiment, therefore, there is obtained an advantage that the desire decurl effect can be reliably achieved even when the treating rate is changed according to the kind of the sheet paper web 12a or when the acceleration/deceleration and stop of the line velocity are frequently repeated. Especially when the line velocity V can be continuously set innumerably or when the line velocity is frequently changed in the course of the treatment, the decurl treatment can be efficiently performed.

Next, a decurl method according to a twelfth embodiment of the invention will be described in the following. In this twelfth embodiment, there is used the sheet material processing system 342, into which the decurl apparatus 340 is incorporated, as in the eleventh embodiment.

Figure 40:
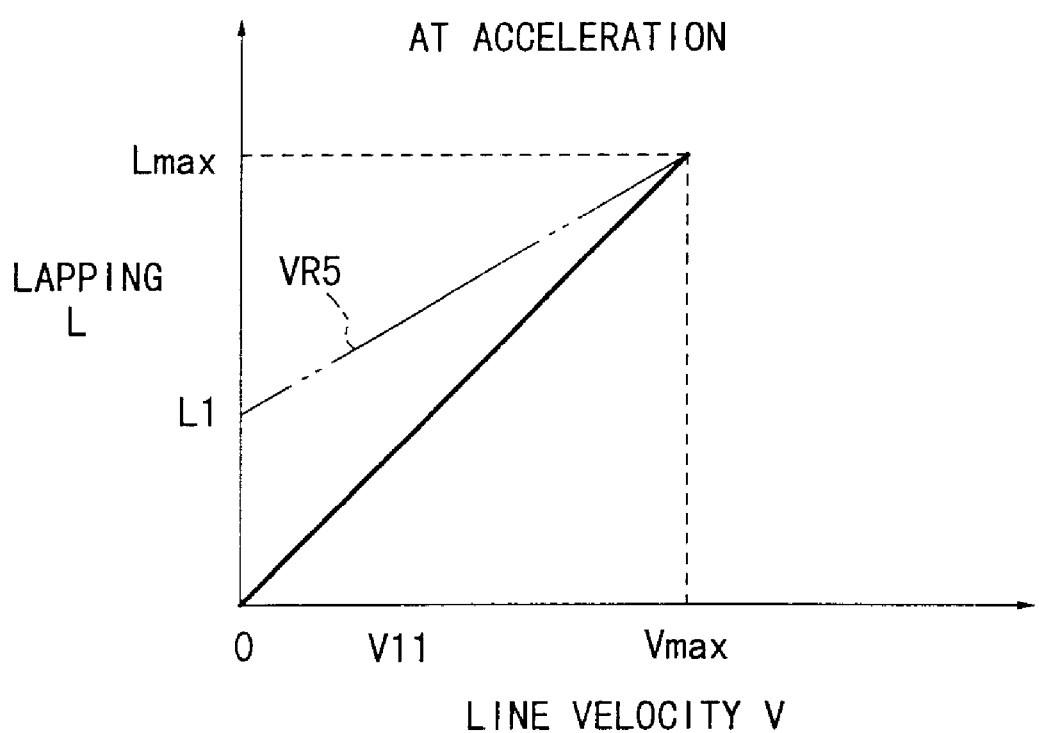
FIG. 40 is a diagram for explaining the control of the lapping at an acceleration in a deformation correcting method according to a twelfth embodiment of the invention.

In the twelfth embodiment, as illustrated in FIG. 40, the lapping L1 or offset of the swing roller 40 is set and controlled along a changing rate VR5 as the line starts. At a deceleration of the line velocity, on the other hand, the lapping is controlled along a changing rate VR6, as illustrated in FIG. 41, and is left at a line velocity VS1.

Figure 42:
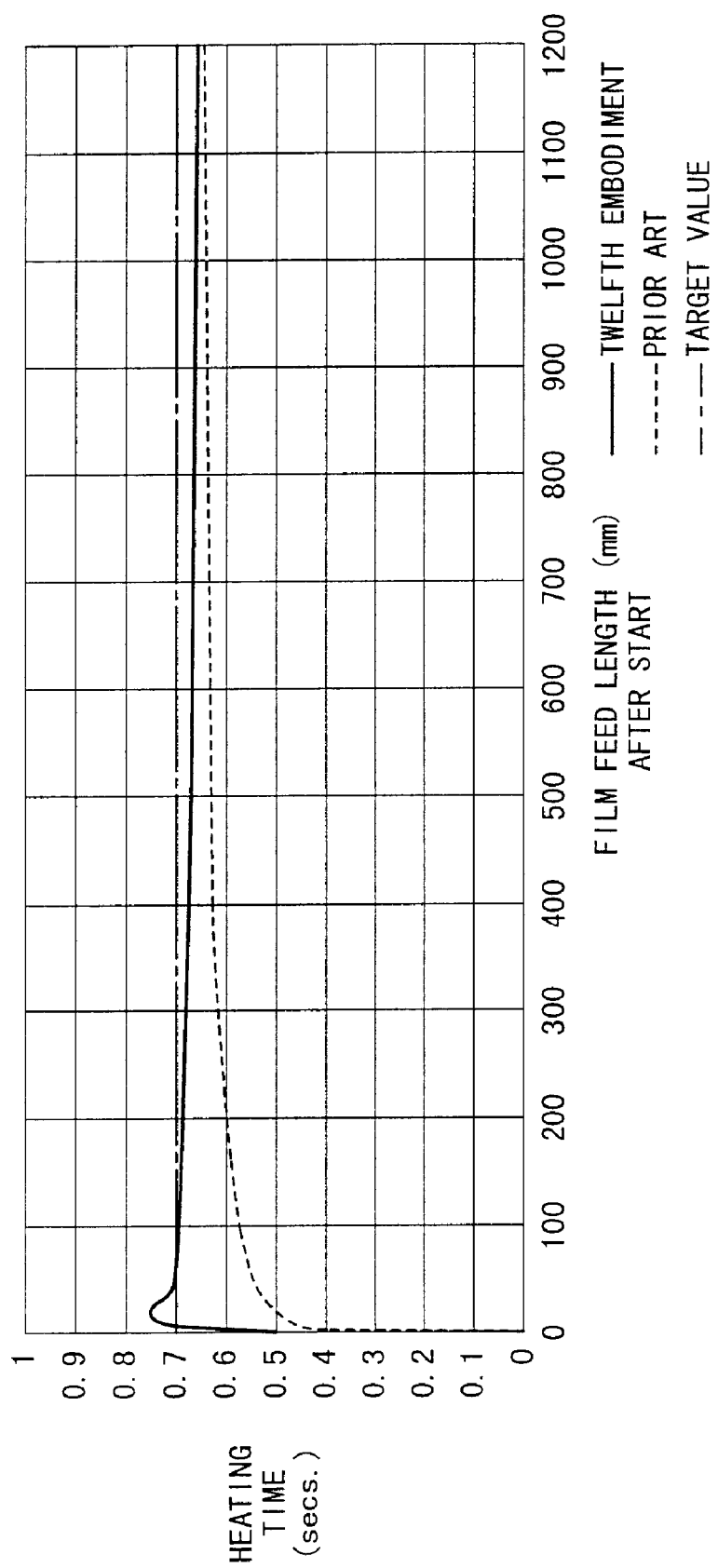
FIG. 42 is a diagram for explaining the heating time at an acceleration in the twelfth embodiment.

As illustrated in FIG. 40, therefore: the line velocity Vmax was set to Vmax=70 m/min.; the acceleration time to 8 secs.; the heating time to 0.7 secs.; the initial lapping L1 to L1=40 mm; and the initial lapping time to 0.5 secs., and experiments were performed in comparison with the prior art method. As a result, as plotted in FIG. 42, the heating time dropped in the prior art drastically just after the heating start. In the twelfth embodiment, on the contrary, the heating time can be kept effective and can be homogeneously retained for the sheet paper web 12$a$ just after the heating start. Thus, there is obtained an effect that the decurl treatment can be efficiently performed.

Figure 41:
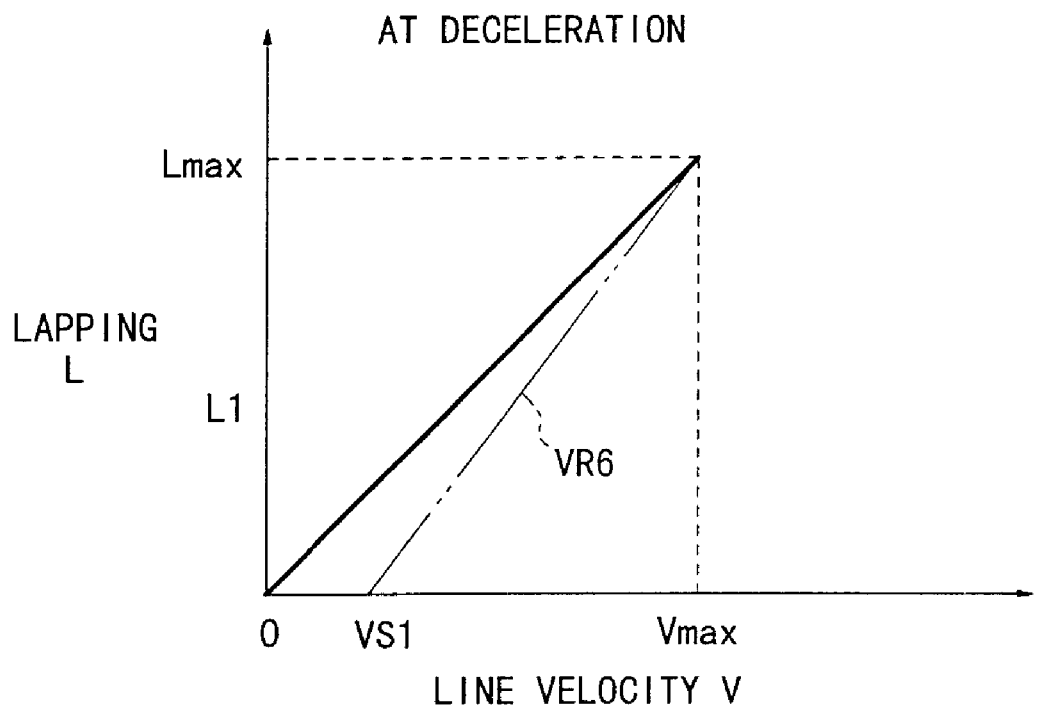
FIG. 41 is a diagram for explaining the control of the lapping at a deceleration in the deformation correcting method according to the twelfth embodiment of the invention.
Figure 43:
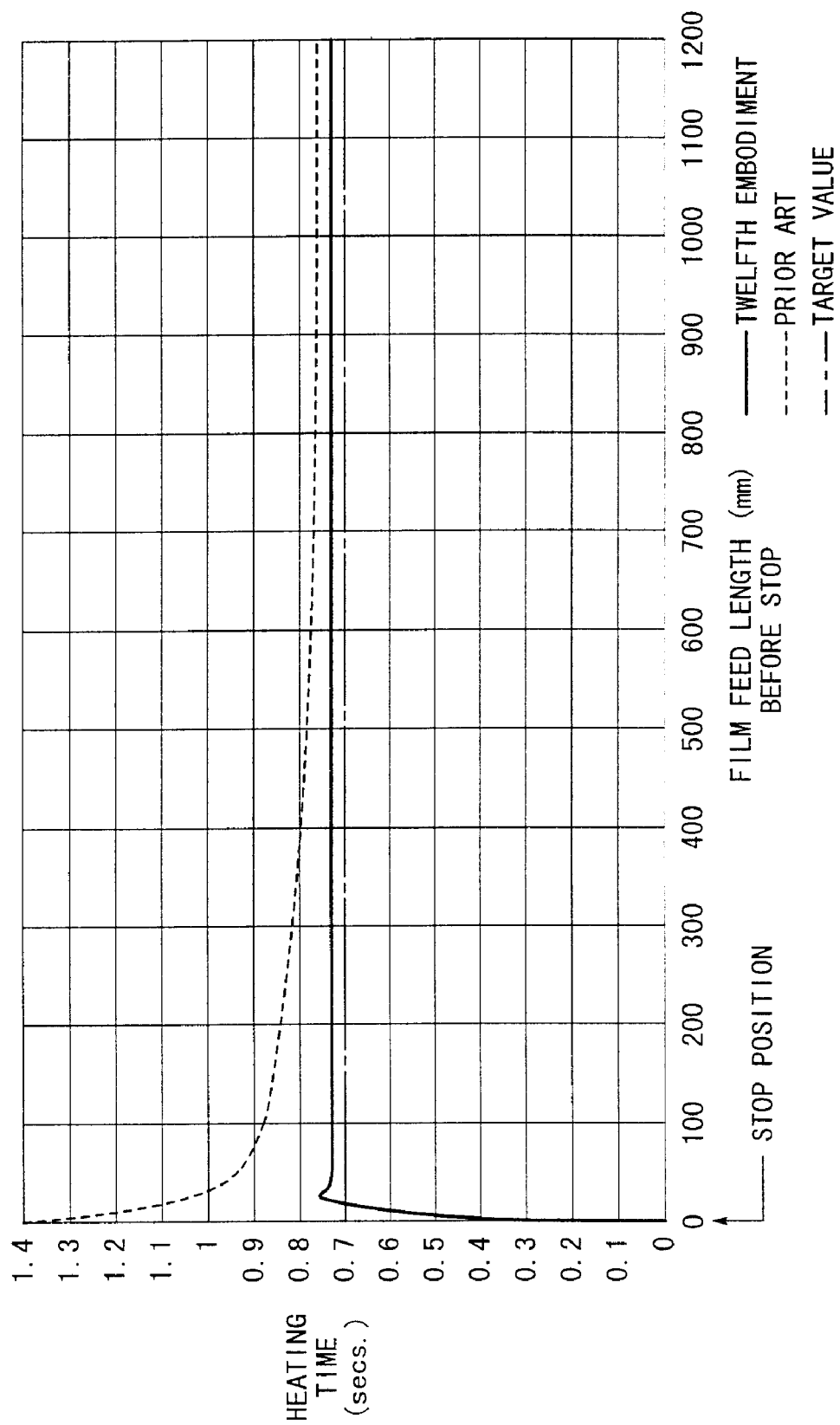
FIG. 43 is a diagram for explaining the heating time at a deceleration in the twelfth embodiment.

As illustrated in FIG. 41, on the other hand: the line velocity Vmax was set to Vmax=70 m/min.; the acceleration time to 8 secs.; the heating time to 0.7 secs.; and the lap leaving velocity VS1 to VS1=6.42 m/min., and experiments were performed in comparison with the prior art method. As a result, as plotted in FIG. 43, according to the twelfth embodiment, the desired heating time can be kept even in the vicinity of the line velocity stopping position, and the homogeneous heating time can be kept for the sheet paper web 12$a$ for the time period from the line start to the stop. As in the foregoing eleventh embodiment, there is obtained a similar effect that the decurl treatment is performed efficiently and highly accurately.

On the other hand, a decurl method according to a thirteenth embodiment of the invention will be described in the following.

Figure 44:
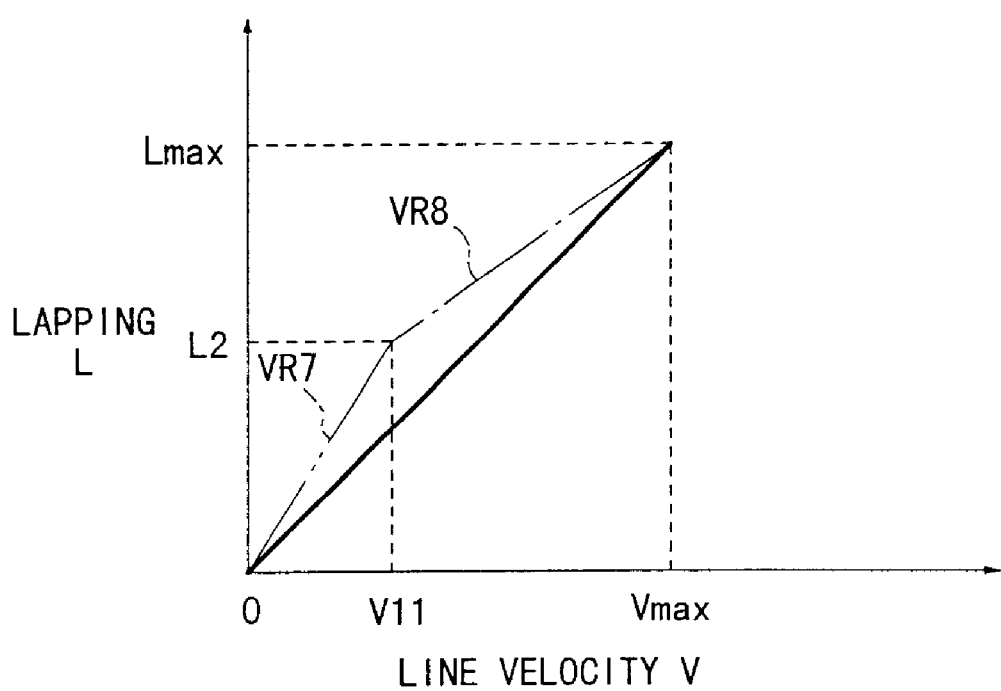
FIG. 44 is a diagram for explaining the control of the lapping in a deformation correcting method according to a thirteenth embodiment of the invention.

In this thirteenth embodiment, the lapping is controlled, as illustrated in FIG. 44, at an acceleration of the line velocity. Specifically, the lapping is controlled along a first changing rate VR7 to a lapping L2, while the line velocity V is accelerated from 0 to a line velocity V11, and is then controlled along a second changing rate VR8 while the velocity is from the line velocity V11 corresponding to that lapping L2 to the line velocity Vmax. Here, at a deceleration of the line velocity, the controls are similar to those of the twelfth embodiment.

Figure 45:
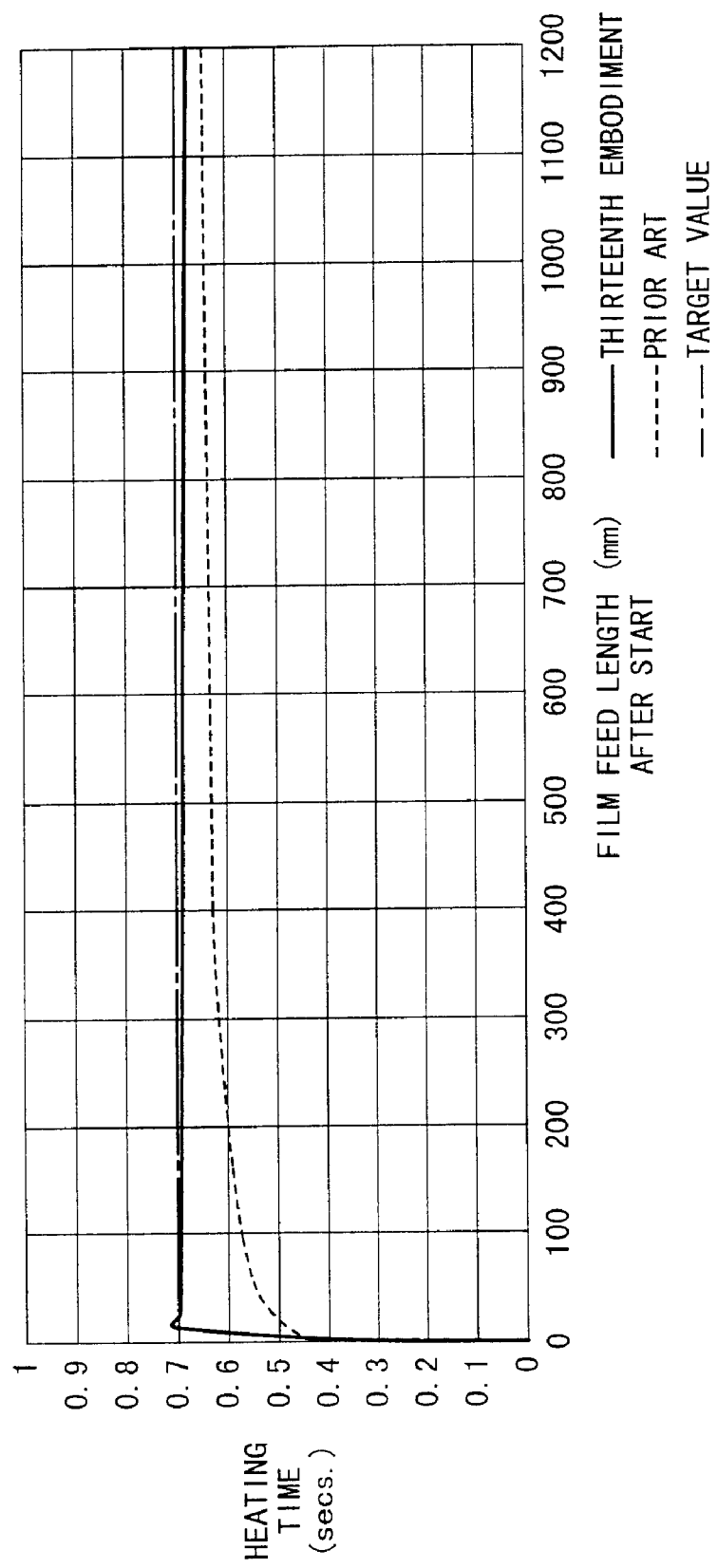
FIG. 45 is a diagram for explaining the heating time in the thirteenth embodiment.

Therefore: the line velocity Vmax was set to Vmax=70 m/min.; the acceleration time to 8 secs.; the heating time to 0.7 secs.; the gradient changing rate V11 to V11=5 m/min.; and the gradient changing lapping L2 to L2=95 mm, and experiments were performed in comparison with the prior art method. As a result, as plotted in FIG. 45, according to the thirteenth embodiment, the heating time of the sheet paper web 12$a$ can be kept effective around the line starting time, and there is obtained the effect that the decurl treatment is efficiently executed, as in the foregoing eleventh and twelfth embodiments.

In the twelfth and thirteenth embodiments, moreover, especially the line velocity can be set to a discontinuous numerical value. When the line velocity is unchanged in the course of the transfer, there is obtained an advantage that the line velocity can be suitably employed for the quality and the decurl effect of the sheet paper web 12$a$.

Next, a decurl method according to a fourteenth embodiment of the invention will be described in the following.

Figure 46:
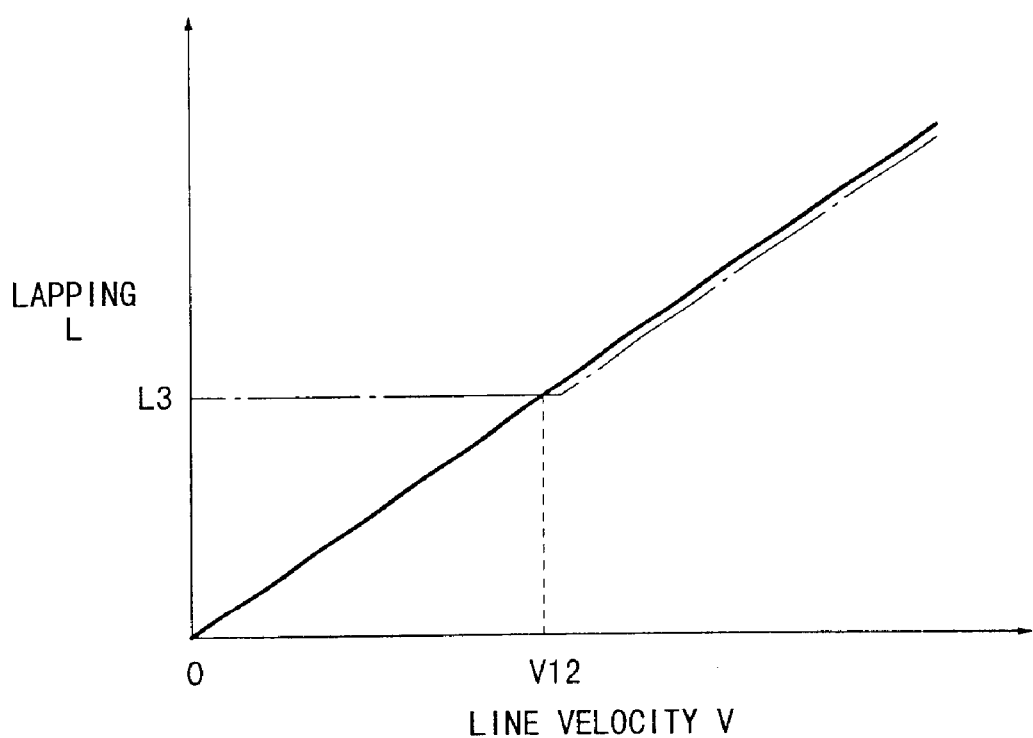
FIG. 46 is a diagram for explaining the control of the lapping at an acceleration in a deformation correcting method according to a fourteenth embodiment of the invention.

At an acceleration of the line velocity, as illustrated in FIG. 46, a lapping L3 of the swing roller 266 is set before the line start, and the line is started under the rotating action of the suction drum 18. When the line velocity reaches a velocity V12 corresponding to the offset position, moreover, the swing roller 266 is driven so that its position is controlled to follow up the line velocity. This makes it possible to avoid the shortage of the heating time just after the line start. Thus, there is obtained the effect that the decurl treatment is efficiently executed, as in the foregoing eleventh to thirteenth embodiments.

Figure 47:
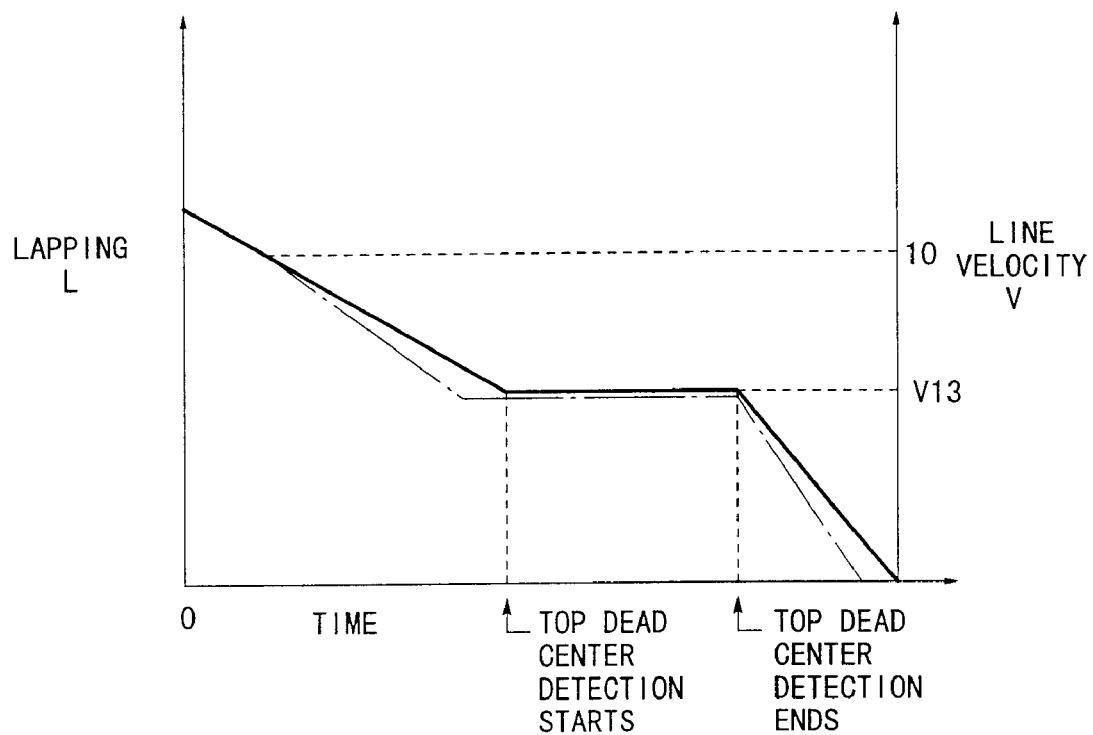
FIG. 47 is a diagram for explaining the control of the lapping at a deceleration in the deformation correcting method according to the fourteenth embodiment of the invention.

At a deceleration of the line velocity, on the other hand, the lapping is controlled. as illustrated in FIG. 47. At this time, the lapping of the swing roller 266 is gradually decreased to correspond to the line velocity V, and the swing roller 266 is controlled to correspond to a creep velocity V13 at a predetermined operation velocity from 10 m/min., for example. Next, the top dead center detection of the cutter means 348 is started, so that the swing roller 266 is positioned at a predetermined refuge position when it is detected on the basis of the pulse signal from the fourth pulse generator 372 that the cutter means 348 has reached the top dead center.

In the fourteenth embodiment, therefore, the heating time of the sheet paper web 12$a$ can be homogenized just before the line velocity is decelerated to the stop. Thus, there is obtained the effect that the decurl treatment is efficiently executed, as in the foregoing eleventh to thirteenth embodiments. Moreover, the cutter means 348 is always arranged at the top dead center so that it cuts the sheet paper web 12$a$ accurately and reliably.

Here, the eleventh to fourteenth embodiments of the invention have been described by using the sheet paper web 12$a$ as the sheet material, but a similar description could apply to various sheet materials of image recording carriers such as heat-sensitive sheets of paper, pressure-sensitive sheets of paper or photographic recording materials.

Figure 48:
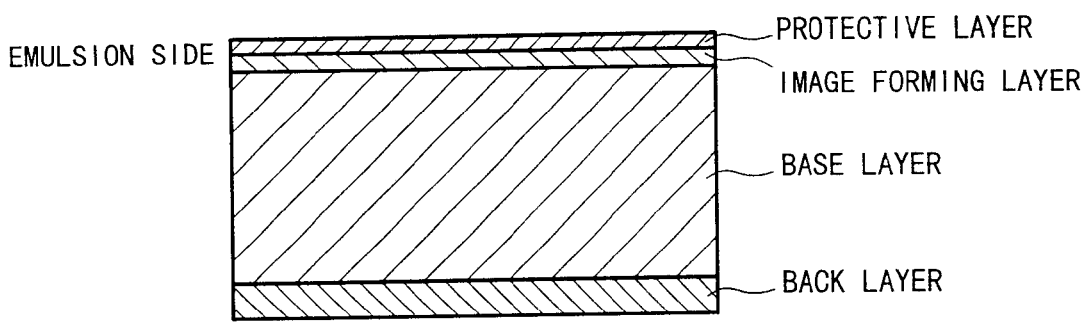
FIG. 48 is a sectional view showing a general construction of a thermal imaging material to be cut by a cutting apparatus of the invention.

FIG. 48 is a sectional view showing a general construction of a thermal imaging material to be cut by a cutting apparatus of the invention. The thermal imaging material has a multi-layered structure which is composed, sequentially from an emulsion side, of: a protective layer; an image forming layer (or photosensitive layer or heat-sensitive layer) having the emulsion applied thereto; a base layer; and a back layer, and the image forming layer is thick but fragile. Here will be later described in detail the preferred modes of the thermal imaging material of the case in which the image forming layer is formed of a photosensitive layer.

Figure 49:
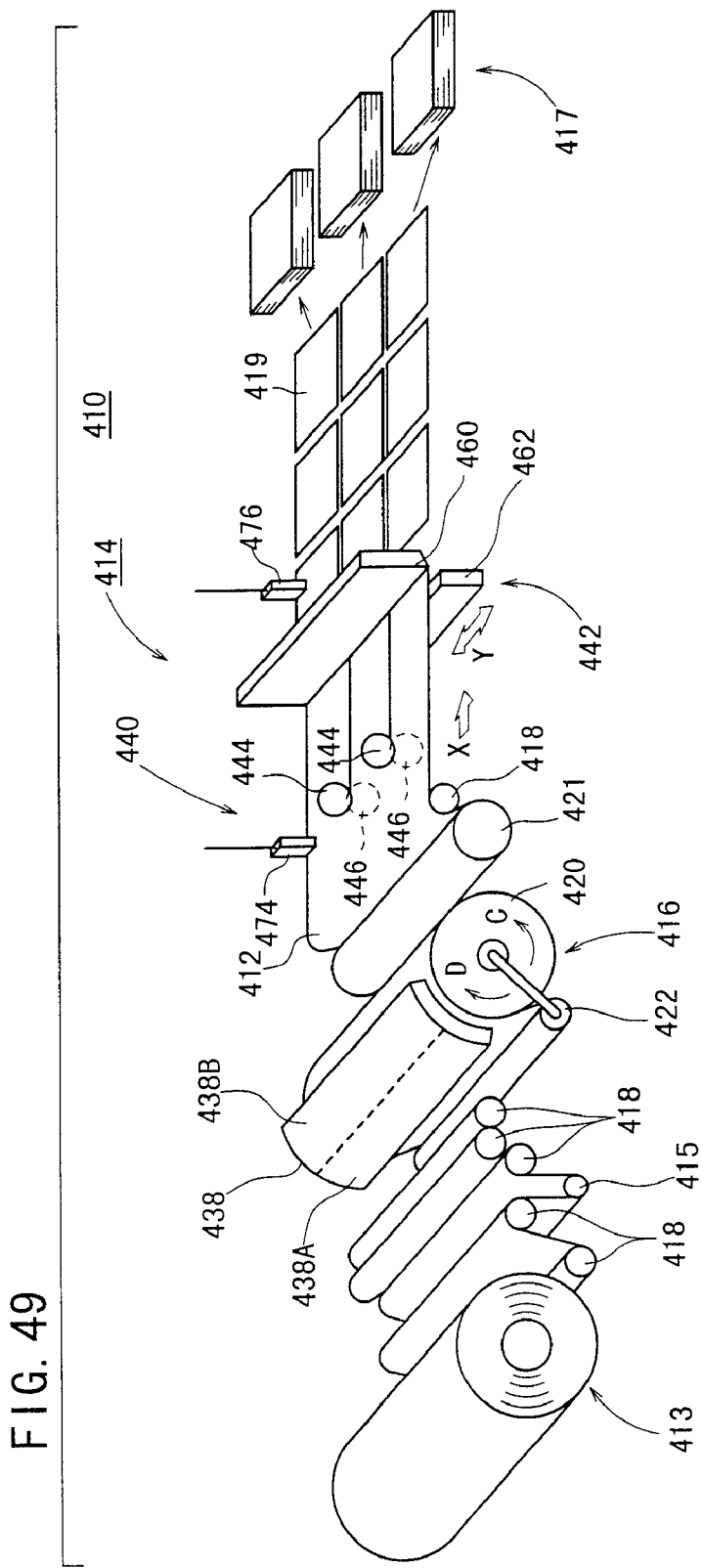
FIG. 49 is a perspective view showing a schematic construction of a cutting apparatus according to a fifteenth embodiment of the invention.
Figure 50:
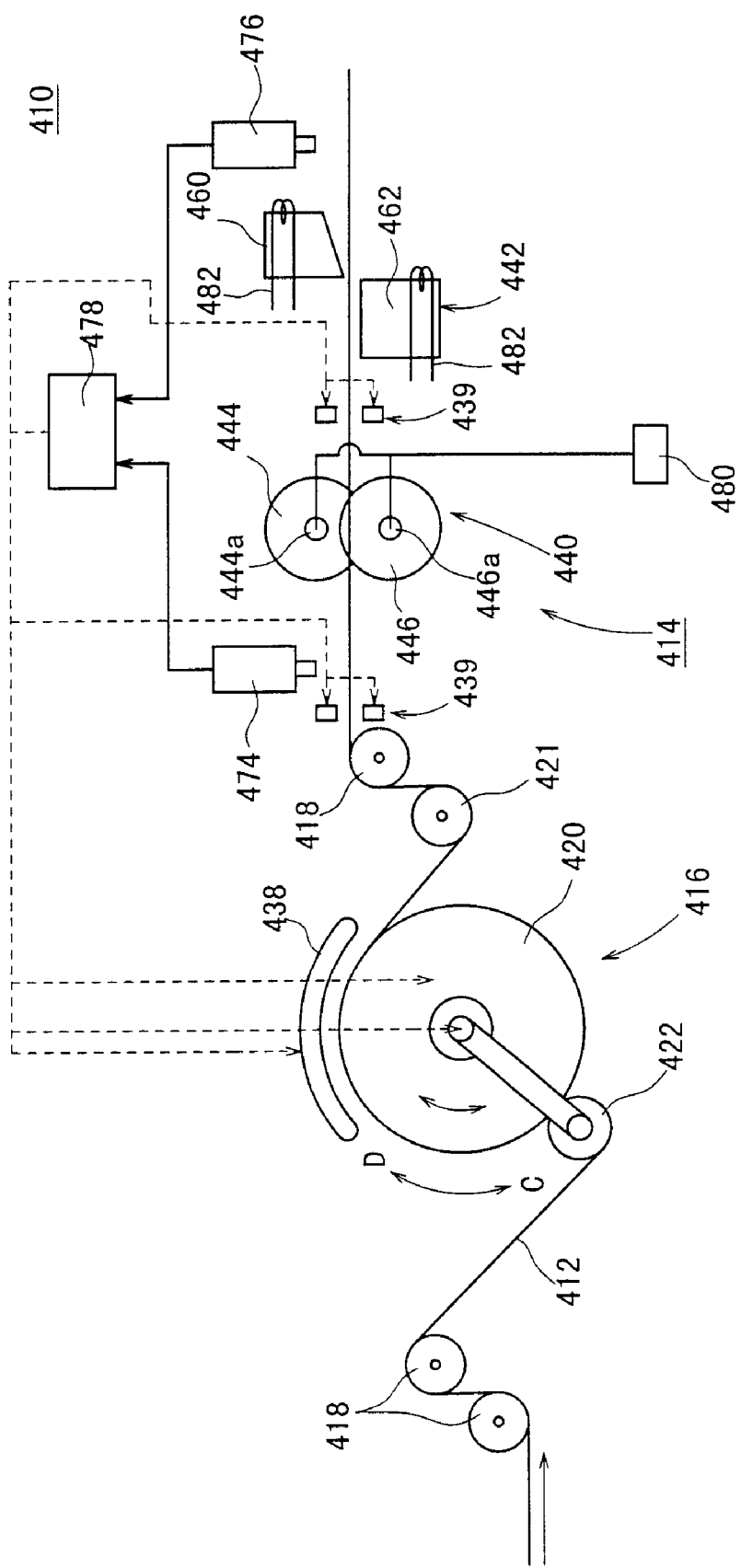
FIG. 50 is a schematic side elevation of the cutting apparatus.

FIG. 49 is a perspective view showing a schematic construction of a cutting apparatus 410 according to a fifteenth embodiment of the invention, and FIG. 50 is a schematic side elevation of the cutting apparatus 410. Here, FIG. 49 omits a portion of FIG. 50.

As shown in FIGS. 49 and 50, the cutting apparatus 410 is constructed mainly by arranging a heating unit 416 upstream of a cutter unit 414 for cutting a band-shaped thermal imaging material (or sheet material) 412. The band-shaped thermal imaging material 412, as let off from a web unwinder 413 having the thermal imaging material 412 rolled thereon, is transferred at a predetermined velocity by a main feed roller 421 by way of a transfer passage which is defined by a plurality of guide rollers 418 and a dancer roller 415 for adjusting the tension of the thermal imaging material 412. The thermal imaging material 412 thus transferred through the transfer passage is further transferred through the heating unit 416 and the cutter unit 414 in the recited order so that it is formed into a plurality of sheets 419, which are then stacked in a predetermined number on a sheet stacking unit 417.

Figure 51:
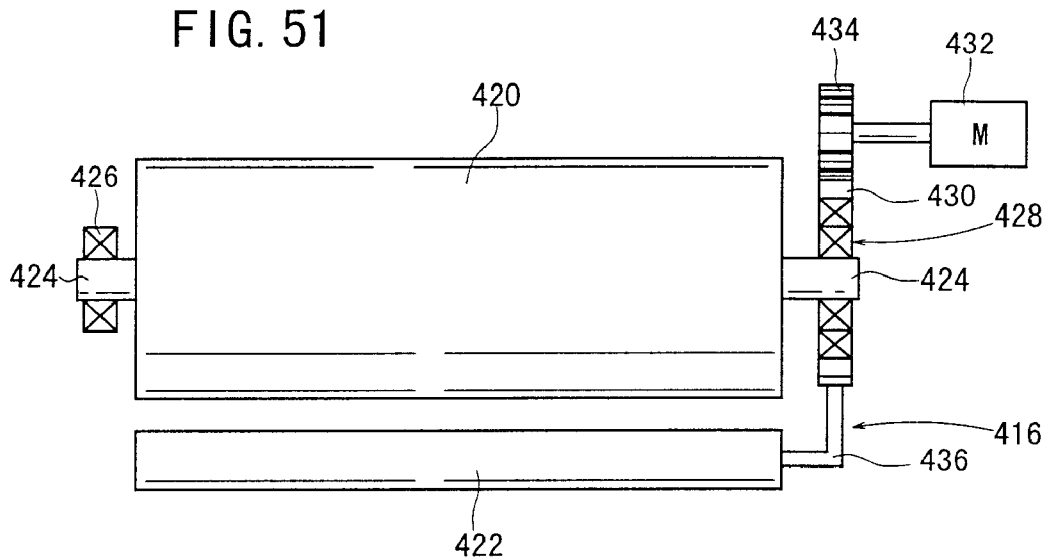
FIG. 51 is an explanatory diagram for explaining a support structure for the heating roller and a holding roller.

The heating unit 416 is equipped, as shown in FIGS. 49 to 51, with a cylindrical heating roller 420 for heating the thermal imaging material 412 by contacting with it, and a holding roller 422 for holding the thermal imaging material 412 in engagement with it and for moving back and forth along the circumference of the heating roller 420. As shown in FIG. 51, the heating roller 420 is supported at its journals 424 and 424 individually by bearings 426 and 428 so that the heating roller 420 rotates while following the thermal imaging material 412 being transferred in contact with its circumference. The bearing 428 on one side has a double bearing structure, around which there is disposed a sector gear 430 meshing with a motor shaft gear 434 of a reversibly rotatable motor 432. The toothless portion of the sector gear 430 and the holding roller 422 are connected through an L-shaped arm 436.

When the motor 432 rotates forward or backward, the holding roller 422 reciprocates on the circumference of the heating roller 420 within the toothed range of the sector gear 430. When the transfer passage of the thermal imaging material 412 is formed, as shown in FIGS. 49 and 50, so that the thermal imaging material 412 is held in engagement with the holding roller 422 and then brought into contact with the heating roller 420, therefore, the lapping between the thermal imaging material 412 and the heating roller 420 can be enlarged by moving the holding roller 422 in the direction of arrow X but can be reduced by moving the holding roller 422 in the direction of arrow Y. This makes it possible to control the time period for the thermal imaging material 412 to be heated in contact by the heating roller 420.

Therefore, the holding roller 422 is moved in the direction to enlarge the lapping, when the thermal imaging material 412 has a high transfer velocity, but in the direction to reduce the lapping when the thermal imaging material 412 has a low transfer velocity. Then, the thermal imaging material 412 can be heated to a constant temperature even when the transfer velocity of the thermal imaging material 412 changes. The heat source for the heating roller 420 is not specifically shown but may be exemplified by a type having a heater in the heating roller 420, a type for heating the heating roller 420 by feeding steam thereinto, or another heat source.

The heating unit 416 may be equipped with a blower unit 438 as an auxiliary heating unit, which is disposed in the vicinity of the circumference of the heating roller 420 and in an area not to obstruct the movement of the holding roller 422, for blowing at least one of a hot wind and a cold wind. If, in this case, the blower unit 438 is partitioned into a how wind blowing portion 438A and a cold wind blowing portion 438B, it is possible to blow one of or both of the hot wind and the cold wind.

When the heating temperature of the thermal imaging material 412 is made variable by switching the lots of the thermal imaging material 412 to be fed to the cutting apparatus 410, for example, the blower unit 438 can blow at least one of the hot wind and the cold wind to the thermal imaging material 412 so that it can heat the thermal imaging material 412 to a temperature matching the lot even when the temperature adjustment of the heating roller 420 is not ended. At the lot changing time, therefore, the cutting operation can be performed continuously without interrupting the run of the cutting apparatus 410. Even when the temperature adjustment of the heating roller 420 is made by interrupting the run of the cutting apparatus 410, on the other hand, the heat adjustment of the heating roller 420 can be promptly made by blowing at least one of the hot wind and the cold wind from the blower unit 438 to the heating roller 420.

Here, the blower unit 438 for blowing at least one of the hot wind and the cold wind is not limited in its arrangement to the position of the aforementioned heating unit 416. However, the blower unit 438 to be arranged at the position of the heating unit 416 may be dedicated exclusively to the hot wind, and a blower unit 439, as dedicated to the cold wind, may be arranged just upstream of each of a slitting machine 440 and a cross cutting machine 442, as will be described hereinafter (as should be referred to FIG. 50).

The cutter unit 414 includes not only the slitting machine 440 and the cross cutting machine 442 but also a corner cutting machine, a notching machine, a boring machine or a trimming machine. In the example shown in FIGS. 49 and 50, there are arranged the slitting machine 440 for cutting the thermal imaging material 412 into three rows, for example, in the transfer direction, and the cross cutting machine 442 for cutting the three rows of the thermal imaging material 412 in a cross direction perpendicular to the transfer direction into a predetermined length. Here, the invention should not be limited to the arrangement of both the slitting machine 440 and the cross cutting machine 442 but may be exemplified by only one.

Figure 52:
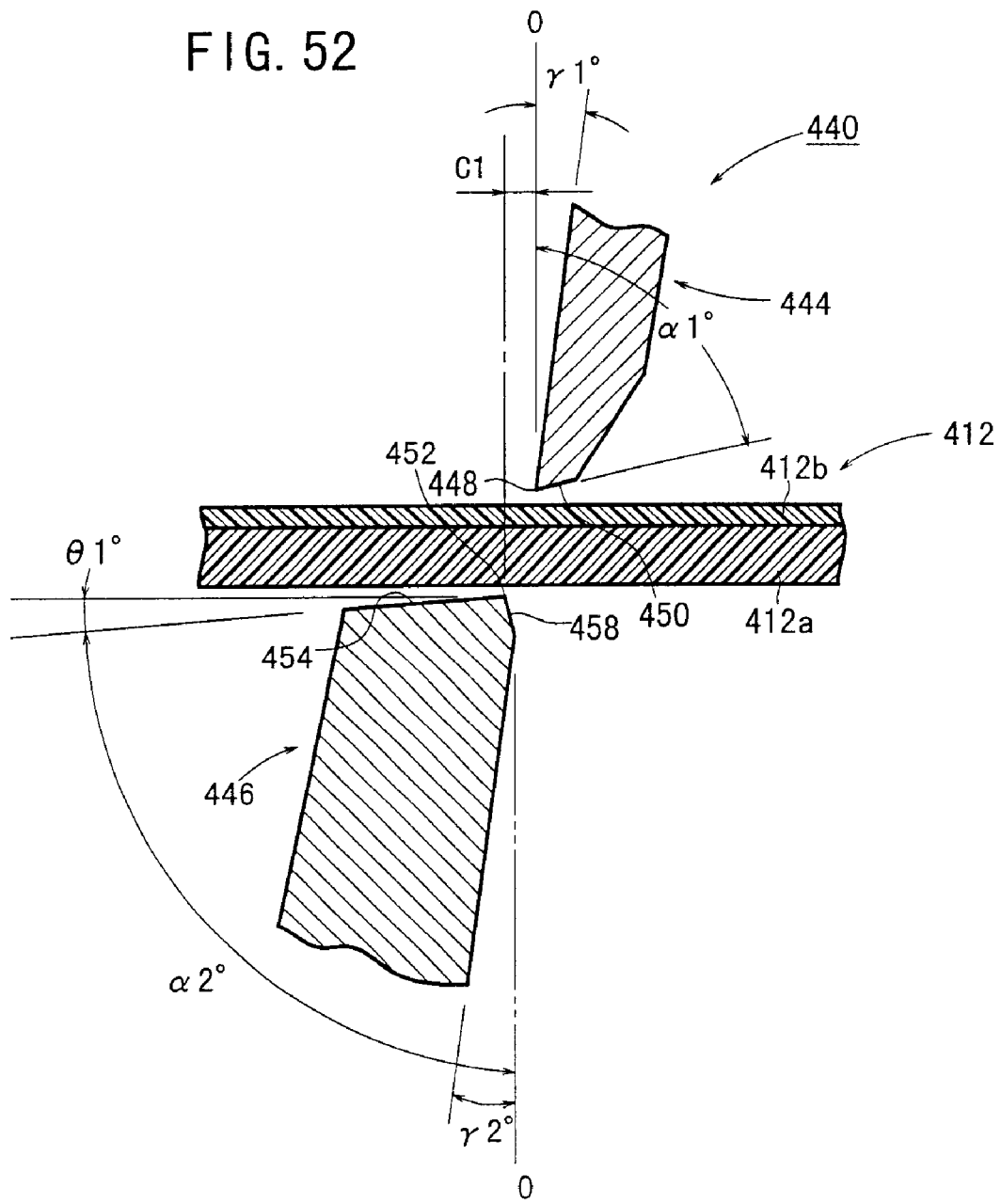
FIG. 52 is a side elevation for explaining a slit cutting machine to be incorporated into the cutting apparatus.

The slitting machine 440 is equipped with first and second rotary blade members 444 and 446 which are arranged interposing the thermal imaging material 412 for slitting the thermal imaging material 412. The first rotary blade member 444 is set, as shown in FIG. 52, to have an edge angle of $\alpha 1$ degree, as made between a reference virtual line O normal to the planar direction of the thermal imaging material 412 and an edge line 450 containing a first edge 448 to contact at first with the image forming layer (or emulsion side surface) 412b of the thermal imaging material 412, within a range of 15 to 45 degrees or 85 to 90 degrees. The first rotary blade member 444 is provided with a predetermined relief angle of $\gamma 1$ degrees from the reference virtual line O.

The second rotary blade member 446 is set to have an edge angle of $\alpha 2$ degrees, as made between an edge line 454 containing a second edge 452 to contact at first with a base layer 412a on the side opposed to the emulsion side surface of the thermal imaging material 412 and the reference virtual line O, within a range of 85 to 90 degrees. The second rotary blade member 446 is provided with a predetermined relief angle of $\gamma 2$ degrees from the reference virtual line O and a rake angle of $\theta 1$ degrees from a plane parallel to the thermal imaging material 412.

Figure 53:
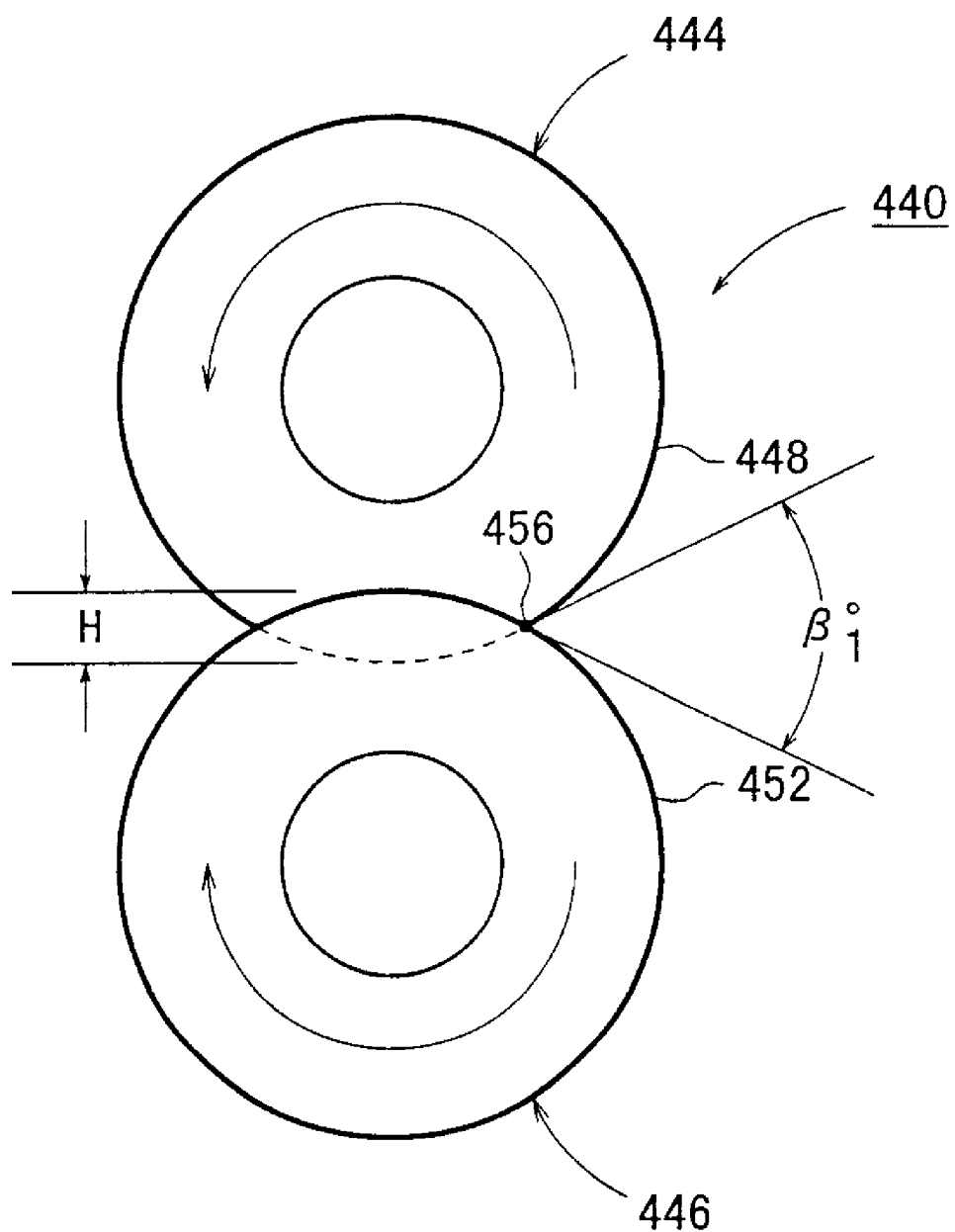
FIG. 53 is a front elevation of the slit cutting machine.

As shown in FIG. 53, the first and second rotary blade members 444 and 446 are arranged in a partially overlapping state to have a predetermined biting depth H and is set with an angle, as made between their individual tangential lines from an overlapping point 456, i.e., a shear angle of $\beta 1$ degrees within a range of 10 to 20 degrees.

In the shape shown in FIG. 52, the clearance C1 between the first and second edges 448 and 452 of the first and second rotary blade members 444 and 446 is set to a value of 15% or less of the thickness of the thermal imaging material 412. This clearance C1 is set by forming a chamfered portion 458 at the outermost circumferential portion of one, e.g., the second one 446 of the first and second rotary blade members 444 and 446.

The individual relief angles of $\gamma 1$ degrees and $\gamma 2$ degrees are set to 5 degrees or less, and the width size of the edge line 450 of the first rotary blade member 444 is set within a range of 0.1 to 1 mm when the edge angle of $\alpha 1$ degrees is within a range of 85 to 90 degrees. When the edge angle of $\alpha 1$ degrees is within a range of 15 to 40 degrees, the edge of the first rotary blade member 444 is set to have a shape shown in FIG. 54.

Figure 55:
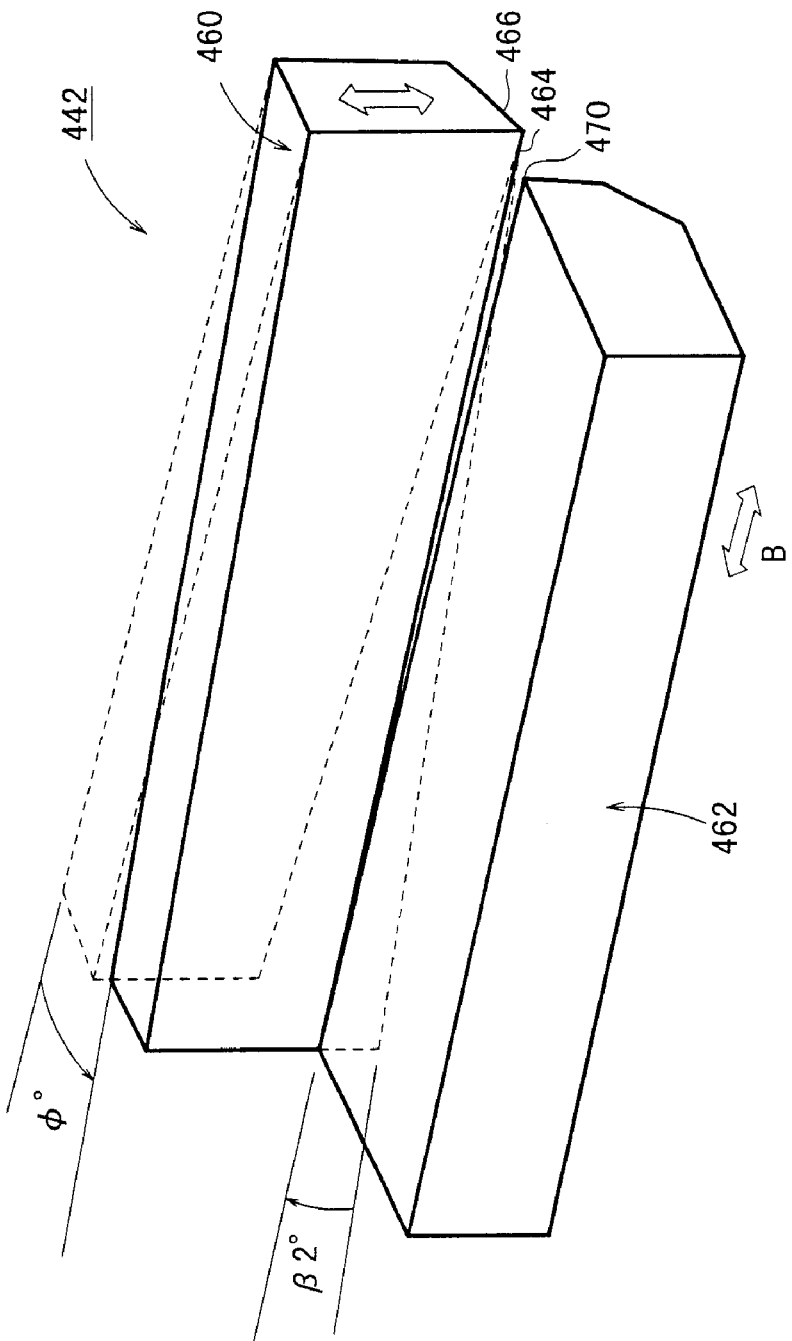
FIG. 55 is a perspective view showing an essential portion of a cross cutting machine to be incorporated into the cutting apparatus.
Figure 56:
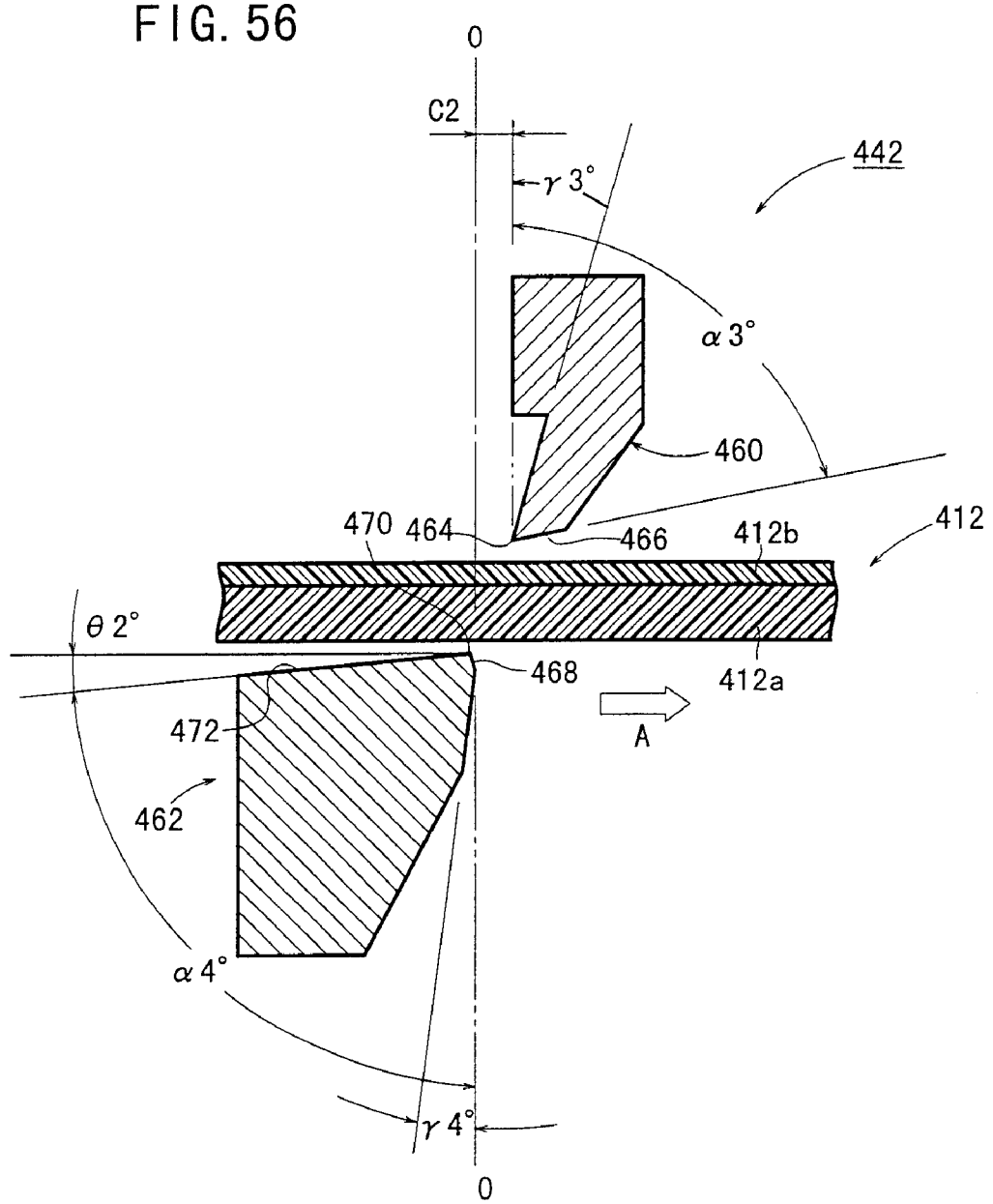
FIG. 56 is a side elevation for explaining the cross cutting machine.

As shown in FIGS. 55 and 56, the cross cutting machine 442 is equipped with first and second blade members 460 and 462 which are arranged across the thermal imaging material 412 for cross-cutting the thermal imaging material 412. The first blade member 460 constructs a moving blade whereas the second blade member 462 constructs a stationary blade.

Figure 54:
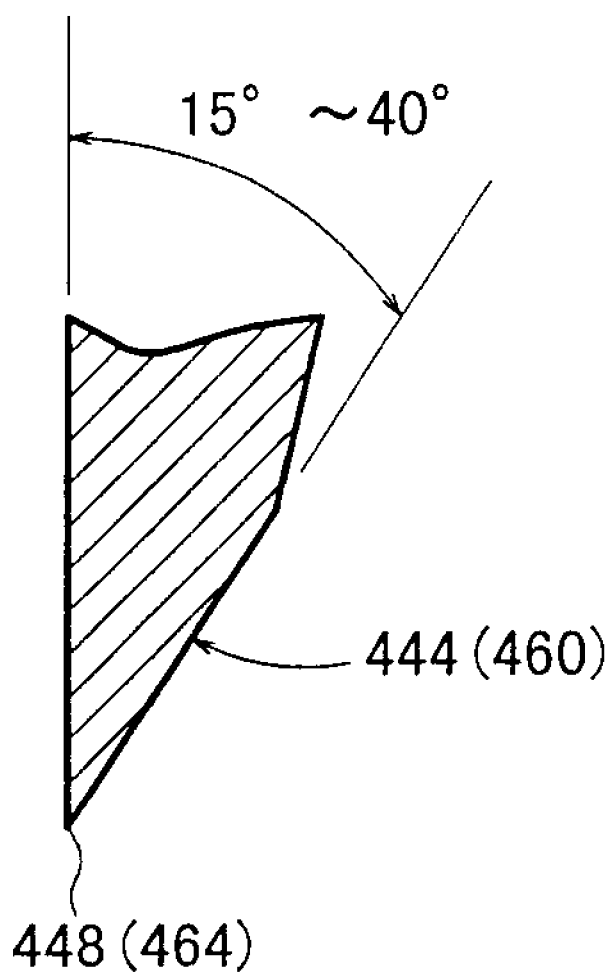
FIG. 54 is a diagram for explaining a first blade member composing the slit cutting machine.

The first blade member 460 has a first edge 464 to contact at first with the image forming layer 412b of the thermal imaging material 412 and is set to have an edge angle of α3 degrees, as made between an edge line 466 containing the first edge 464 and the reference virtual line O, within a range of 15 to 40 degrees or 85 to 90 degrees. When the edge angle of α3 is within the range of 85 to 90 degrees, the edge line 466 has a width of 0.1 to 15 mm. When the edge angle of α3 degrees is within the range of 15 to 40 degrees, the shape is shown in FIG. 54. The first blade member 460 is set with a relief angle of γ3 degrees from the reference virtual line. and this relief angle of γ3 degrees is set within a range of 5 degrees or less.

The second blade member 462 is provided with a chamfered portion 468 and is set to have an edge angle of γ4 degrees, as made between an edge line 472 containing a second edge 470 to contact at first with the face of the thermal imaging material 412 on the side of the base layer 412a and the reference virtual line O, within a range of 85 to 90 degrees. The second blade member 462 is set to have a relief angle of γ4 degrees of 5 degrees or less from the reference virtual line O, and a rake angle of θ2 degrees from a plane in parallel with the thermal imaging material 412. The clearance between the first and second edges 464 and 470 is set to a value of 15% or less of the thickness of the thermal imaging material 412.

As shown in FIG. 55, a shear angle of β2 degrees for the first and second blades 464 and 470 to contain the thermal imaging material 412 is set within a range of 0.3 to 5 degrees. An intersection angle ψ degrees of the first and second blade members 460 and 462 is set within a range of 0 to 5/1,000 degrees, and a proper contact pressure is applied by setting the intersection angle to ψ≠0, when the clearance C2 is set to 0%.

Figure 57:
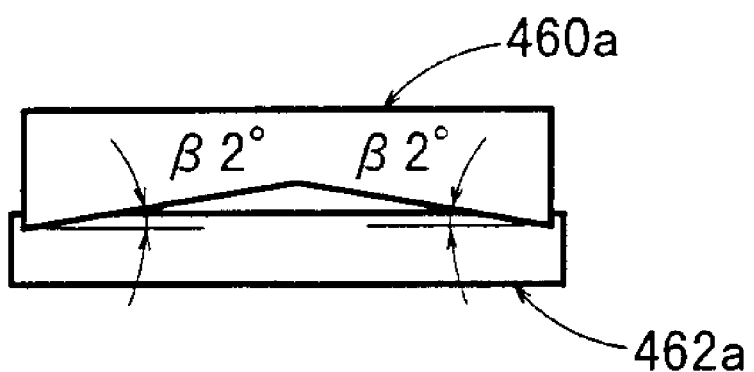
FIG. 57 is a diagram for explaining another construction of the cross cutting machine.
Figure 58:
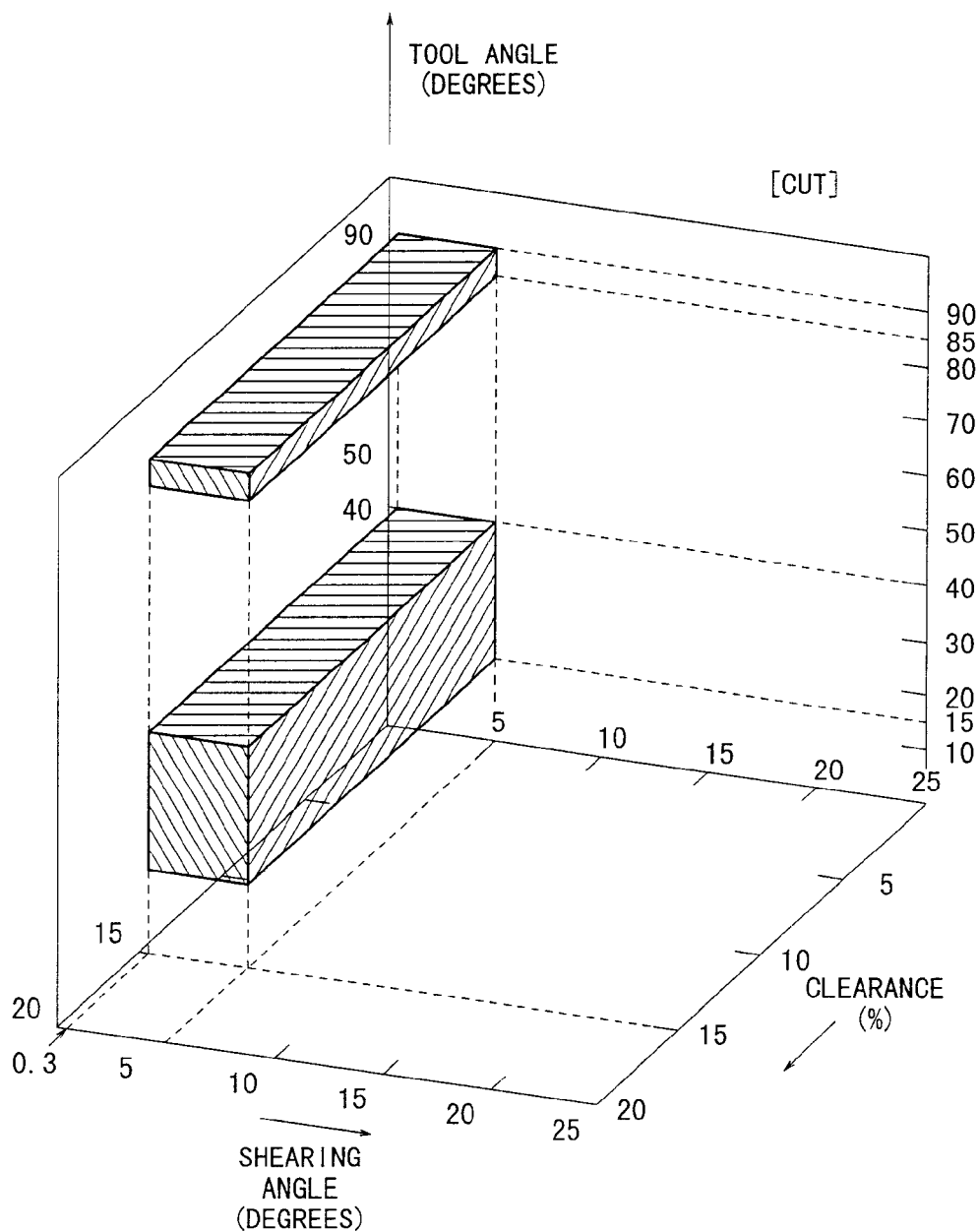
FIG. 58 is a diagram for explaining the ranges of a tool angle, a shearing angle and a clearance in the cross cutting machine.
Figure 59:
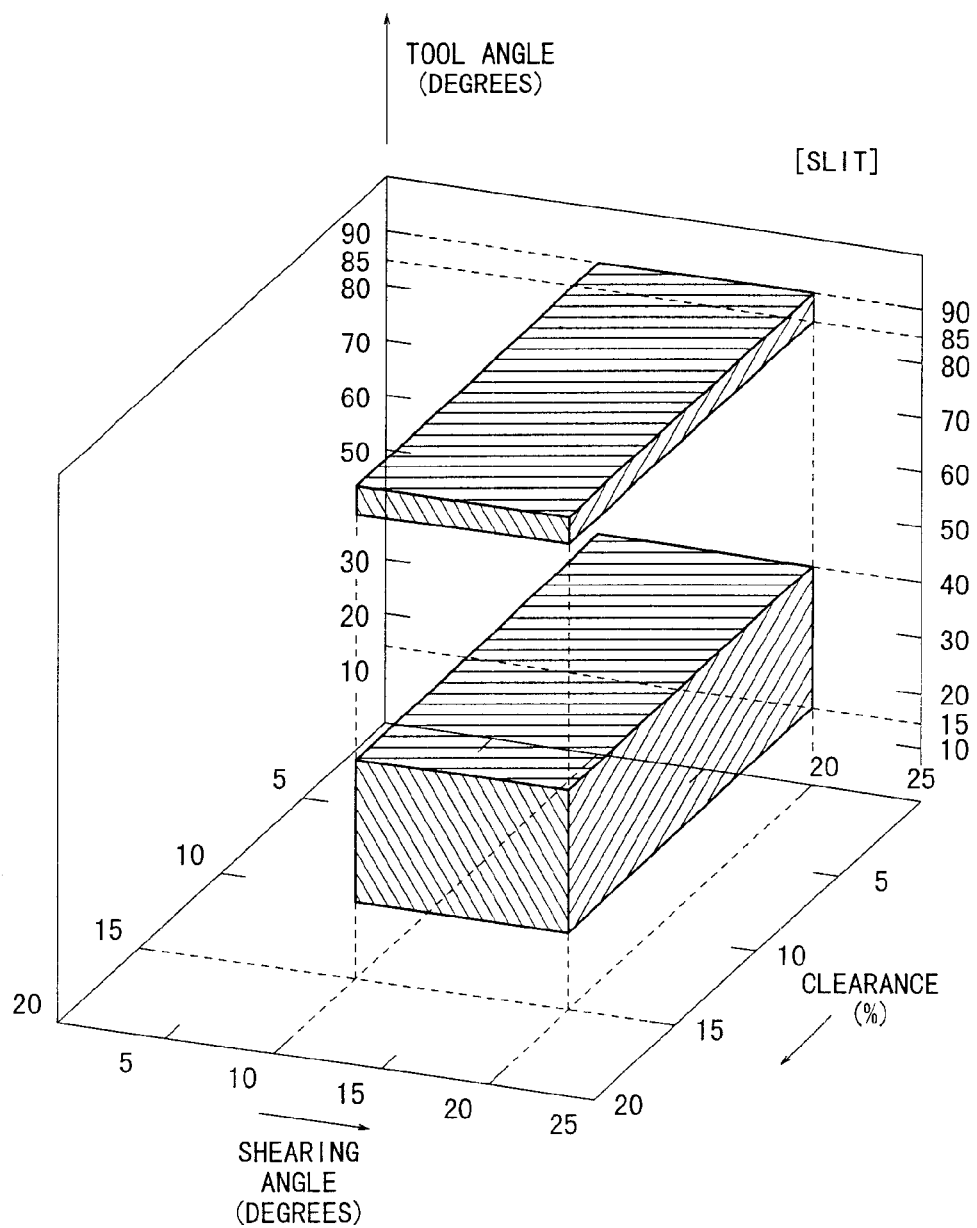
FIG. 59 is a diagram for explaining the ranges of the tool angle, the shearing angle and the clearance in the cross cutting machine.

The first and second blade members 460 and 462 are set in one direction with the shear angle of β2 degrees, but there may be used first and second blade members 460a and 462a which are set with in two directions with the shear angle of β2 degrees, as shown in FIG. 57. As a result, the first blade member 460a can be set with a double shear angle for the same movement as that of the first blade member 460.

Upstream of the slitting machine 440, as shown in FIGS. 49 and 50, there is arranged a first temperature sensor 474 for measuring the surface temperature of the thermal imaging material 412 on the emulsion side (or on the side of the image forming layer 412b) just before cut. Downstream of the cross cutting machine 442, there is arranged a second temperature sensor 476 for measuring the surface temperature of the thermal imaging material 412 on the emulsion side just after cut. The first and second temperature sensors 474 and 476 are preferably of the non-contact type and can be exemplified by an infrared thermography unit.

The temperature information, as measured by the first and second temperature sensors 474 and 476, are inputted to a controller 478, as shown in FIG. 50. This controller 478 controls the heat source unit for the heating roller 420 and the heat source for the unit for moving and driving the holding roller 422 and for the blower units 438 and 439, thereby to control the surface temperatures of the thermal imaging material 412 on the emulsion side just before and after cut, within a range from the temperature Tg (or the glass transition temperature) of the image forming layer to the thermal imaging temperature, preferably, within a range from the temperature of Tg° C. to 100° C. It is more preferable if the range is from the temperature of (Tg+5) ° C. to 100° C. In this case, it is unnecessary to simultaneously control the heat source unit for the heating roller 420 and the heat source for the unit for moving and driving the holding roller 422 and for the blower units 438 and 439, but it is arbitrary to make the controls most efficiently to the above-specified temperature ranges.

There may preferably be provided blade heating units for heating at least the blade portions of the slitting machine 440 and the cross cutting machine 442, so that the temperatures of the blades may be equalized to the surface temperature of the thermal imaging material 412 on the emulsion side when the thermal imaging material 412 is cut. At least the blade temperatures may preferably be contained within the temperature range from the Tg temperature (or the glass transition temperature) to the thermal imaging temperature, although not equalized to the surface temperature on the emulsion side.

As shown in FIG. 50, for example, the blade heating apparatus for the slitting machine 440 can adopt a structure in which the journals 444a and 446a of the first and second rotary blade members 444 and 446 are formed in cylinder shapes so that the hot water or steam, as produced by a heat source supply unit 480, may be supplied from one to the other of the journals 444a and 446a and circulated again to the heat source supply unit 480. On the other hand, the blade heating apparatus for the cross cutting machine 442 can adopt a structure in which a heater 482 is buried or fixed in the first and second blade members 460 and 462 thereby to heat the same. There may be additionally provided infrared thermography units for measuring the temperatures of the blades of the slitting machine 440 and the cross cutting machine 442, so that the measured information of the infrared thermography units may be inputted to the controller 478 to control the temperature of the blade of the cutter unit 414 as in the aforementioned temperature control of the heating unit 416.

Here will be described the aforementioned temperature Tg. This temperature Tg is determined from the point of inflection of the hardnesses of the image forming layer 412b, which are measured at various temperatures under the circumstance of a relative moisture of 50%. For these measurements, a miniature hardness meter of Fisher Scope H100VP for a sensitive layer and a Vickers pressure probe (having a facing angle of 136 degrees) are used, and the Vickers pressure probe is pushed into the image forming layer 412b to a depth of 50% of the film thickness. In this case, it is necessary to determine the temperature Tg of the image forming layer 412b and accordingly to remove the upper non-image forming layer from the image forming layer 412b. When the image forming layers 412b is present on the two sides of the support, on the other hand, there are determined the individual temperatures Tg, of which the higher one is employed as the temperature Tg of the invention.

The actions of the cutting apparatus 410 thus constructed will be described in the following.

First of all, the thermal imaging material 412 to be let off from the web unwinder 413 and transferred through the transfer passage, is heated in advance by the heating unit 416 before it is cut by the cutter unit 414. How high the thermal imaging material 412 is to be heated by the heating unit 416 is set so that the surface temperature of the thermal imaging material 412 on the emulsion side may fall, when cut, within a range from the temperature Tg (or the glass transition temperature) of the image forming layer 412b to the thermal imaging temperature, preferably within a range from a temperature of (Tg+5) ° C. to 100° C.

As a result, the image forming layer 412b becomes soft to lose the fragility before heated, so that the image forming layer 412b can be prevented, when cut by the cross cutting machine 442, from separating or cracking and from peeling from the base layer 412a. If, in this case, the temperatures of the blades of the slitting machine 440 and the cross cutting machine 442 are equalized to the surface temperature of the thermal imaging material 412 on the emulsion side, no heat transfer occurs between the thermal imaging material 412 and the blades. As a result, the temperature distribution hardly occurs in the thermal imaging material 412 so that the thermal imaging material 412 can be cut more satisfactorily.

Since the upper limit of the heating is set to the thermal imaging temperature or lower, or preferably to 100° C. or lower, on the other hand, the photographic performance of the image forming layer 412b in the thermal imaging material 412 is not deteriorated. It is further possible to prevent the heating temperature from growing excessively high and the image forming layer 412b from becoming too soft to cut. This raises an effect that the thermal imaging material 412 can be satisfactorily cut without causing the film separation or cracks of the image forming layer, independently of the blade shapes or the adjusting conditions of the upper blades of the slitting machine 440 and the cross cutting machine 442.

At the time of cutting the thermal imaging material 412, on the other hand, it is preferable that the image forming layer 412b has a film thickness within a range of 3 to 30 μm in addition to the aforementioned heating to the proper temperature. This is because if the film thickness of the image forming layer 412b is less than 3 μm, the temperature rise of the image forming layer 412b is so accelerated at the heating time whereas the temperature drop in the course from the heating apparatus 416 to the cutter unit 414 is so increased, thereby to make it difficult to control the temperature of the image forming layer 412b.

On the other hand, the temperature measurement of the image forming layer 412b cannot be grasped without measuring the surface temperature of the thermal imaging material 412 on the emulsion side. When the image forming layer 412b grows thicker than 30 μm, therefore, a temperature distribution is easily established between the portions close to and distant from the surface of the image forming layer 412b. As a result, the entirety of the image forming layer 412b is hardly kept homogeneous in the aforementioned temperature range, thereby to cause the film separation and crack of the image forming layer 412b at the cutting operation.

Here in the slitting machine 440, as shown in FIGS. 52 and 53, the first and second rotary blade members 444 and 446 are rotationally driven so that they and their first and second edges 448 and 452 contact at first with the surfaces of the image forming layer 412b and the base layer 412a of the thermal imaging material 412 to start the cutting of the thermal imaging material 412. The first and second rotary blade members 444 and 446 overlap each other in the predetermined biting depth H so that the thermal imaging material 412 is slit in the direction of arrow X under the rotary actions of the first and second rotary blade members 444 and 446.

Next, in the cross cutting machine 442, the first and second blade members 460 and 462 are arranged in the width direction (or in the direction of arrow Y) perpendicular to the let-off direction (or in the direction of arrow X) of the thermal imaging material 412, and the first blade member 460 moved up and down with respect to the second blade member 462. As a result, as shown in FIGS. 55 and 56, the first and second edges 464 and 470 of the first and second blade members 460 and 462 begin contacting with the image forming layer 412b and the base layer 412a along the widthwise direction of the thermal imaging material 412, thereby to cross-cut the thermal imaging material 412. As a result, three rows of sheets 419 are simultaneously formed and transferred in the X direction until they are stacked in a predetermined number on the sheet stacking unit 417 (as referred to FIG. 49).

Figure 64:
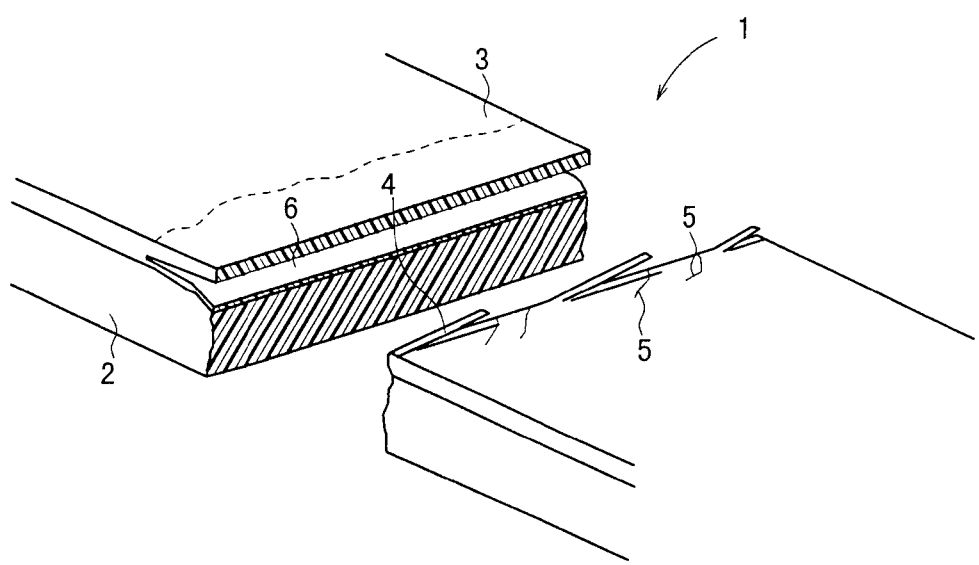
FIG. 64 is a perspective view for explaining a defective cutting.

Here in the cross cutting machine, the experiments for evaluating surface layer cracks 5, surface layer peels 4 and a crack 6 in an image forming layer 3, as shown in FIG. 64, were performed by changing the edge angle of α3 degrees of the first blade member 460, the shear angle of β2 degrees of the first and second blade members 460 and 462, and the clearance C2 between the first and second edges 464 and 470 of the first and second blade members 460 and 462 to various values. These experimental results are enumerated in Table 7. Here in Table 7, the symbols "X", "Δ" and "○" in the individual evaluation items are based on the evaluation standards, as enumerated in Table 8.

TABLE 7

| Sharpness Evaluation | | Edge Angle α3 of 1st Blade | | | | |
|---|---|---|---|---|---|---|
| Results | | 20° | 45° | 60° | 75° | 90° |
| Shear Angle (β2°) | 0° | ○/○/Δ | ○/X/X | ○/X/X | ○/X/X | ○/○/Δ |
| | 0.3° | ○/○/○ | ○/X/X | ○/X/X | ○/X/X | ○/○/○ |
| | 2.5° | ○/○/○ | ○/Δ/X | ○/Δ/X | ○/Δ/X | ○/○/○ |
| | 5° | ○/○/○ | ○/○/X | ○/○/X | ○/○/X | ○/○/○ |
| | 7.5° | X/○/○ | X/○/X | X/○/X | X/○/X | X/○/○ |

TABLE 8

| Levels Set for | | Evaluations | | |
|---|---|---|---|---|
| Sharpness Evaluation Items | | ○ | Δ | X |
| 1st Blade | Surface Crack | No | Few | Yes |
| | Surface Peel (%) | 0 | 0–5 | ≧5 |
| 2nd Blade | Crack in Image Forming Layer (mm) | 0 | 0–0.1 | ≧0.1 |

The individual evaluation items in Table 7 are enumerated from the left to the right in the recited order of the surface layer cracks 5, the surface layer peels 4 and the crack 6 in the image forming layer 3. On the other hand, the clearance C2 is set to a predetermined value of 15% or less.

Within the ranges of the edge angle of α3 from 20 to 90 degrees and the shear angle of β2 from 0.3 to 5 degrees of the first blade member 460, therefore, the thermal imaging material 412 can be cut in a high quality without any trouble. More detailed experiments were performed for the edge angle of α3. In these experiments, the satisfactory results were obtained within the ranges of the edge angle of α3 from 15 to 40 degrees and from 85 to 90 degrees.

It was further inspected whether or not the beards were formed in the base layer 412a. As enumerated in Table 9, no beard was formed with the satisfactory results for the clearance C2 of 15% or less.

TABLE 9

| Clearance (C2) | 0 | 5 | 10 | 15 | 20 |
|---|---|---|---|---|---|
| Beard | No | No | No | No | Yes |

Here, the aforementioned experiments are the results which were obtained by using the thermal imaging material 412 having the image forming layer 412b of a thickness of about 30 μm, but similar results are obtained even when similar experiments were performed by using a thermal imaging material 412 having an applied substance of a substantially identical composition and having a thickness of about 20 μm.

Figure 65:
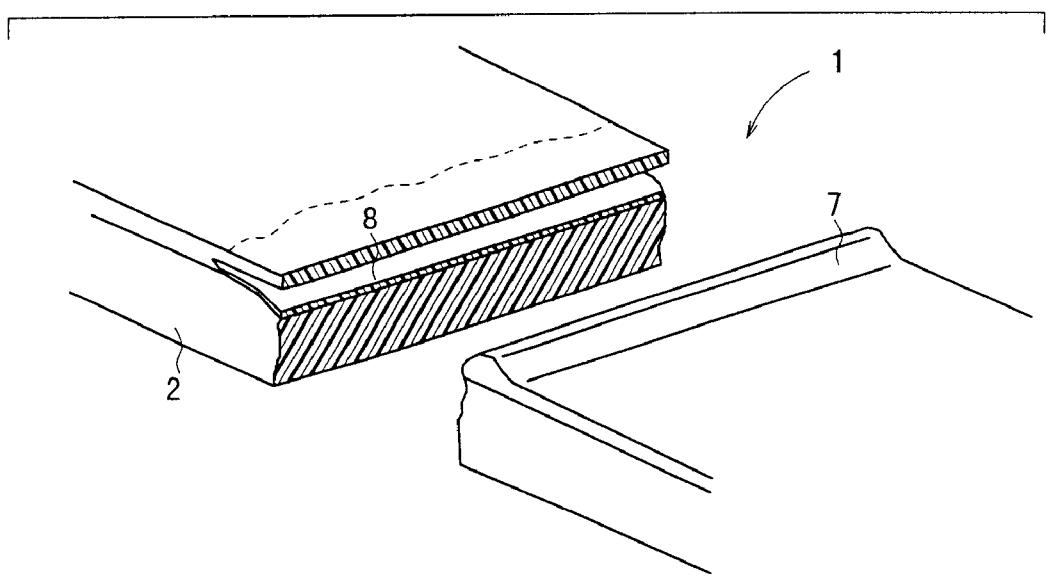
FIG. 65 is a perspective view for explaining a defective slitting.

In the slitting machine 440 as well, on the other hand, experiments were performed to evaluate the extents of the banking 7 and the crack 8 in the image forming layer 3, as shown in FIG. 65, by changing the edge angle of α1 of the first rotary blade member 444, the shear angle of β1 of the first and second edges 448 and 452, and the clearance C1 between the first and second edges 448 and 452 to various values. The experimental results are enumerated in Table 10. In Table 10, the individual evaluation items are enumerated from the left to the right in the recited order of the banking 7 and the crack 8 in the image forming layer 3, and their extents are evaluated at three stages of "X", "Δ" and "○". These evaluation standards are enumerated in Table 11.

TABLE 10

| Edge Angle of α1 of 1st Rotary Blade Member 444 | | | | | | | | |
|---|---|---|---|---|---|---|---|---|
| 15° | 20° | 30° | 45° | 60° | 75° | 80° | 85° | 90° |
| ○/○ | ○/○ | ○/○ | Δ/X | X/X | X/X | Δ/X | ○/○ | ○/○ |

TABLE 11

| Levels Set for Sharpness Evaluation | | Evaluations | | |
|---|---|---|---|---|
| Items | | ○ | Δ | X |
| 1st Rotary Blade Member | Banking (microns) | 0 | 5–10 | ≧10 |
| 2nd Rotary Blade Member | Crack in Image Forming Layer (mm) | 0 | 0–0.1 | ≧0.1 |

Here, Table 10 enumerates the experimental results which were obtained under the conditions of the shear angle of β1 of 15 degrees and the clearance C1 of 0%. Thus, the thermal imaging material 412 could be cut satisfactorily for the edge angle of α1 within the ranges of 15 to 40 degrees and 85 to 90 degrees. For the shear angle of β1 and the clearance C1, moreover, the experiments were performed on whether or not the beard was formed in the base layer 412a, and their results are enumerated in Table 12.

TABLE 12

| | | Clearance C1 (%) | | | | |
|---|---|---|---|---|---|---|
| Beard | | 0 | 5 | 10 | 15 | 20 |
| Shear Angle (β1°) | 5° | Yes | Yes | Yes | Yes | Yes |
| | 10° | No | No | No | No | Yes |
| | 15° | No | No | No | No | Yes |
| | 20° | No | No | No | No | Yes |
| | 25° | Yes | Yes | Yes | Yes | Yes |

By setting the clearance C1 to 15% or less and the shear angle of 1 within a rage of 10 to 20 degrees, therefore, there is obtained an effect that the slitting operation can be efficiently executed without any beard but in a high quality.

Here, the edge angles of α1 and α2 are set within the range of 15 to 40 degrees or 85 to 90 degrees but may be set preferably within a range of 25 to 35 degrees or 87.5 to 90 degrees and further preferably to a value of 30 to 90 degrees. The cutting experimental data of Table 1 to Table 6 are obtained by performing the experiments for the material having the Tg temperature (or the glass transition temperature) of 17° C.

Figure 60:
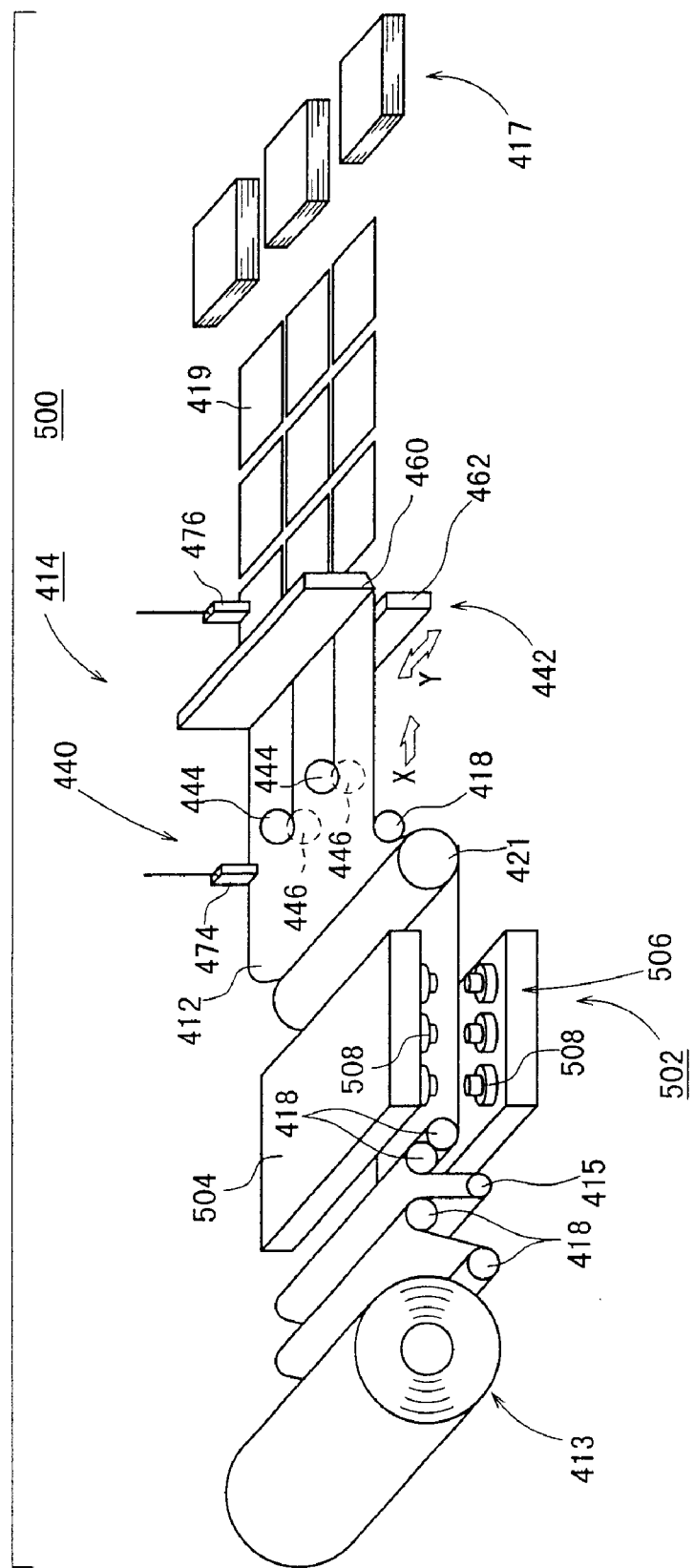
FIG. 60 is a perspective view showing a schematic construction of a cutting apparatus according to a sixteenth embodiment of the invention.
Figure 61:
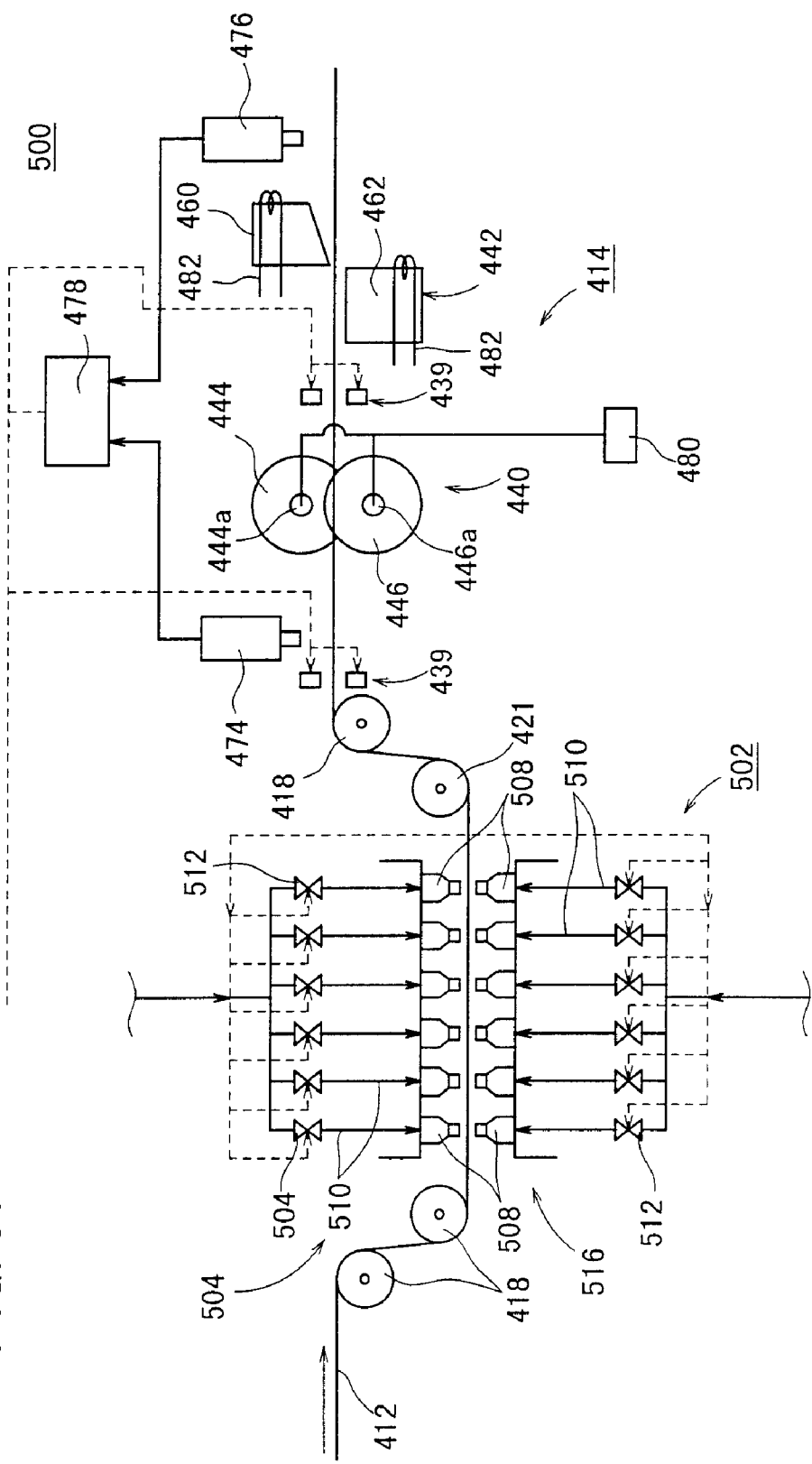
FIG. 61 is a schematic side elevation of the cutting apparatus.

FIG. 60 is a perspective view showing a schematic construction of a cutting apparatus 500 according to a sixteenth embodiment of the invention, and FIG. 61 is a schematic side elevation of the cutting apparatus 500. Here, the same components as those of the cutting apparatus 410 according to the fifteenth embodiment are designated by the common reference numerals, and their detailed description will be omitted.

This cutting apparatus 500 is provided with a heating unit 502 for heating the thermal imaging material 412 with a hot wind. This heating unit 502 is equipped, along the transfer passage of the thermal imaging material 412, with an upstream hot wind mechanism 504 arranged upstream of the thermal imaging material 412, and a downstream hot wind mechanism 506 arranged downstream of the same. In these hot wind mechanisms 504 and 506, there are arrayed a number of nozzles 508 for injecting the hot wind. These nozzles 508 are supplied with the hot wind from the not-shown hot wind supply unit through air pipes 510. An amount of the hot wind flows to be supplied can be individually adjusted by flow adjusting valves (or flow adjusting means) 512 which are disposed in the air pipes 510 for the individual nozzles 508.

The temperature information, as measured by the first and second temperature sensors 474 and 476, are inputted to the controller 478, which adjusts the openings of the flow adjusting valves 512 individually. According to the transfer velocity of the thermal imaging material 412 to be transferred, moreover, the arrayed multiple nozzles 508 are opened/closed to make the blows variable, thereby to change the length of the heating area, as formed between the upstream hot wind mechanism 504 and the downstream hot wind mechanism 506, and to adjust the hot wind flow.

As a result, the surface temperature of the thermal imaging material 412 on the emulsion side can be controlled to fall within a range from the Tg temperature (the glass transition temperature) of the image forming layer 412b to the thermal imaging temperature, preferably within a range from the (Tg+5) ° C. to 100° C.

Here in the cutting apparatus 410 and 500 according to the fifteenth and sixteenth embodiments, the temperature controls are difficult when the image forming layer 412b is thin. It is, therefore, preferable to make as short as possible the transfer distance of the thermal imaging material 412 from the heating units 416 and 502 to the cutter unit 414 and to form a (not-shown) tunnel of insulation plates or the like in the transfer passage.

Here will be described in detail a preferred state of the thermal imaging material 412 of the case in which the image forming layer 412b is a photosensitive layer.

The organic silver salt to be used in the thermal imaging material 412 of the invention is a silver salt, which is relatively stable to a light but forms a silver image when it is heated to 80° C. or higher in the presence of an exposed optical catalyst (such as a latent image of a photosensitive silver halide) and a reducer. The organic silver salt may be any organic substance containing a source capable of reducing the silver ion. This non-photosensitive organic silver salt is described in paragraph numbers [0048] to [0049] of Japanese Laid-Open Patent Publication No. 10-62899, on line 24 of page 18 to line 37 of page 19 of Unexamined Published European Patent Application No. 0803764A1, in Unexamined Published European Patent Application No. 0962812A1 and so on. The preferred silver salt of an organic acid is a long-chain aliphatic silver caboxylate (having a carbon number of 10 to 30, preferably 15 to 28). The organic silver salt is preferably exemplified by silver behenate, silver arachidate, silver stearate, silver oleate, silver laurate, silver caprate, silver myristate or silver palmitate, or their mixtures. Of these organic silver salts, it is preferable in the invention to use an organic silver salt containing 75 mol % or more behenate acid.

The shape of the organic silver salt should not be specifically limited but may be acicular, baculiform, flat and scaly forms, and the organic silver salt of the scaly form is preferred. Specifically, the organic acid silver salt is observed with an electron microscope, and its particle is approximated to have a box shape which has sides a, b and c (c may be equal to b) from the shortest one. Calculations are performed with the shorter numerical values a and b, and x is determined from a formula x=b/a.

For about 200 particles, the value x is determined and is averaged to a value x (average). The scaly shape is determined if the value x (average) satisfies a relation of x (average)≧1.5, preferably, 20≧x (average)≧2.0. Here, the acicular shape is determined if the value x (average) is within 1≦x (average)<1.5.

In the scaly particles, the side a can be deemed as the thickness of the flat particle, the main plane of which has the sides b and c. The average value of the side a is preferable within a range of 0.01 μm to 0.23 μm, more preferably within a range of 0.1 μm to 0.20 μm. The average ratio of c/b is preferably within a range of 1 to 6, more preferably within a range of 1.05 to 4, still more preferably within a range of 1.1 to 3, most preferably within a range of 1.1 to 2.

The particle size distribution of the organic silver salt is preferred to be monodisperse. This monodispersion has such percentages, which are calculated by dividing the standard deviations of the lengths of the shorter axis and the longer axis respectively by the lengths of the shorter axis and the longer axis, as are preferably 100% or less, more preferably 80% or less, or still more preferably 50% or less. The shape of the organic silver salt can be measured from the transmission type electron microscope image of the organic silver salt dispersion. Another method for measuring the monodispersion is to determine the standard deviation of the volume-weighted mean diameter of the organic silver salt. The percentages (or fluctuation coefficient) of the values, as divided by the volume-weighted mean diameter, are preferably 100% or less, more preferably 80% or less, or still more preferably 50% or less. In the measuring method, the particle size can be determined from that (or the volume-weighted mean diameter), as obtained by irradiating the organic silver salt dispersed in a liquid with a laser beam and by determining a self-correlation function of the fluctuation of the scattered beam with respect to the time change.

To the production and dispersion methods of the organic silver salt, there can be applied the well-known methods, as could be referred to the aforementioned Japanese Laid-Open Patent Publication No. 10-62899, Unexamined Published European Patent Application No. 0803763A1, Unexamined Published European Patent Application No. 962812A1 and so on.

Here, if the photosensitive silver salt coexists at the dispersion time of the organic silver salt, the fogging rises to lower the sensitivity seriously. It is, therefore, preferable that the photosensitive silver salt is not substantially contained at the dispersion time. In the invention, the quantity of the photosensitive silver salt to be dispersed in a water dispersion is 0.1 mol % or less with respect to 1 mol of the organic acid silver salt in the solution, so that the photosensitive silver salt is not positively added.

The water dispersion of the organic silver salt and the water dispersion of the photosensitive silver salt can be mixed to produce a photosensitive material, and the mixing ratio of the organic silver salt and the photosensitive silver salt can be selected for the purpose. The ratio of the photosensitive silver salt to the organic silver salt is preferably within a range of 1 mol% to 30 mol %, more preferably 3 mol% to 20 mol %, especially preferably within 5 mol % to 15 mol %. It is a preferably used method for adjusting the photographic characteristics to mix two kinds or more of water dispersions of organic silver salts and two kinds or more water dispersions of photographic silver salts.

The organic silver salt can be used in a desired quantity, but the silver quantity is preferably within a range of 0.1 g/m² to 5 g/m² or more preferably within a range of 1 g/m² to 3 g/m².

The thermal imaging material 412 to be employed in the invention is preferred to contain a reducer for the organic silver salt. This reducer for the organic silver salt may be any substance (preferably an organic substance) for reducing silver ions to metallic silver. This reducer is described in paragraph numbers [0043] to [0045] of Japanese Laid-Open Patent Publication No. 11-65021 or on page 34 of page 7 to on line 12 of page 18 of Unexamined Published European Patent Application No. 0803764A1. The reducer preferred especially in the invention is exemplified by bisphenol reducer (e.g., 1,1-bis (2-hydroxy-3,5-dimethylphenyl)-3,5, 5-trimethylhexane, 2,2'-methylene bis-(4-methyl-6-tert-butylphenol), 2,2'-methylene bis-(4-ethyl-6-tert-butylphenol)). The quantity of the reducer to be added is preferably within a range of 0.01 g/m² to 5.0 g/m² or more preferably within a range of 0.1 g/m² to 3.0 g/m², and is more preferably contained by 5 mol % to 50 mol % with respect to one mol of silver in the face having the image forming layer 412b or more preferably by 10 mol % to 40 mol %. The reducer is preferably contained in the image forming layer 412b.

The reducer may be contained in the liquid to be applied or in the photosensitive material, by any method including the solution state, the emulsified/dispersed state or the solid particle dispersed state.

As the well-known emulsifying/dispersing method, there is enumerated a method for preparing an emulsified dispersion mechanically by dissolving with oil, e.g., dibutylphthalate, tricresyl phosphate, clyceryl triacetate or diethyl phthalate, or an assistant solvent, e.g., ethyl acetate or cyclohexanone.

As the solid particle dispersing method, on the other hand, there is enumerated a method for preparing a solid dispersion by dispersing a reducer powder in a suitable solvent such as water by a ball mill, a colloid mill, a vibration ball miss, a sand mill, a jet mill, a roller mill or ultrasonic waves. Then, there may be used a protective colloid (e.g., polyvinyl alcohol) or a surface-active agent (e.g., an anionic surface-active agent such as triisopropyl naphthalene sodium sulfonate (i.e., a mixture of three isopropyl groups having different substitution positions)). The water dispersion can contain a preservative (e.g., sodium benzoisothiazolinone).

In the thermal imaging material 412 to be employed in the invention. there is preferably used as a development promotor a phenol derivative, as expressed by Formula (A) described in Japanese Laid-Open Patent Publication No. 11-73951.

The photosensitive silver halide to be employed in the thermal imaging material 412 employed in the invention should not be especially restricted in its halogen composition and can be exemplified by silver chloride, silver chloride-bromide, silver bromide, silver iodide-bromide or silver iodide-chloride-bromide. The distribution of the halogen composition in the particles may be homogeneous or stepwise or continuously changed. On the other hand, it is possible to preferably use silver halide particles having a core/shell structure. The structure is preferably a double to quintuple one, and more preferably core/shell particles having a double to quadruple structure can be used. On the other hand, it is possible to preferably use the technique of causing the silver bromide locally in the surfaces of the silver chloride or silver chloride-bromide particles.

The method of preparing the photosensitive silver halide is well known in the art, as described in No. 17029, June of 1978 of Research Disclosure and U.S. Pat. No. 3,700,458. In the specific method to be used, the photosensitive silver halide is prepared by adding a silver feeding compound and a halogen feeding compound to a gelatin or another polymer solution and is then mixed with the organic silver salt. On the other hand, there are preferred the method, as described in paragraph numbers [0217] to [0224] of Japanese Laid-Open Patent Publication No. 11-119374, and the method, as disclosed in Japanese Patent Application Nos. 11-98708 and 11-84182.

The particle size of the photosensitive silver halide is preferred to be small for suppressing the cloudiness of the formed image and is specified by 0.20 $\mu$m or less, more preferably within a range of 0.01 $\mu$m to 0.15 $\mu$m, further preferably within a range of 0.02 $\mu$m to 0.12 $\mu$m. The particle size, as defined herein, is the diameter of a sphere having a volume equal to that of the silver halide particles, when the silver halide particles are the so-called "normal crystal" such as a cube or octahedron or when not the normal crystal such as spherical particles or baculiform particles, and the diameter of a circular image having the same area as the projected area of the principal surface when the silver halide particles are flat ones.

As the shape of the silver halide particles, there can be enumerated the cubic shape, the octahedron shape, the flat particles, the spherical particles, the baculiform or the potato-shaped particles or the like, of which the cubic particles are especially preferred in the invention. The silver halide particles having rounded corners can be preferably used. No special restriction is on the indices of a plane (i.e., Miller indices) of the outer surfaces of the photosensitive silver halide particles, but it is preferable that the plane {100} having a high spectroscopic sensitizing efficiency when the spectroscopic sensitizing pigment is adsorbed takes a high ratio of occupation. The ratio is preferably 50% or more, more preferably 65% or further preferably 80% or more. The ratio of the {100} plane of the Mirror indices can be determined by the method which is described in J. Imaging Sci., 29, 165 (1985) by T. Tani, as making use of the adsorption dependencies of the plane {111} and the plane {100} in the adsorption of the sensitizing pigment.

The photosensitive silver halide particles in the thermal imaging material 412 to be employed in the invention contain either a metal of the eighth to tenth groups of the periodic table (indicating the first to eighteenth groups) or its complex. The central ones of the metals or their complexes of the eighth to tenth groups of the periodic table are preferably rhodium, ruthenium and iridium. It is arbitrary to use one kind of those metal complex or two or more kinds of complexes of the metal of the same kind or the metals of different kinds. A preferable rate of content is within a range of $1 \times 10^{-9}$ mols to $1 \times 10^{-3}$ mols for one mol of silver. These heavy metals, their complexes and their adding methods are described in Japanese Laid-Open Patent Publication No. 7-225449, in paragraph numbers [0018] to [0024] of Japanese Laid-Open Patent Publication No. 11-65021 and in paragraph numbers [0227] to [0240] of Japanese Laid-Open Patent Publication No. 11-119374.

In the invention, the silver halide particles are preferred to contain an iridium compound. As this iridium compound, there are enumerated hexachloro iridium, hexaammine iridium, trioxalato iridium and hexcyano iridium. These iridium compounds are dissolved, when used, in water or a suitable solvent. In order to stabilize the solution of the iridium compound, however, there can be used an ordinary method such as the method of adding an water solution of hydrogen halide (e.g., hydrochloric acid, hydrobromic acid or hydrofluoric acid) or an alkali halide (e.g., KCl, NaCl, KBr or NaBr). At the time of preparing the silver halide, other silver halide particles doped in advance with iridium could be added and dissolved in place of water-soluble iridium. The amounts of those iridium compounds are preferably within a range of $1 \times 10^{-8}$ mols to $1 \times 10^{-3}$ mols per mole of silver halide or more preferably within a range of $1 \times 10^{-7}$ mols to $5 \times 10^{-4}$ mols.

Moreover, the metal atoms (e.g., $[Fe(CN)_6]^{4-}$) to be contained in the silver halide particles in the thermal imaging material 412, as employed in the invention, the desalting method and the chemical sensitizing method of the silver halide emulsion are described in paragraph numbers [0046] to [0050] of Japanese Laid-Open Patent Publication No. 11-84574, in paragraph numbers [0025] to [0031] of Japanese Laid-Open Patent Publication No. 11-65021, and in paragraph numbers [0242] to [0250] of Japanese Laid-Open Patent Publication No. 11-119374.

The gelatin to be contained in the photosensitive silver halide emulsion can be various. In order to keep the dispersion state of the photosensitive silver halide emulsion in the applied liquid containing the organic silver salt, it is preferable to employ gelatin having a molecular weight as low as 500 to 60,000. These gelatins of low molecular weights may be employed at the particle forming time or at the dispersion time after the desalting treatment but is preferably employed at the dispersion time after the desalting treatment.

As the sensitizing pigment to be applied to the thermal imaging material 412 employed in the invention, there can be advantageously selected the sensitizing pigment which can sensitize the spectroscopy of the silver halide particles in a desired wavelength range when adsorbed by the silver halide particles and which has a spectroscopic sensitivity suited for the spectroscopic characteristics of the exposing light source. The sensitizing pigment and the adding method are described in paragraph numbers [0103] to [0109] of Japanese Laid-Open Patent Publication No. 11-65021, as the compounds expressed by the general Formula (II) of Japanese Laid-Open Patent Publication No. 10-186572, as the pigment expressed by general Formula (I) and in paragraph number [0106] of Japanese Laid-Open Patent Publication No. 11-119374, as the pigment described in Embodiment 5 of U.S. Pat. No. 5,510,236 and U.S. Pat. No. 3,871,887, as the pigment disclosed in Japanese Laid-Open Patent Publication Nos. 2-96131 and 59-48753, and on line 38 of page 19 to line 35 of page 20 of Unexamined Published European Patent Application No. 0803764A1. These sensitizing pigments may be used solely or in combination of two kinds or more. The addition of the sensitizing pigment to the silver halide emulsion is preferably timed after the desalting step and before its application or more preferably after the desalting and before the start of chemical aging.

The amount of the sensitizing pigment to be added can be exemplified by a desired value according to the performances such as the sensitivity or fogging, but may be preferably within a range of $10^{-6}$ mols to 1 mol per mole of the silver halide of the photosensitive layer or more preferably within a range of $10^{-4}$ mols to $10^{-1}$ mols.

The thermal imaging material 412 to be employed in the invention can be exemplified by an intense color sensitizer so as to improve the spectroscopic sensitizing efficiency. As this intense color sensitizer, there are enumerated the compounds which are described in Unexamined Published European Patent Application No. 587,338, U.S. Pat. Nos. 3,877, 943 and 4,873,184 and Japanese Laid-Open Patent Publication Nos. 5-341432, 11-109547 and 10-111543.

The photosensitive silver halide particles in the thermal imaging material 412 to be employed in the invention are preferred to be chemically sensitized by the sulfur sensitizing method, the selenium sensitizing method or the tellurium sensitizing method. The compounds to be preferably used in the sulfur sensitizing method, the selenium sensitizing method or the tellurium sensitizing method are exemplified by the well-known compounds such as those described in Japanese Laid-Open Patent Publication No. 7-128768. Especially in the invention, the tellurium sensitizing method is preferred, and the preferable compounds are described in paragraph number [0030] of Japanese Laid-Open Patent Publication No. 11-65021 and are exemplified by general Formulas (II), (III) and (IV) of Japanese Laid-Open Patent Publication No. 5-313284.

For the thermal imaging material 412 to be employed in the invention, the chemical sensitization can be timed at any time before the particle formation and before the application, as exemplified after the desalting and (1) before the spectroscopic sensitization, (2) simultaneously with the spectroscopic sensitization, (3) after the spectroscopic sensitization and (4) just before the application. Of these, the timing (3) after the spectroscopic sensitization is especially preferable.

The amount of the sulfur, selenium or tellurium sensitizer to be used in the thermal imaging material 412 employed in the invention changes with the silver halide particles or the chemical aging conditions to be employed, but is within a range of $10^{-8}$ mols to $10^{-2}$ mols per mole of the silver halide or more preferably within a range of $10^{-7}$ mols to $10^{-3}$ mols.

The chemical sensitizing conditions are not especially restricted, but the pH is 5 to 8; the pAg is 6 to 11; and the temperature is about 40 to 95° C.

To the silver halide emulsion in the thermal imaging material 412 to be employed in the invention, there may be added a thiosulfonate by the method disclosed in Unexamined Published European Patent Application No. 293,917.

The photosensitive silver halide emulsion in the thermal imaging material 412 to be employed in the invention may be of one kind or two or more kinds (which are different in the mean particle size, the halide composition, the crystal properties and the chemical sensitizing condition). The gradation can be adjusted by using a plurality of kinds of photosensitive silver halides of different sensitivities. As these techniques, there can be enumerated Japanese Laid-Open Patent Publication Nos. 57-119341, 53-106125, 47-3929, 48-55730, 46-5187, 50-73627 57-150841 or the like. The sensitivity difference may be preferred to have a difference of 0.2 logE for each emulsion.

The amount of the sensitive silver halide to be added is preferable, in terms of the amount of applied silver per 1 $m^2$ of the sensitizer, within a range of 0.03 $g/m^2$ to 0.6 $g/m^2$, more preferably within a range of 0.05 $g/m^2$ to 0.4 $g/m^2$, or most preferably within a range of 0.1 $g/m^2$ to 0.4 $g/m^2$. For one mol of the organic silver salt, the photosensitive silver halide is preferably within a range of 0.01 mols to 0.5 mols, or more preferably within a range of 0.02 mols to 0.3 mols.

For the mixing method and the mixing conditions of the sensitive silver halide and the organic silver salt prepared separately, there is: the method of mixing the silver halide particles and the organic silver salt prepared separately, by the high-speed agitator, the ball mill, the sand mill, the colloid mill, the vibration mill and the homogenizer; or the method of mixing the photosensitive silver halide, as having been prepared at any timing of the organic silver salt being prepared, to prepare the organic silver salt. However, the method is not especially limitative so long as the effect of the invention sufficiently appears. On the other hand, it is a method preferred for adjusting the photographic characteristics to mix two or more kinds of water dispersions of organic silver salts and two or more kinds of water dispersions of photosensitive silver salts.

The preferable timing for adding the silver halide of the thermal imaging material 412 to be employed in the invention into the applied liquid for the image forming layer is for the time period from 180 mins. to just before the application, preferably from 60 mins. to 10 secs. before the application. This timing is not especially limitative so long as the effects of the invention sufficiently appear. The specific mixing method is exemplified by the method of mixing in the tank so that the average residual time calculated from the addition flow rate and the feed rate to the coater may be a desired one, or by the method employing the static mixer, as described in Section 8 of "Liquid Mixing Technique" (published by Nikkan Kogyo Sinbunsha, in 1989), edited by N. Harnby, M. F. Edwards & A. W. Nienow and translated by Kohji Takahashi.

The binder of the organic silver salt containing layer of the thermal imaging material 412 to be used in the invention may be any polymer, and the suitable binder is transparent or semitransparent and generally colorless and is exemplified by a natural polymer synthetic resin, a polymer or a copolymer, or a medium forming other films, such as: gelatin, acacia gum, polyvinyl alcohol, hydroxyethyl cellulose, cellulose acetate, cellulose acetate butylate, poly (vinylpyrolidone), casein, starch, poly (acrylic acid), poly (methyl methacrylate), poly (vinyl chloride), poly (methacrylate), copolymer of styrene-maleic unhydride, copolymer of styrene-acrylonitrile, copolymer of styrene-butadiene, poly (vinyl acetal) (e.g., poly (vinyl formal) and poly (vinylbutyral)), poly (esters), poly (urethanes), phenoxy resins, poly (vinylidene chloride), poly (epoxides), poly (carbonates), poly (vinylacetate), cellulose esters, poly (amidos). The binder may be coated of water, an organic solvent or emulsion.

In the thermal imaging material 412 to be used in the invention, the organic silver salt containing layer is improved when it is formed by using an applied liquid containing 30 wt. % or more of water of the solvent and by drying it and when its binder is made of latex of a polymer which can be dissolved or dispersed in a water type solvent (or water solvent) and which has an equilibrium water content of 2 wt. % or less at 25° C. and at 60% RH. The most preferable state is obtained by preparing the organic silver salt containing layer to have an ion conductivity of 2.5 mS/cm or less, and this preparing method is exemplified by the method of purifying with a film having a separating function after the polymer was synthesized.

The aforementioned water type solvent, in which the polymer can be dissolved or dispersed, is either water or a mixture containing 70 wt. % or less of a water-blendable organic solvent and water. The water blendable organic solvent can be exemplified by: an alcohol group including methyl alcohol, ethyl alcohol and propyl alcohol; a cellosolve group including methyl cellosolve, ethyl cellosolve and butyl cellosolve; ethyl acetate; and dimethyl formamido.

Here, the system, in which the polymer is not thermodynamically dissolved but is present in the so-called "disperse state", is also termed as the "water type solvent".

On the other hand, the "equilibrium water content at 25° C. and at 60% RH" can be expressed, as follows, by using the weight W1 of the polymer in the atmosphere of 25° C. and 60% RH and in the moisture-controlled equilibrium and the weight W0 of the polymer at 25° C. and in the absolutely dry state:

Equilibrium Water Content at 25° C. and at 60% RH=$\{(W1-W0)/W0\} \times 100$ (in wt. %).

The definition and the measurement method of the water content can be referred to "Polymer Engineering Course 14" and "Polymer Material Testing Method" (edited by Polymer Association and published by Chijin Shokkan).

The equilibrium water content at 25° C. and 60% RH of the binder polymer of the thermal imaging material 412 to be employed in the invention is preferably 2 wt. % or less, more preferably within a range of 0.01 wt. % to 1.5 wt. %, further preferably within a range from 0.02 wt. % to 1 wt. %.

In the thermal imaging material 412 to be used in the invention, there is preferred the polymer which can be dispersed in the water type solvent. The dispersed state may be exemplified either by the latex, in which the fine particles of water-insoluble hydrophobic polymer are dispersed, or by the dispersion of the polymer molecules in the molecule state or micelle. The mean diameter of the disperse particles is preferably within a range of 1 nm to 50,000 nm or more preferably within a range of about 5 nm to 10,000. The diameter distribution of the disperse particles should not be especially limited but may have a wide diameter distribution or a monodisperse diameter distribution.

As the preferred state of the polymer, which can be dispersed in the water type solvent in the thermal imaging material 412 to be employed in the invention, there can be preferably used a hydrophobic polymer such as an acrylic resin, a polyester resin, a rubbery resin (e.g., the SBR resin), a polyurethane resin, a vinyl chloride resin, a vinyl acetate resin, a vinylidene chloride resin or a polyolefin resin. These polymers may be exemplified by straight-chain polymers, branched polymers, bridged polymers, the so-called "homopolymers" having single monomers polymerized, or copolymers having two kinds or more polymerized monomers. These copolymers may be random copolymers or block copolymers. These polymers may have a number average molecular weight of 5,000 to 1,000,000 or preferably 10,000 to 200,000. The polymers having an excessively small molecular weight is insufficient in the dynamic strength of the emulsion layer, whereas the polymers having an excessively large molecular weight is not preferable because its filming property is poor.

The preferred polymer latex can be specifically enumerated, as follows. In the following, the polymer latexes are expressed by their material monomers, and the parenthesized numerical values indicate the wt. % whereas the molecular weights (MW) indicate the number average molecular weights.

P-1: Latex (MW 37,000) of -MMA(70)-EA(27)-MAA(3);

P-2: Latex (MW 40,000) of -MMA(70)-2EHA(20)-St(5)-AA(5);

P-3: Latex (MW 45,000) of -St(50)-Bu(47)-MMA(3)-;

P-4: Latex (MW 60,000) of -St(68)-Bu(29)-AA(3)-;

P-5: Latex (MW 120,000) of -St(70)-Bu(27)-IA(3)-;

P-6: Latex (MW 108,000) of -St(75)-Bu(24)-AA(1)-;

P-7: Latex (MW 150,000) of -St(60)-Bu(35)-DVB(3)-MAA(2)-;

P-8: Latex (MW 280,000) of -St(70)-Bu(25)-DVB(2)-AA(3)-;

P-9: Latex (MW 80,000) of -VC(50)-MMA(20)-EA(20)-AN(5)-AA(5)-;

P-10: Latex (MW 67,000) of -VDC(85)-MMA(5)-EA(5)-MAA(5)-;

P-11: Latex (MW 12,000) of -Et(90)-MAA(10);

P-12: Latex (MW 130,000) of -St(70)-2EHA(27)-AA(3);

P-13: Latex (MW 33,000) of -MMA(63)-EA(35)-AA(2);

P-14: Latex (MW 60,000) of -St(71)-Bu(26)-AA(3); and

P-15: Latex (MW 60,000) of -St(77)-Bu(20)-AA(3).

The abbreviations in the aforementioned structures indicate the following monomers. MMA: methyl methacrylate, EA: ethyl acrylate, MMA: methacrylic acid, 2EHA: diethyl hexyl acrylate, St: styrene, Bu: butadiene, AA: acrylic acid, DVB: divinyl benzene, VC: vinyl chloride, AN: acrylonitrile, VDC: vinylidene chloride, Et: ethylene, and IA: itaconic acid.

The polymer latexes thus far enumerated are commercially available, as follows. The acrylic resins are exemplified by: Cebian A-4635, 46583 and 4601 (Daiseru Kagaku Kogyo KK); and Ni pol Lx 811, 814, 821, 820 and 857 (Nippon Zeon KK). The polyester resins are exemplified by: FINETEX ES 650, 611, 675 and 850 (Dainippon Inki KK); and WD-size and WMS (Eastman Chemical KK). The polyurethane resins are exemplified by HYDRAN AP 10, 20, 30 and 40 (Dainippon Inki Kagaku KK). The rubbery resins are exemplified by: LACSTAR 7310K, 3307B, 4700H and 7132C (Dainippon inki Kagaku KK); and Nipol Lx 416, 410, 438C and 2507 (Nippon Zeon KK). The vinyl chloride resins are exemplified by G351 and 576 (Nippon Zeon KK). The vinylidene chloride resins are exemplified by L502 and 513 (Asahi Kasei Kogyo KK). The olefin resins are exemplified by CHEMIPEARL S120 and S A100 (Mitsui Sekiyu Kagaku KK).

These polymer latexes may be used singly, or two or more kinds may be blended, if necessary.

As the latex to be used in the thermal imaging material 412 employed in the invention, there is preferred the latex of the styrene-butadiene copolymer. It is preferred that the weight ratio between the monomer unit of the styrene in the styrene-butadiene copolymer and the monomer unit of the butadiene is 40:60 to 95:5. It is also preferred that the ratio to be occupied by the copolymer of the styrene monomer unit and the butadiene monomer unit is 60 wt. % to 99 wt. %. The preferable molecular weight range is similar to the aforementioned one.

As the latex of the styrene-butadiene copolymer to be preferably used in the thermal imaging material 412 employed in the invention, there are enumerated the aforementioned P-3 to P-8 and the commercially available LACSTAR-3307B, 7132C, Nipol Lx416.

To the organic silver salt containing layer of the thermal imaging material 412 to be employed in the invention, there may be added, if necessary, a hydrophilic polymer such as gelatin, polyvinyl alcohol, methyl cellulose, hydroxy propyl cellulose or carboxy methyl cellulose. The amount of these hydrophilic polymers to be added is preferably 30 wt. % or less of the whole binder of the organic silver salt containing layer, or more preferably 20 wt. % or less.

The organic silver salt containing layer (i.e., the image forming layer 412b) is preferably formed by using the polymer latex. The amount of the binder of the organic silver salt containing layer is preferred to have a weight ratio of the whole binder/the organic silver salt within a range of 1/10 to 10/1 or more preferably within a range of 1/5 to 4/1.

On the other hand, such organic silver salt containing layer is ordinarily exemplified by a photosensitive layer (or emulsion layer) containing a photosensitive silver halide, i.e., a photosensitive silver salt. In this case, the weight ratio of the whole binder/the silver halide is preferably within a range of 400 to 5, or more preferably within a range of 200 to 10.

The total binder amount of the image forming layer 412b of the thermal imaging material 412 to be employed in the invention is preferably 0.2 g/m$^2$ to 30 g/m$^2$, or more preferably within a range of 1 g/m$^2$ to 15 g/m$^2$. To the image forming layer 412b, on the other hand, there may be added a cross linking agent and a surface-active agent for improving the applicability.

The solvent (which cover the solvent and the dispersing agent, for simplicity) for applying a liquid for the organic silver salt containing layer of the thermal imaging material 412 to be employed in the invention is a water type solvent containing 30 wt. % or more of water. The components other than the water may be a water-blendable organic solvent such as methyl alcohol, ethyl alcohol, isopropyl alcohol, methyl cellosolve, ethyl cellosolve, dimethyl formamido or ethyl acetate. The water content of the solvent of the applied liquid is preferably 50 wt. % or more, or more preferably 70 wt. % or more. The preferable examples of the solvent compositions are not only the water, water/methyl alcohol=90/10, water/methyl alcohol =70/30, water/methyl alcohol/ dimethyl formamido=80/15/5, water/methyl alcohol/ethyl cellosolve=85/10/5, or water/methyl alcohol/isopropyl alcohol=85/10/5 (wherein the numerical values are at wt. %).

The fogging preventing agent, the stabilizer and the stabilizer precursor, as can be used in the thermal imaging material 412 to be used in the invention, are exemplified by those which are described in paragraph number [0070] of Japanese Laid-Open Patent Publication No. 10-62899 and on line 57 of page 20 to line 7 of page 21 of Unexamined Published European Patent Application No. 0803764A1. On the other hand, the fogging preventing agent to be preferably used in the invention is exemplified by organic halides, which are enumerated in paragraph numbers [0111] to [0112] of Japanese Laid-Open Patent Publication No. 11-65021. The preferable examples are the organic halides expressed by Formula (P) of Japanese Laid-Open Patent Publication No. 11-87297 or the organic polyhalides expressed by the general Formula (II) of Japanese Laid-Open Patent Publication No. 10-339934 (as specified by tribromo methyl naphtyl sulfone, tribromo methyl phenyl sulfone, bromo methyl (4-(2,4,6-trimethyl phenyl sulfonyl) phenyl) sulfone).

The method for incorporating the fogging preventing agent of the thermal imaging material 412 to be employed in the invention into the photosensitive material is exemplified by the method described in the aforementioned reducer incorporating method, and the organic polyhalides may be added in the disperse state of the solid fine particles.

As the remaining fogging preventing agents, there can be enumerated the mercury (II) salt of paragraph number [0113] of Japanese Laid-Open Patent Publication No. 11-65021, the benzoic acids of paragraph number [0114] of the same, the salicylic acid derivatives expressed by Formula (Z) of Japanese Laid-Open Patent Publication No. 11-87297, and the formalin scavengers expressed by Formula (S) of Japanese Laid-Open Patent Publication No. 11-23995.

The thermal imaging material 412 to be employed in the invention may contain azolium salt with a view to preventing the fogging. As this azolium salt, there can be enumerated a compound expressed by the general Formula (XI) described in Japanese Laid-Open Patent Publication No. 59-193447, a compound expressed by the general Formula (XI) described in Examined Published Japanese Patent Application No. 55-12581, and a compound expressed by the general Formula (II) described in Japanese Laid-Open Patent Publication No. 60-153039. The azolium salt may be added at any step of the photosensitive material and may be applied to the organic silver salt containing layer at any step from the organic silver salt preparing time to the applied liquid preparing time but preferably after the organic silver salt preparing time just before the application. The method of adding the azolium salt may be performed in any state of the powder, solution or fine particle dispersion. On the other hand, the azolium salt may be added as its solution mixed with another additive such as the sensitizing pigment, reducer or color toner. In the invention, the amount of the azolium salt to be added may be any but is preferably within a range of $1\times10^{-6}$ mols to 2 mols for 1 mol of silver, or more preferably within a range of $1\times10^{-3}$ mols to 0.5 mols.

In order to suppress, promote or control the development and to improve the spectroscopic sensitizing efficiency and the keeping quality before and after the development, the thermal imaging material 412 to be employed in the invention can contain mercapto compounds, disulfide compounds and thion compounds, such as the compounds described in paragraph numbers [0067] to [0069] of Japanese Laid-Open Patent Publication No. 10-62899, the compounds expressed by the general Formula (I) and their specific examples described in paragraph numbers [0033] to [0052] of Japanese Laid-Open Patent Publication No. 10-186572, and the specific examples described on lines 36 to 56 of page 20 of Unexamined Published European Patent Application No.

0803764A1 and in Japanese Laid-Open Patent Publication No. 11-273670. Of these compounds, mercapto-substituted heteroaromatic chemicals are preferred.

In the thermal imaging material 412 to be employed in the invention, there are preferably used compounds having phosphoryl groups or more preferably phosphine oxido groups, as specified by: triphenyl phosphine oxido, tri-(4-methyl phenyl) phosphine oxido, tri-(4-methoxy phenyl) phosphine oxido, tri-(t-butyl-phenyl) phosphine oxido, tri-(3-methyl phenyl) phosphine oxido or trioctyl phosphine oxido. The compounds having the phosphoryl group of the invention can be introduced into the sensitive material by a method similar to those of the reducer and the poly halides. The amount of the compounds having the phosphoryl group of the invention is preferably within a range of 0.1 to 10 for the addition ratio (in molar ratio) of the reducer, more preferably within a range of 0.1 to 2.0, or further preferably within a range of 0.2 to 1.0.

The color toner is preferably added to the thermal imaging material 412 to be employed in the invention. The color toner is described in paragraph numbers [0054] to [0055] of Japanese Laid-Open Patent Publication No. 10-62899, on lines 23 to 48 of page 21 of Unexamined Published European Patent Application No. 0803764A1 and in Japanese Patent Application No. 10-213487. There are preferred: phthalazinone or its derivatives or metallic salts, or derivatives of 4-(1-naphtyl) phthalazinone, 6-chlorophthalazinone, 5,7-dimethoxy phthalazinone and 2,3-dihydro-1,4-phthalazine dione; combinations of phthalazinone and derivatives of phthalic acid (e.g., phthalic acid, 4-methyl phthalic acid, 4-nitrophthalic acid and tetrachlor phthalic anhydride); phthalazine groups (phthalazine, derivatives of phthalazine or metallic salts of phthalazine, or derivatives of 4-(1-naphthyl) phthalazine, 6-isopropyl phthalazine, 6-t-butyl phthalazine, 6-chloro phthalazine, 5,7-dimethoxy phthalazine and 2,3-dihydro phthalazine); and combinations of phthalazine groups and phthalic acid derivatives (e.g., phthalic acid, 4-methyl phthalic acid, 4-nitro phthalic acid and tetra chloro phthalic anhydride). Especially the combinations of the phthalazine groups and the phthalic acid derivatives are preferred.

The plasticizer and lubricant to be used in the photosensitive layer of the thermal imaging material 412 employed in the invention are described in paragraph number [0117] of Japanese Laid-Open Patent Publication No. 11-65021; the super hardening agent for forming a super hard image is described in paragraph number [0118] of the same, in paragraph numbers [0136] to [0193] of Japanese Laid-Open Patent Publication No. 11-223898, as the compounds of Formulas (H), (1) to (3), (A) and (B) of Japanese Laid-Open Patent Publication No. 11-98297 and as the compounds (e.g., specific examples: compounds 21 to 24) of general Formulas (3) to (5) of Japanese Laid-Open Patent Publication No. 11-91652; and the hardening promotor is described in paragraph number [0102] of Japanese Laid-Open Patent Publication No. 11-65021 and in paragraph numbers [0194] and [0195] of Japanese Laid-Open Patent Publication No. 11-223898. The method of adding a nucleator and the amount of the nucleator added are described in paragraph numbers [0182] and [0183] of Japanese Laid-Open Patent Publication No. 11-223898.

In order that formic acid or formate may be used as an intense fogging substance, the side having the image forming layer 412b containing the photosensitive silver halide is preferred to contain 5 mm mols or less of formic acid or formate per 1 mol of silver, or preferably 1 mm mols or less.

The thermal imaging material 412 to be employed in the invention is preferably used, when it uses the nucleator, with either the acid, as produced by hydrating diphosphorous pentoxide, or its salt can be exemplified by methaphosphoric acid (or salt), pyrophosphoric acid (or salt), orthophosphoric acid (or salt), phosphoric acid (or salt), tetraphosphoric acid (or salt) or hexametaphosphoric acid (or salt). The especially preferably used salt, as produced by hydrating diphosphorous pentoxide, or its salt can be exemplified by orthophosphoric acid (or salt) or hexametaphosphoric acid. As these specific salts, there can be enumerated sodium orthophosphate, dihydrogen orthophosphate, sodium hexametaphosphate or ammonium hexametaphosphate.

The used amount (or the amount of application per 1 m$^2$ of the photosensitive material) of the acid, as produced by hydrating diphosphorous pentoxide, or its salt may be at a desired value according to the performances such as the sensitivity and the fogging and is preferably within a range of 0.1 mg/m$^2$ to 500 mg/m$^2$, or more preferably within a range of 0.5 mg/m$^2$ to 100 mg/m$^2$.

The thermal imaging material 412 to be employed in the invention can be provided with a surface protecting layer with a view to preventing the image forming layer 412b from sticking. The surface protecting layer is described in paragraph numbers [0119] and [0120] of Japanese Laid-Open Patent Publication No. 11-65021.

As the binder for the surface protecting layer, there is preferred gelatin, but there is preferably used polyvinyl alcohol (PVA). As this PVA, there are enumerated the completely saponified PVA-105, the partially saponified PVA-205, PVA-335, and the modified polyvinyl alcohol MP-203 (i.e., Trade Names of Kurare KK). The amount (per 1 m$^2$ of the support) of polyvinyl alcohol to be applied to the protecting layer (per one layer) is preferably within a range of 0.3 g/m$^2$ to 4.0 g/m$^2$, or more preferably within a range of 0.3 g/m$^2$ to 2.0 g/m$^2$.

When the thermal imaging material 412 of the invention is to be used for printing purposes where the size change raises a problem, it is preferable to use polymer latex in the protecting layer and the back layer. This polymer latex is described in "Synthetic Resin Emulsion (edited by Taira Okuda and Hiroshi Inagaki, issued by KOBUNSHI KANKOKAI, INC. (1978)", in "Applications of Synthetic Latex (edited by Takaaki Sugimura, Yasuo Kataoka, Soichi Suzuki and Keiji Kasahara, issued by KOBUNSHI KANKOKAI, INC. (1993)" and in "Chemistry of Synthetic Latex (written by Soichi Muroi, issued by KOBUNSHI KANKOKAI, INC. (1970)". Specifically, the polymer latex can be exemplified by: a copolymer latex of methyl methacrylate (33.5 wt. %)/ethyl acrylate (50 wt. %)/methacrylic acid (16.5 wt. %); a copolymer latex of methyl methacrylate (47.5 wt. %)/butadiene (47.5 wt. %)/itaconic acid (5 wt. %); a copolymer latex of methyl methacrylate (58.9 wt. %)/2-ethylhexyl acrylate (25.4 wt. %)/styrene (8.6 wt. %)/2-hydroxyethyl methacrylate (5.1 wt. %)/acrylic acid (2.0 wt. %); and a copolymer latex of methyl methacrylate (64.0 wt. %)/styrene (9.0 wt. %)/butyl acrylate (20.0 wt. %)/2-hydroxyethyl methacrylate (5.0 wt. %)/acrylic acid (2.0 wt. %). To the binder for the protecting layer, moreover, there can be applied: the combination of polymer latex, as described in Japanese Laid-Open Patent Publication No. 11-6872; and the techniques which are described in paragraph numbers [0021] to [0025] of the Specification of Japanese Patent Application No. 11-143058, in paragraph numbers [0027] and [0028] of the Specification of Japanese Patent Application No. 11-6872, and in paragraph numbers [0023] to [0041] of the Specification of Japanese Patent Application No. 10-199626. The ratio of the polymer latex of the protecting layer is preferably within a range 10 wt. % to 90 wt. % of the whole binder, or especially preferably within a range of 20 wt. % to 80 wt. %.

The amount of application (per 1 $m^2$ of the support) of the whole binder (including the water-soluble polymer and the latex polymer) of the protecting layer (per one layer) is preferably within a range of 0.3 $g/m^2$ to 5.0 $g/m^2$, or more preferably within a range of 0.3 $g/m^2$ to 2.0 $g/m^2$.

The temperature for preparing the liquid to be applied to the image forming layer of the thermal imaging material 412 employed in the invention is preferably within a range of 30° C. to 65° C., more preferably within a range of 35° C. to 60° C., or further preferably within a range of 35° C. to 55° C. The temperature of the liquid to be applied to the image forming layer just after the addition of the polymer latex is preferably kept within a range of 30° C. to 65° C. It is also preferable to mix the reducer and the organic silver salt before the polymer latex is added.

The organic silver salt containing fluid or the thermal image forming layer applied liquid in the thermal imaging material 412 to be employed in the invention is preferably exemplified by the so-called "thixotropy fluid". This thixotropy means the property that the viscosity drops as the shearing rate increases. Any apparatus may be employed for measuring the viscosity, but the RFS fluid spectrometer made by Rheometric Far East KK is preferably used to measure the viscosity at 25° C. Here, the organic silver salt containing fluid or the thermal image forming layer applied liquid in the invention has, at a shearing rate of 0.1 $S^{-1}$, a viscosity preferably within a range of 400 mPa·s to 100,000 mPa·s or more preferably within a range of 500 mPa·s to 20,000 mPa·s. At a shearing rate of 10,000 $S^{-1}$, on the other hand, the viscosity is preferably within a range of 1 mPa·s to 200 mPa·s, or more preferably within a range of 5 mPa·s to 80 mPa·s.

There are known a variety of systems for developing the thixotropy, e.g., as described in "Course Rheology" edited by KOBUNSHI KANKOKAI, INC. and "Polymer Latex" written by Muroi & Morino (issued by KOBUNSHI KANKOKAI, INC.). A liquid has to contain many solid fine particles so as to develop the thixotropy. In order to intensify the thixotropy, on the other hand, it is effective to contain thickening linear polymers, to enlarge the aspect ratio of the contained solid fine particles anisotropically, to employ the alkali thickening agent and the surface-active agent, etc.

The thermal imaging photographic emulsion of the thermal imaging material 412 to be employed in the invention is formed as one or more layers over the support. The construction of one layer has to contain the organic silver salt, the silver halide, the developer, the binder, and desired additional materials such as the color toner, the coating assistant and another auxiliary agent. The construction of two layers has to contain the organic silver salt and the silver halide in the first emulsion layer (usually adjacent to the support) and has to contain several other components in the second layer or in both the layers. It is, however, conceivable to make the construction of two layers: a single emulsion layer containing all the components; and a protective top coating. The construction of the multicolor photosensitive thermal imaging photographic material may contain those combinations of two layers for each color or may contain all the components in the single layer, as described in U.S. Pat. No. 4,708,928. In the case of the multi-dye multicolor photosensitive thermal imaging photographic material, the individual emulsion layers are generally held separately from one another, as described in U.S. Pat. No. 4,460,681, by employing a functional or unfunctional barrier layer between the individual photosensitive layers.

From the standpoints of improving the color tone, preventing the interference fringe at the laser exposure time and preventing the irradiation, the various dyes and pigments (e.g., C.I. Pigment Blue 60, C.I. Pigment Blue 64 and C.I. Pigment Blue 15:6) can be used in the photosensitive layer of the thermal imaging material 412 to be employed in the invention. These facts are described in detail in WO98/36322, Japanese Laid-Open Patent Publication Nos. 10-268465 and 11-338098.

In the thermal imaging material 412 to be employed in the invention, the antihalation layer can be disposed at a remoter side from the light source with respect to the photosensitive layer.

The thermal imaging material 412 generally has a non-photosensitive layer in addition to the photosensitive layer. The non-photosensitive layer can be sorted, from its arrangement, into: (1) a protective layer over (apart from the support) the photosensitive layer; (2) an intermediate layer interposed between the plurality of photosensitive layers or between the photosensitive layers and the protective layer; (3) a prime coat layer interposed between the photosensitive layer and the support; and (4) a back layer disposed on the opposite side of the photosensitive layer. The filter layer is formed as the layer (1) or (2) on the photosensitive material. The antihalation layer is formed as the layer (3) or (4) on the photosensitive material.

The antihalation layer is described in paragraph numbers [0123] and [0124] of Japanese Laid-Open Patent Publication No. 11-65021 and in Japanese Laid-Open Patent Publication Nos. 11-223898, 9-230531, 10-36695, 10-104779, 11-231457, 11-352625 and 11-352626.

The antihalation layer contains an antihalation dye having an absorption in the exposure wavelength. When the exposure wavelength is in the infrared region, an infrared absorption dye may be used, and then a dye having no absorption in the visible range is preferred.

When the halation is to be prevented by using the dye having the absorption in the visible range, it is preferable to leave no substantial dye color after the image formation, to use means for decoloring with the heat of the thermal imaging, and to cause the non-sensitive layer to function as the antihalation layer by adding a thermal decoloring dye and a basic precursor to the no-sensitive layer. These techniques are described in Japanese Laid-Open Patent Publication No. 11-231457 and so on.

The amount of the decoloring dye to be added is determined according to its application. Generally, the decoloring dye is employed in such an amount that an optical density (or optical absorption) when measured in the target wavelength may exceed 0.1. The optical density is preferably within a range of 0.2 to 2. The amount of dye to be employed to attain such optical density is generally within a range of 0.001 $g/m^2$ to 1 $g/m^2$.

Here, the optical density after the thermal imaging can be reduced to 0.1 or less if the dye is decolored. Two or more kinds of decoloring dyes could be together in the thermal decoloring recording material or the thermal imaging material 412. Likewise, two or more kinds of basic precursors can be used together.

For this thermal decoloring efficiency using the decoloring dye and the basic precursor, it is preferable to use such a substance (e.g., diphenyl sulfone or 4-chlorophenyl (phenyl) sulfone) as to lower the melting point by 3° C. or more (in degrees) when mixed with the basic precursor described in Japanese Laid-Open Patent Publication No. 11-352626.

To the thermal imaging material 412 to be employed in the invention, there can be added a coloring agent having an absorption maximum within a range of 300 nm to 450 nm, so as to improve the silver color tone and the aging of the image. This coloring agent is described in Japanese Laid-Open Patent Publication Nos. 62-210458, 63-104046, 63-103235, 63-208846, 63-306436, 63-314535 and 01-61745, and in Japanese Patent Application No. 11-276751.

This coloring agent is usually added within a range of 0.1 g/m$^2$ to 1 g/m$^2$ to the back layer on the side opposed to the photosensitive layer.

The thermal imaging material 412 to be employed in the invention is preferably the so-called "one-side photosensitive material" which has the photosensitive layer containing at least one layer of silver halide emulsion on one side of the support and the back layer on the other side.

To the thermal imaging material 412 to be employed in the invention, it is preferable to add a matting agent for improving the transferability, as described in paragraph numbers [0126] and [0127] of Japanese Laid-Open Patent Publication No. 11-65021. The amount of the applied matting agent is preferably a range of 1 mg/$^2$ to 400 mg/m$^2$ per 1 m$^2$ of the photosensitive material, or more preferably within a range of 5 mg/m$^2$ to 300 mg/m$^2$.

On the other hand, the matting degree of the emulsion surface is not restricted unless the start dust trouble occurs, but is preferably within a Beck's smoothness range of 30 secs. to 2,000 secs., especially preferably within a range of 40 secs. to 1,500 secs. The Beck's smoothness can be easily determined by "Smoothness Testing Method of Paper and Board by Beck Tester" of Japanese Industrial Standards (JIS) P8119 and by the TAPPI Standard Method T479.

As the matting degree of the back layer in the thermal imaging material 412 to be employed in the invention, the Beckts smoothness is preferably within a range of 10 secs. to 1,200 secs., more preferably within a range of 20 secs. to 800 secs., or further preferably within a range of 40 secs. to 500 secs.

In the thermal imaging material 412 to be employed in the invention, the matting agent is preferably contained in the outermost surface layer of the photosensitive material, in the layer functioning as the outermost surface layer, in a layer close to the outer surface, or in a layer acting as the so-called "protective layer".

The back layer to be applied to the thermal imaging material 412 employed in the invention is described in paragraph numbers [0128] to [0130] of Japanese Laid-Open Patent Publication No. 11-65021.

In the thermal imaging material 412 to be employed in the invention, the film surface before thermal imaging preferably has a pH of 6.0 or less, or preferably 5.5 or less. This lower limit is not restricted but to about 3. For adjustment of the film surface pH, it is preferable for reducing the film surface pH to use an organic acid such as derivatives of phthalic acid, nonvolatile acids such as sulfuric acid, or a volatile base such as ammonia. Of these, the ammonia is preferred for achieving a low film surface pH because it is so volatile that it can be removed at the application step or before the thermal imaging. Here, the method of measuring the film surfaced pH is described in paragraph number [0123] of the Specification of Japanese Patent Application No. 11-87297.

A film hardening agent may be used in the individual layers such as the photosensitive layer, the protective layer or the back layer of the thermal imaging material 412 to be employed in the invention. On the examples of the film hardening agent, methods are described on page 77 to page 87 of "THE THEORY OF THE PHOTOGRAPHIC PROCESS FOURTH EDITION" (published by Macmillan Publishing Co., Inc. and in 1977) written by T. H. James. Multivalent metallic ions are preferably used in the description of page 78 of the same. There are also preferably used: polyisocyanates described in U.S. Pat. No. 4,281,060 and Unexamined Published Japanese said Patent Application No. 6-208193; epoxy compounds described in U.S. Pat. No. 4,791,042; and vinyl sulfone compounds described in Japanese Laid-Open Patent Publication No. 62-89048.

The film hardening agent is added as a solution, and the addition of this solution into the protective layer applied liquid is timed 180 mins. or just before the application, or preferably before 60 mins. to 10 mins. No especial restriction is on the mixing method and condition, so long as the effects of the invention are sufficed. A specific mixing method is exemplified by: a method of mixing in a tank so that the average residual time, as calculated from the added flow rate and the flow of the feed to a coater, may be a desired time; and a method of using a static mixer, as described in Section 8 or the like of "Liquid Mixing Techniques" (published by Nikkan Kogyo Sinbunsha, 1989) written by N. Harnby,, M. F. Edwards and A. W. Nienow and translated by Kohji Takahashi.

Of the substances to be applied to the thermal imaging material 412 employed in the invention: the surface-active agent is described in paragraph number [0132] of Japanese Laid-Open Patent Publication No. 11-65021; the solvent is described in paragraph number [0133] of the same Japanese Patent Application; the support is described in paragraph number [0134] of the same Application; the antistatic treatment and the conductive layer are described in paragraph number [0135] of the same; the method of forming a color image is described in paragraph number [0136] of the same; and the smoothing agent is described in paragraph numbers [0061] to [0064] of Japanese Laid-Open Patent Publication No. 11-84573 and in paragraph numbers [0049] to [0062] of Japanese Laid-Open Patent Publication No. 11-106881.

The transparent support is preferably made of the polyester or polyethylene terephthalate which has been subjected to a heat treatment within a temperature range of 130° C. to 185° C., so as to relax the internal strain as might otherwise be left in the film at the biaxial orientation, and to eliminate the thermal shrinking strain as might otherwise occur in the thermal imaging. In the case of the medical thermal imaging material, the transparent support may be either colored with a blue dye (e.g., Die-1 described in the Embodiment of Japanese Laid-Open Patent Publication No. 8-240877) or not. To the support, it is preferable to apply the priming technique of water-soluble polyester of Japanese Laid-Open Patent Publication No. 11-84574, styrene-butadiene copolymer of Japanese Laid-Open Patent Publication No. 10-186565, and vinylidene chloride copolymer of paragraph numbers [0063] to [0080] of Japanese Laid-Open Patent Publication No. 11-106881. To the antistatic layer or the prime coat, it is possible to apply the techniques, as described in Japanese Laid-Open Patent Publication Nos. 56-143430, 56-143431, 58-62646 and 56-120519, in paragraph numbers [0040] to [0051] of Japanese Laid-Open Patent Publication No. 11-84573, in U.S. Pat. No. 5,575,957, and in paragraph numbers [0078] to [0084] of Japanese Laid-Open Patent Publication No. 11-223898.

The thermal imaging material 412 to be employed in the invention is preferably of the mono-sheet type (which can form an image on the thermal imaging material 412 without employing another sheet such as an image receiving material).

To the thermal imaging material 412 to be employed in the invention, there may be further added an antioxidant, a stabilizer, a plasticizer, an ultraviolet ray absorber or a coating assistant. These various additives are added to either the photosensitive layer or the non-photosensitive layer. These can be referred to WO98/36322, EP803764A1, and Japanese Laid-Open Patent Publication Nos. 10-186567 and 10-18568.

The thermal imaging material 412 to be employed in the invention may be coated by any method. This method is specified by: the extrusion coating, the slide coating, the curtain coating, the dipping coating, the knife coating or the flow coating; the various coating operations including the extrusion coating using the hopper of the kind described in U.S. Pat. No. 2,681,294; the extrusion coating or the slide coating described on page 399 to page 536 of "LIQUID FILM COATING" (published by CHAPMAN & HALL KK, 1997), written by Stephen F. Kistler and Petert M. Schweizer. Of these, the slide coating is especially preferably used. The examples of the shape of the slide coater to be employed in the slide coating are shown at b.1 of FIG. 11 of page 427 of the same Book. If desired, on the other hand, two or more layers can be simultaneously coated by the method described on page 399 to page 536 of the same Book or by the method described in U.S. Pat. No. 2,761,791 and Great Britain Patent No. 837,095.

As the techniques which can be used in the thermal imaging material 412 to be employed in the invention, there can also be enumerated EP No. 803764A1, EP No. 883022A1, WO No. 98/36322, and Japanese Laid-Open Patent Publication Nos. 56-62648, 58-62644, 9-281637, 9-297367, 9-304869, 9-311405, 9-329865, 10-10669, 10-62899, 10-69023, 10-186568, 10-90823, 10-171063, 10-186565, 10-186567, 10-186569 to 10-186572, 10-197974, 10-197982, 10-197983, 10-197985 to 10-197987, 10-207001, 10-207004, 10-221807, 10-282601, 10-288823, 10-288824, 10-307365, 10-312038, 10-339934, 11-7100, 11-15105, 11-24200, 11-24201, 11-30832, 11-84574, 11-65021, 11-109547, 11-125880, 11-129629, 11-133536 to 11-133539, 11-133542, 11-133543, and 11-223898.

The thermal imaging material 412 to be employed in the invention may be developed in any method but is usually developed by heating the thermal imaging material which was image-wise exposed. The developing temperature is preferably within a range of 80° C. to 250° C., or more preferably within a range of 100° C. to 140° C. The developing time period is preferably within a range 1 sec. to 180 secs., more preferably within a range of 10 secs. to 90 secs., or especially preferably within a range of 10 secs. to 40 secs.

The thermal imaging is preferably of the plate heater type. A preferable thermal imaging of this plate heater type is described in Japanese Laid-Open Patent Publication No. 11-133572. Here is disclosed a thermal imaging apparatus for obtaining a visible image by bringing a thermal imaging material having a latent image into contact with heating means at a thermal imaging unit. This thermal imaging apparatus is characterized: in that the heating means includes a plate heater; in that a plurality of holding rollers are arranged to confront each other along one face of the plate heater; and in that the thermal imaging material is passed between the holding rollers and the plate heater so that it may be thermally imaged. The plate heater is preferably divided into two to six stages, so that the leading end portion may be lowered in temperature to about 1 to 10 . This method is also described in Japanese Laid-Open Patent Publication No. 54-30032, so that the moisture or organic solvent contained in the thermal imaging material can be removed to the outside of the system and so that the support for the thermal imaging material can be suppressed in its shape change, as might otherwise be made when the thermal imaging material is abruptly heated.

The thermal imaging material 412 to be employed in the invention may be exposed by any method, but a laser beam is preferred as the light source for the exposure. As the laser beam according to the invention, there can be enumerated a gas laser ($Ar^+$, He—Ne), a YAG laser, a pigment layer or a semiconductor laser. On the other hand, it is possible to use both the semiconductor laser and a second harmonic wave generating element. What is preferred is a red or infrared ray emitting gas, or a semiconductor laser.

As a medical laser imager having an exposure unit and a thermal imaging unit, there can be enumerated the Fuji Medical Dry Laser Imager FM-DPL. This FM-DPL is described on pages 39 to 55 of Fuji Medical Review No. 8. These techniques can naturally be applied as the laser imager for the thermal imaging material 412 of the invention. The techniques can also be applied as the thermal imaging photosensitive materials for the laser imager in "ADnetwork", which has been proposed by Fuji Medical System as the network system conforming to the DICOM standards.

The thermal imaging material 412 to be employed in the invention is preferred to form the black and white image with the silver and to be used as the thermal imaging materials for the medical diagnoses, as the industrial photographs, for the prints and for the COM.

Here will be described Embodiments for performing the cutting method of the invention by using the thermal imaging material 412 thus produced.

First of all, here will be described the method for producing the thermal imaging material 412.

Preparation of PET Support

Terephthalic acid and ethylene glycol were used according to the ordinary method to prepare the PET having an intrinsic viscosity IV=0.66 (measured at 25° C. in phenol/tetrachloroethane=6/4 (in wt. ratio)). This was pelleted, dried at 130° C. for 4 hr., melted at 300° C., extruded from the T-type die and quenched to form a non-oriented film having a thickness of 175 $\mu$m.

This film was longitudinally oriented 3.3 times by using rolls having different circumferential speeds and was then transversely oriented 4.5 times by a tenter. The temperatures at these orientations were 110° C. and 130° C., respectively. After this, the film was thermally fixed at 240° C. for 20 secs. and was transversely relaxed by 4% at the same temperature. After this, the portion chucked by the tenter was slitted, knurled at its two ends and taken up at 4 $Kg/cm^2$ to obtain a roll having a thickness of 175 $\mu$m.

Surface Corona Treatment

The solid state corona treating machine Model 6KVA of Pillar, INC. was used to treat the two sides of the support at a speed of 20 m/min. It was found from the read values of the current and the voltage that the support was treated at 0.375 Kv·A·min./$m^2$. The treating frequency at this time was 9.6 kHz, and the gap clearance between the electrode and the dielectric roll was 1.6 mm.

Preparation of Primed Support (1) Preparation of Priming Liquid

Formulation ① (for Priming Layer for Photosensitive Layer)

Pes resin A-515GB (30 wt. % solution) of Takamatsu Yushi KK 234 g polyethylene glycol monononyl phenyl ether (average ethylene oxide No.=8.5)

10 wt. % solution 21.5 g

MP-1000 (polymer fine particles, mean diameter of 0.4 μm) of Sohken Kagaku (KK) 0.91 g distilled water 744 ml Formulation ② (for First Layer of Back Side)

butadiene-styrene copolymer latex 158 g (solid content 40 wt.5%, butadiene/styrene wt. ratio=32/68)

8 wt. % aqueous solution of 2.4-dichloro-hydroxy-s-triazine solidum salt 1 wt. % aqueous solution of sodium lauryl benzene-sulfonate 10 ml distilled water 854 ml Formulation ③ (for Second Layer of Back Side)

$SnO^2/SbO$ (9/1 wt. ratio, mean diameter 0.038 μm, 17 wt. % dispersion) 84 g gelatin (10% aqueous solution) 892 g Methollose TC-5 (2% aqueous solution) 86 g of Shinetsu Kagaku (KK)

MP-1000 (polymer fine particles) 0.01 g of Sohken Kagaku (KK)

1 wt. % aqueous solution of sodium dodecyl benzene sulfonate 10 ml

NaOH (1%) 6 ml

Proxel (of ICI KK) 1 ml distilled water 805 ml

Procedure of Preparing Primed Support

The biaxially oriented polyethylene terephthalate support having a thickness of 175 μm was subjected on their two sides to the corona discharge. After this, the priming liquid of Formulation ① was applied at 6.6 ml/m² (for one side) to one side (or the photosensitive layer side) of the support and was dried at 180° C. for 5 mins. Next, the priming liquid of Formulation ② was applied at 5.7 ml/m² by the wire bar to the back side and was dried at 180° C. for 5 mins. Moreover, the priming liquid of Formulation ③ was applied at 7.7 ml/m² by the wire bar to the back side and was dried at 180° C. for 6 mins. Thus, the primed support was prepared.

Preparation of Back Side Priming Liquid (Preparation of Solid Particle Dispersed Liquid (a) of Basic Precursor)

64 g of a basic precursor compound 11, 28 g of diphenyl sulfone and 10 g of surface-active agent Demol of Kao (KK) were mixed in 220 ml of distilled water, and the mixture was bead-dispersed by using the sand mill (i.e., the sand grinder mill of ¼ gallon of Aimex (KK)) to prepare a solid particle dispersed liquid (a) of the basic precursor compound having a mean diameter of 0.2 μm.

(Preparation of Dye Solid Particle Dispersed Liquid)

9.6 g of cyanine dye component 13 and 5.8 g of sodium P-dodecylbenzene sulfonate were mixed with 305 ml of distilled water, and the mixed liquid was bead-dispersed by the sand mill (e.g., the sand grinder mill of ¼ gallons of Aimex (KK)) to prepare the dye solid particle dispersed liquid having a mean diameter of 0.2 μm.

(Preparation of Halation Preventing Layer Applied Liquid)

17 g of gelatin, 9.6 g of polyacrylamide, 70 g of solid particle dispersed liquid (a) of the aforementioned basic precursor, 56 g of the aforementioned dye solid particle dispersed liquid, 1.5 g of fine particles (having a mean particle size of 6.5 μm) of polymethymethacrylate, 0.03 g of benzo isothiazolinon, 2.2 g of sodium polyethylene sulfonate and 0.2 g of blue dye compound 14 were mixed with 844 ml of water to prepare the halation preventing layer applied liquid.

(Preparation of Back Side Protecting Layer Applied Liquid)

The container was kept at 40° C., and 50 g of gelatin, 0.2 g of sodium polystyrene sulfonate, 2.4 g of N,N-ethylene-bis (vinyl sulfone acetamido), 1 g of sodium t-octyl phenoxy ethoxy ethane sulfonate, 30 mg of benzo isothiazolinon, 37 mg of potassium salt of N-perfluoro octyl sulfonyl-N-propyl alanine, 0.15 g of polyethylene glycol mono (N-perfluoro octyl sulfonyl-N-propyl-2-aminoethyl) ether [ethylene oxide average polymerization 15], 32 mg of $C_8F_{17}SO_3$, 64 mg of $C_8F_{17}SO_2N(C_3H7)$ $(CH_2CH_2O)4(CH_2)4—SO_3Na$, 8.8 g of acrylic acid/ethyl acrylate copolymer (the weight ratio of copolymerization 5/95), 0.6 g of Aerozol OT (of American Cyanamide Co.) and 1.8 g of fluid paraffin emulsion as fluid paraffin were mixed with 950 ml of water to prepare the back side protective film applied liquid.

<<Preparation of Silver Halide Emulsion H1>>

3.1 cc of a potassium bromide solution of 1 wt. % was added to 1421 cc of distilled water, and 3.5 cc of 1N sulfuric acid and 31.7 g of gelatin phthalate were further added. The result liquid was held at a temperature of 34° C. while being agitated in a reaction vessel of stainless steel coated with titanium. To this liquid, there were wholly added at a constant flow rate for 45 secs. 95.4 cc of solution A, which had been diluted by adding distilled water to 22.22 g of silver nitrate, and 161 cc of solution B which had been diluted by adding distilled water to 26.3 g of potassium bromide. After this, there were further added 10 cc of aqueous solution of hydrogen peroxide of 3.3 wt. % and 10.8 cc of benzimidazole of 10 wt. %. Moreover, 317.5 cc of a solution C, which had been diluted by adding distilled water to 51.86 g of silver nitrate, was totally added at a constant flow rate for 20 mins., and 400 cc of a solution D, which had been diluted by adding distilled water to 45.8 g of potassium bromide, was added by the controlled double jet method with pAg being kept at 8.1. Potassium hexachloroiridate (III) was totally added by $1 \times 10^{-4}$ mols per 1 mol of silver, 10 mins. after the additions of the solution C and the solution D had been started. After 5 secs. after the end of addition of the solution C, moreover, an aqueous solution of potassium hexacyanoferrate (II) was totally added by $3 \times 10^{-4}$ mols per 1 mol of silver. Sulfuric acid of 1N was used to adjust the pH to 3.8, and the agitation was stopped to perform the sedimentation/desalting/rinsing steps. Sodium hydroxide of 1N was used to adjust the pH to 5.9 thereby to prepare the silver halide dispersion of pAg 8.0.

The aforementioned silver halide dispersion was kept at 30° C. while being agitated. To this dispersion, there was added 5 cc of methanol solution of 1,2-benzo isothiazoline-3-one of 0.34 wt. %. After 40 mins. a methanol solution of the spectroscopic sensitizing dye A was added by $1 \times 10^{-3}$ mols per 1 mol of silver. After 1 min., the temperature was elevated to 47° C. A methanol solution of Sodium benzene thiosulfonate was added 20 mins. after the temperature rise by $7.6 \times 10^{-5}$ mols for 1 mol of silver. After 5 mins., a methanol solution of the tellurium sensitizer B was added by $1.9 \times 10^{-4}$ mols for 1 mol of silver, and an aging was made for 91 mins. 1.3 cc of methanol solution of 0.8 wt. % of N,N'-dihydroxy-N"-diethyl melamine was added. After 4 mins., a methanol solution of 5-methyl-2-mercapto benzimidazole by $3.7 \times 10^{-3}$ mols for 1 mol of silver and methanol solution of 1-phenyl-2-heptyl-5-mercapto-1,3,4-triazole by $4.9 \times 10^{-3}$ mols for 1 mol of silver were added to prepare the silver halide emulsion H1.

The particles in the prepared silver halide H1 were pure silver bromide particles having a mean diameter of 0.046 $\mu$m and a mean diameter fluctuation coefficient of 20%. The particle size or the like was determined from the average of 1,000 particles by using an electron microscope. The {100} plane ratio of the particles was determined to 80% by using the Kubelka-Munk's process.

<<Preparation of Silver Halide Emulsion H2>>

The silver halide emulsion H2 was prepared in the manners similar to those of the preparation of the silver halide emulsion H1, excepting that the liquid temperature of 34° C. at the particle formation was changed to 49° C., that the addition time of the solution C was set to 30 mins., and that the potassium hexacyanoferrate (II) was removed. The sedimentation/desalting/rinsing/dispersion were performed as for the silver halide emulsion H1. Moreover, the spectroscopic sensitization, the chemical sensitization, and the additions of 5-methyl-2-mercapto benzimidazole and 1-5 phenyl-2-hptyl-5-mercapto-1,3,4-triazole were performed to prepare the silver halide emulsion H2 as for the silver halide emulsion H1, excepting that the amount of the spectroscopic sensitizing dye A added was changed to $7.5 \times 10^{-4}$ mols for 1 mol of silver, that the amount of the tellurium sensitizer B added was changed to $1.1 \times 10^{-4}$ mols for 1 mol of silver, and that the amount of 1-phenyl-2-heptyl-5-mercapto-1,3,4-triazole was changed to $3.3 \times 10^{-3}$ moles for 1 mol of silver. The emulsion particles of the silver halide emulsion H2 were cubic particles of pure silver bromide having a mean diameter of 0.080 $\mu$m and a mean diameter fluctuation coefficient of 20%.

<<Preparation of Silver Halide Emulsion H3>>

The silver halide emulsion H3 was prepared as in the preparation of the silver halide emulsion H1, excepting that the liquid temperature of 34° C. at the particle formation was changed to 27° C. On the other hand, the sedimentation/desalting/rinsing/dispersion were performed as for the silver halide emulsion H1. Moreover, the silver halide emulsion H3 was obtained as for the emulsion H1, excepting that the amount of the solid dispersion (i.e., aqueous solution of gelatin) of the spectroscopic sensitizing dye A added was changed to $6 \times 10^{-3}$ mols for 1 mol of silver, and that the amount of the tellurium sensitizer B added was changed to $5.2 \times 10^{-4}$ mols for 1 mol of silver. The emulsion particles of the silver halide emulsion H3 were cubic particles of pure silver bromide having a mean diameter of 0.038 $\mu$m and a mean diameter fluctuation coefficient of 20%.

<<Preparation of Mixed Emulsion A for Applied Liquid>>

70 wt. % of silver halide emulsion H1, 15 wt. % of silver halide emulsion H2 and 15 wt. % of silver halide emulsion H3 were dissolved, and 1 wt. % of aqueous solution of benzothiazolium iodide was added by $7 \times 10^{-3}$ mols for 1 mol of silver.

<<Preparation of Fatty Silver Dispersion>>

① Preparation of Fatty Salt Solution 876 g of behenic acid (Product Name of Edenor C22-85R) of Henkel KK, 4,230 ml of distilled water, 492 ml of aqueous solution of 5N-NaOH, 1,200 ml of tert-butyl alcohol were mixed and agitated at 75° C. for 1 hr. to react thereby to prepare sodium behenate.

② Preparation of Silver Ion Solution 2,062 ml of aqueous solution (pH 4.0) containing 404 g of silver nitrate was prepared and kept at 10° C.

② Preparation of Reaction Bath Solution

A reaction vessel containing 6,350 ml of distilled water and 300 ml tert-butyl alcohol was kept at 30° C.

<<Adjustment of Fatty Silver Salt>>

The addition time periods of ① and ② were set 90 mins. and 93 mins., respectively. After 11 mins. from the addition start of ①, the liquid ② was added to the liquid surface of the sufficiently mixed reaction vessel such that the positions of additions of ① and ② were symmetric with respect to the agitating blades, thereby adjust the particles. The reaction temperature was 30° C. After these additions, the aging was made at 35° C. for 4 hr.

The shape of the particles of the obtained fatty silver were evaluated by the electron microscope photographs. The particles were scaly particles having a volume-weighted mean diameter of 0.5 $\mu$m, a mean particle thickness of 0.14 $\mu$m and a ratio of 2 of shorter side/longer side.

On the other hand, the piping of the system for adding the fatty salt solution (of sodium behenate) was lagged by the steam trace, and the steam flow was controlled to keep the liquid temperature at the exit of the leading end of the adding nozzle to 75° C. On the other hand, a temperature of the piping of the system for adding the aqueous solution of silver nitrate was kept by circulating cold water in the outside of a double tube.

After the end of the addition of the sodium behenate solution, the aging was performed, and the temperature was lowered to 25° C. After this the solid content was filtered by the suction filtration and was rinsed till the conductivity of the filtering water became 30 $\mu$S/cm. The solid content thus obtained is stored as a wet cake without being dried.

Next, the dispersion of the silver behenate was prepared by the following method. To the wet cake corresponding to 100 g of a dried solid content, there were added 7.4 g of polyvinyl alcohol (e.g., Trade Name of PVA-217 having a mean polymerization of about 1,700) and water. The total amount of 3,850 g was preparatorily dispersed by the homo mixer. Next, the preparatorily dispersed raw liquid was treated three times by adjusting the pressure of a dispenser (e.g., Trade Name of Micro Fluidizer M-110S-EH made by Micro Fluidex International Corporation and having G10Z interaction chamber) to 175 MPa, to prepare the silver behenate dispersion. For the cooling operations, the desired dispersion temperature was set by mounting snake tube type heat exchangers at the upstream and downstream of the interaction chamber to adjust the temperature of the coolant.

<<Preparation of 25 wt. % Dispersion of Reducer>>

16 kg of water was added to 10 kg of the compound A and 10 kg of 20 wt. % aqueous solution of modified polyvinyl alcohol (e.g., Poval MP203 of Kurare (KK)), and was sufficiently mixed to slurry. This slurry was fed by the diaphragm pump and dispersed in a horizontal sand mill (e.g., UVM-2 of Aimex (KK)) filled with zirconium beads of a mean diameter of 0.5 mm for 3 hrs. and 30 mins. After this, 0.2 g of benzoisothiazolinone sodium salt and water were added to adjust the concentration of the reducer to 24 wt. % thereby to obtain the reducer dispersion. The reducer particles, as contained in the reducer dispersion thus obtained, had a median diameter of 0.42 $\mu$m and a maximum particle diameter of 2.0 $\mu$m or less. The reducer dispersion obtained was filtered through a polypropylene filter having a pore diameter of 10.0 $\mu$m to remove foreign substances such as dust and was stocked.

<<Preparation of 10 wt. % Dispersion of Mercapto Compounds>>

8.3 kg of water was added to 5 kg of 1-phenyl-2-heptyl-5-mercapto-1,3,4-triazole and 5 kg of 20 wt. % aqueous solution of modified polyvinyl alcohol (e.g., Poval MP203 of Kurare (KK)) and was sufficiently mixed to slurry. This slurry was fed by the diaphragm pump and dispersed in a horizontal sand mill (e.g., UVM-2 of Aimex (KK)) filled with zirconium beads of a mean diameter of 0.5 mm for 6 hrs. After this, water was added to adjust the concentration of the mercapto compound to 10 wt. % thereby to obtain the mercapto dispersion. The mercapto compound particles, as contained in the mercapto compound dispersion thus obtained, had a median diameter of 0.40 µm and a maximum particle diameter of 2.0 µm or less. The mercapto compound dispersion obtained was filtered through a polypropylene filter having a pore diameter of 10.0 µm to remove foreign substances such as dust. Just before use, on the other hand, the dispersion was filtered again through the polypropylene filter having a pore diameter of 10 µm.

<<Preparation of 20 wt. % Dispersion-1 of Organic Polyhalide Compounds>>

5 kg of tribromo methyl-naphthyl sulfone, 2.5 kg of 20 wt. % aqueous solution of modified polyvinyl alcohol (e.g., Poval MP203 of Kurare (KK)), 213 g of 20 wt. % aqueous solution of triisopropyl-naphthalene sulfonate, and 10 Kg of water were added and sufficiently mixed to slurry. This slurry was fed by the diaphragm pump and dispersed in a horizontal sand mill (e.g., UVM-2 of Aimex (KK)) filled with zirconium beads of a mean diameter of 0.5 mm for 5 hrs. After this, water was added to adjust the concentration of the organic polyhalide compounds to 20 wt. % by adding 0.2 g of benzoisothiazolinone sodium salt thereby to obtain the organic polyhalide dispersion. The organic polyhalide compound particles, as contained in the organic polyhalide compound dispersion thus obtained, had a median diameter of 0.36 µm and a maximum particle diameter of 2.0 µm or less. The organic polyhalide compound dispersion obtained was filtered through a polypropylene filter having a pore diameter of 3.0 µm to remove foreign substances such as dust and was stocked.

<<Preparation of 25 wt. % Dispersion-2 of Organic Polyhalide Compounds>>

As for the 20 wt. % dispersion-1 of the organic polyhalide compounds, but 5 kg of tribromomethyl (-3-(n-butylcarbamoyl) phenyl) sulfone was used and dispersed in place of 5 kg tribromomethyl-naphtyl sulfone. The dilution and filtration were performed so long as the organic polyhalide compounds became 25 wt. %. The organic polyhalide compound particles, as contained in the organic polyhalide compound dispersion thus obtained, had a median diameter of 0.38 µm and a maximum particle diameter of 2.0 µm or less. The organic polyhalide compound dispersion obtained was filtered through a polypropylene filter having a pore diameter of 3.0 µm to remove foreign substances such as dust and was stocked.

<<Preparation of 30 wt. % Dispersion-3 of Organic Polyhalide Compounds>>

As for the 20 wt. % dispersion-1 of the organic polyhalide compounds, but 5 kg of tribromomethyl-phenyl sulfone was used, and 5 kg of 20 wt. % aqueous solution of MP203 was used and dispersed in place of 5 kg tribromomethyl-naphtyl sulfone. The dilution and filtration were performed so long as the organic polyhalide compounds became 30 wt. %. The organic polyhalide compound particles, as contained in the organic polyhalide compound dispersion thus obtained, had a median diameter of 0.41 µm and a maximum particle diameter of 2.0 µm or less. The organic polyhalide compound dispersion obtained was filtered through a polypropylene filter having a pore diameter of 3.0 µm to remove foreign substances such as dust and was stocked. After this, the product was stored at 10° C. or lower till it is employed.

<<Preparation of 25 wt. % Dispersion of Phosphine Oxido Compounds>>

16 kg of water was added to 10 kg of triphenyl-phosphine oxido and 10 kg of 20 wt. % aqueous solution of modified polyvinyl alcohol (e.g., Poval MP203 of Kurare (KK)), and was sufficiently mixed to slurry. This slurry was fed by the diaphragm pump and dispersed in a horizontal sand mill (e.g., UVM-2 of Aimex (KK)) filled with zirconium beads of a mean diameter of 0.5 mm for 3 hrs. and 30 mins. After this, 0.2 g of benzoisothiazolinone sodium salt and water were added to adjust the concentration of the reducer to 25 wt. % thereby to obtain the phosphine oxido dispersion. The particles, as contained in the phosphine oxido dispersion thus obtained, had a median diameter of 0.48 µm and a maximum particle diameter of 2.0 µm or less. The reducer dispersion obtained was filtered through a polypropylene filter having a pore diameter of 10.0 µm to remove foreign substances such as dust and was stocked.

<<Preparation of 5 wt. % Solution of Phthalazine Compounds>>

8 kg of modified polyvinyl alcohol MP203 of Kurare (KK) was dissolved in 174.57 kg of water, and 3.25 kg of 20 wt. % aqueous solution of sodium triisopropyl-naphthalene sulfonate and 14.28 kg of 70 wt. % aqueous solution of 6-isopropyl phthalazine were then added to prepare 5 wt. % solution of 6-isopropyl phthalazine.

<<Preparation of 20 wt. % Dispersion of Pigment>>

250 g of water was added to 64 g of C.I. Pigment Blue 60 and 6.4 g of Demol N of Kao (KK), and was sufficiently mixed to slurry. 800 g of zirconium beads having a mean diameter of 0.5 mm was poured together with the slurry into a vessel and was dispersed for 25 hrs. by a disperser (e.g., ¼ Sand Grinder Mill of Aimex (KK)) to prepare the pigment dispersion. The pigment particles, as contained in the pigment dispersion thus obtained, has a mean diameter of 0.21 µm.

The SBR latex, as refined by the ultrafiltration (UF), was obtained, as follows.

The following latexes ① and ②, as diluted ten times with distilled water, were diluted and refined to have an ion conduction of 1.5 mS/cm by using the UF-Refining Module FS03-FC-FUY03A1 (of Daisen Membrane System (KK)), and SDT-BL of Sanyo Kasei (KK) was added to 0.22 wt. %. Moreover, NaOH and $NH_4OH$ were added to $Na^+$ ions: $NH_4^+$ ions=1:2.3 (in molar ratio) to adjust the pH to 8.4. The latex concentration at this time was 40 wt. %.

SBR Latex ① (for High Tg):
Latex of -St(77)-Bu(20)-AA(3)
SBR Latex ② (for Low Tg):
Latex of -St(71)-Bu(26)-AA(3)

<<Preparation of Emulsion Layer (Photosensitive Layer) Applied Liquid>>

1.1 g of 20 wt. % aqueous dispersion of the pigment thus obtained, 103 g of fatty silver dispersion, 5 g of 20 wt. % aqueous solution of polyvinyl alcohol PVA-205 (of Kurare (KK)), 25 g of 25 wt. % reducer dispersion, 16.2 g of organic polyhalide dispersions −1, −2 and −3 at ratios of 1:8:1 (in weight ratio), 6.2 g of 10% dispersion of mercapto compounds, 106 g of latex 40 wt. %, as refined by the ultrafiltration (UF) and adjusted in the pH, and 18 ml of 5 wt. % solution of phthalazine compounds were added and mixed with 10 g of the silver halide mixed emulsion A to prepare the emulsion layer applied liquid. This liquid was fed to the coating die and applied at 70 ml/m². Here, the material ① used the latex ①, and the material ② used the latex ②.

The viscosity of the aforementioned emulsion layer applied liquid was measured to be 85 [mPa·s] at 40° C. (at No. 1 rotor of 60 rpm) by the B-type viscosity meter of Tokyo Keiki KK.

The viscosities of the applied liquid at 25° C. using the RFS fluid spectrometer made by Rheometric Far East KK were, for the shearing rates of 0.1, 1, 10, 100 and 1,000 [1/sec.], 1,500, 220, 70, 40 and 20 [mPa·s].

<<Preparation of Emulsion Side Intermediate Layer Applied Liquid>>

772 g of 10 wt. % aqueous solution of polyvinyl alcohol PVA-205 (of Kurare (KK)), 5.3 g of 20 wt. % dispersion of pigment, 226 g of 27.5 wt. % latex of methyl methacrylate/styrene/butyl acrylate/hydroxy ethyl methacrylate/acrylic acid copolymer (having a copolymerization weight ratio of 64/9/20/5/2), 2 ml of 5 wt. % aqueous solution of Aerozol OT (of American Cyanamide Co.), and 10.5 ml of 20 wt. % aqueous solution of ammonium phthalate were added to water to prepare the intermediate layer applied liquid of totally 880 g. This prepared liquid was fed at 10 ml/m² to the coating die.

The viscosity of the applied liquid was 21 [mPa·s] at 40° C. (at No. 1 rotor of 60 rpm) by the B-type viscosity meter.

<<Preparation of First Applied Layer of Emulsion Side Protecting Layer>>

64 g of inert gelatin was added to water, to which there were added 80 g of 27.5 wt. % latex of methyl methacrylate/styrene/butyl acrylate/hydroxy ethyl methacrylate/acrylic acid copolymer (having a copolymerization weight ratio of 64/9/20/5/2), 23 ml of 10 wt. % methanol solution of phthalic acid, 23 ml of 10 wt. % aqueous solution of 4-methyl phthalic acid, 28 ml of 1N sulfuric acid, 5 ml of 5 wt. % aqueous solution of Aerozol OT (of American Cyanamide Co.), 0.5 g of phenoxy ethanol, and 0.1 g of benzo isothiazolinon, to prepare the applied liquid of totally 750 g with water. This applied liquid was mixed with 26 ml of 4 wt. % of chromium alum by the static mixer just before application and was fed at 18.6 ml/m2 to the coating die.

The viscosity of the applied liquid was 17 [mPa·s] at 40° C. (at No. 1 rotor of 60 rpm) by the B-type viscosity meter.

<<Preparation of Second Applied Liquid of Emulsion Side Protecting Layer>>

80 g of inert gelatin was added to water, to which there were added 102 g of 27.5 wt. % latex of methyl methacrylate/styrene/butyl acrylate/hydroxy ethyl methacrylate/acrylic acid copolymer (having a copolymerization weight ratio of 64/9/20/5/2), 3.2 ml of 5 wt. % solution of potassium salt of N-perfluoro octyl sulfonyl-N-propyl alanine, 32 ml of 2 wt. % aqueous solution of polyethylene glycol mono (N-perfluoro octyl sulfonyl-N-propyl-2-aminoethyl) ether [ethylene oxide average polymerization 15], 23 ml of 5 wt. % solution of Aerozol OT (of American Cyanamide Co.), 4 g of fine particles (having a mean particle size of 0.7 μm) of polymethylmethacrylate, 21 g of fine particles (having a mean particle size of 6.4 μm) of polymethylmethacrylate, 1.6 g of 4-methyl phthalic acid, 4.8 g of phthalic acid, 44 ml of 1N sulfuric acid, and 10 mg of benzo isothiazolinon, to prepare the applied liquid of totally 650 g with water. This protecting layer applied liquid was mixed with 445 ml of aqueous solution including 4 wt. % of chromium alum and 0.67 wt. % of phthalic acid by the static mixer just before application and was fed at 8.3 ml/m² to the coating die.

The viscosity of the applied liquid was 9 [mPa·s] at 40° C. (at No. 1 rotor of 60 rpm) by the B-type viscosity meter.

<<Preparation of Thermal imaging material>>

To the back side of the priming support, there were simultaneously applied in an overlapping manner the antihalation layer applied liquid. The applied solid amount of the solid particle dye was 0.04 g/m², and the back side protecting layer applied liquid. The amount of gelatin applied was 1.7 g/m². These applied liquids were dried to form the antihalation back layer.

On the side opposed to the back side, there were simultaneously applied the emulsion layer (i.e., the image forming layer having an amount of 0.14 g/m² of applied silver of the silver halide and a thickness of 20 μm), the intermediate layer, the protective first layer and the protective second layer in the recited order from the primed face by the slide bead coating method, thereby to prepare a sample for the thermal imaging material.

The application rate was 160 m/min.; the gap between the leading end of the coating die and the support was 0.10 mm to 0.30 mm; and the pressure in the vacuum chamber was lower by 196 to 882 Pa than the atmospheric value. The support was cleaned with an ion wind before coated.

In the downstream chilling zone, the applied liquid was cooled with a wind of 10 to 20° C. of the dry-bulb temperature. After this, the liquid was transferred in a non-contact manner and was dried in a helical non-contact drying apparatus with a dry wind of 23° C. to 45° C. of the dry-bulb temperature and 15° C. to 21° C. of the wet-bulb temperature.

The dried liquid was controlled in moisture at 25° C. in a humidity of 40 to 60% RH, and the film face was heated to 70° C. to 90° C. After this heating, the film face was cooled to 25° C.

The degree of mat of the prepared thermal imaging material had a Beck's smoothness of 550 secs. on the side of the photosensitive layer and 130 secs. on the back side.

<<Cutting Test and Photography Test>>

The following cutting tests and the photography tests were performed on the following items (1) and (2) of the thermal imaging material ① of Tg 35° C. (using latex ①) and the thermal imaging material ② of Tg 25° C. (using latex ②) thus prepared:

Test 1: There were tested the relations between the emulsion side surface temperature and the separation of the emulsion layer (or the image forming layer) at the cutting time.

Test 2: There were tested the relations between the emulsion side surface temperature and the WS functional evaluations and the Dmin at the cutting time.

Figure 62:
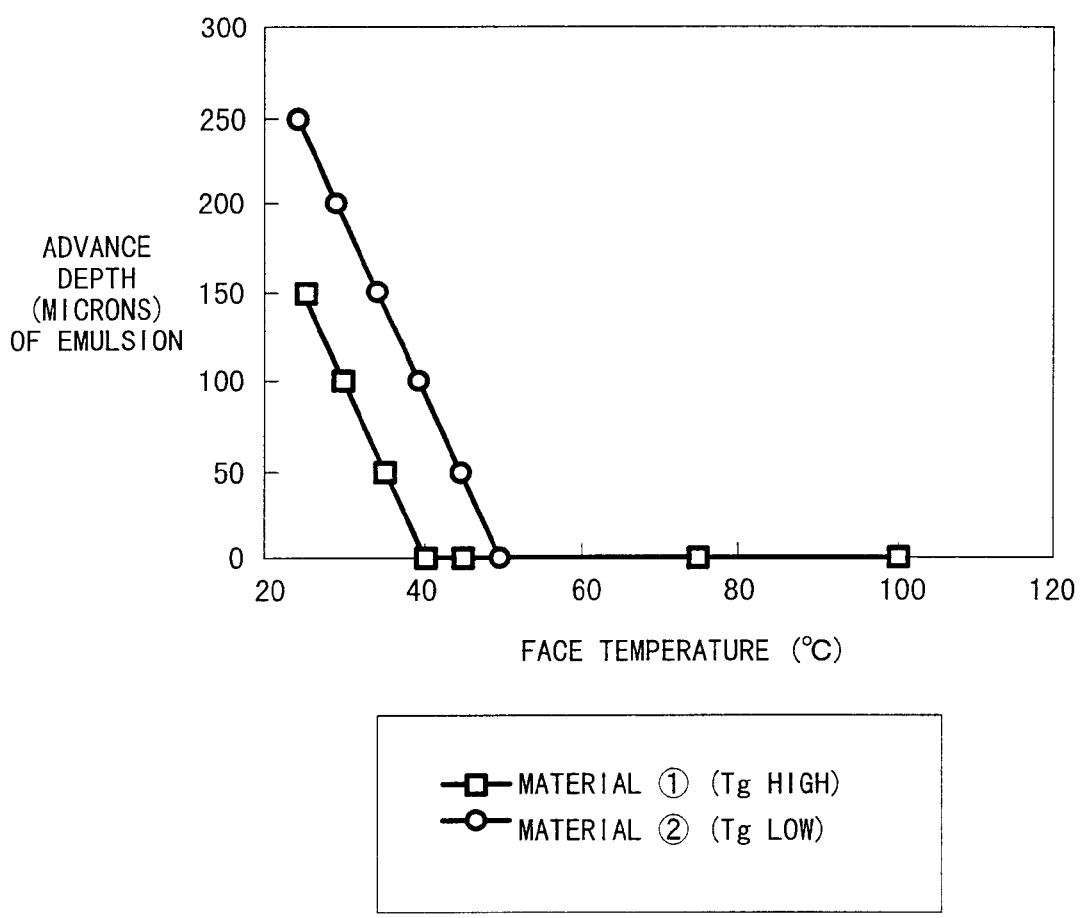
FIG. 62 is an explanatory diagram for explaining the results when the thermal imaging materials are cut by the cutting method of the invention.
Figure 63:
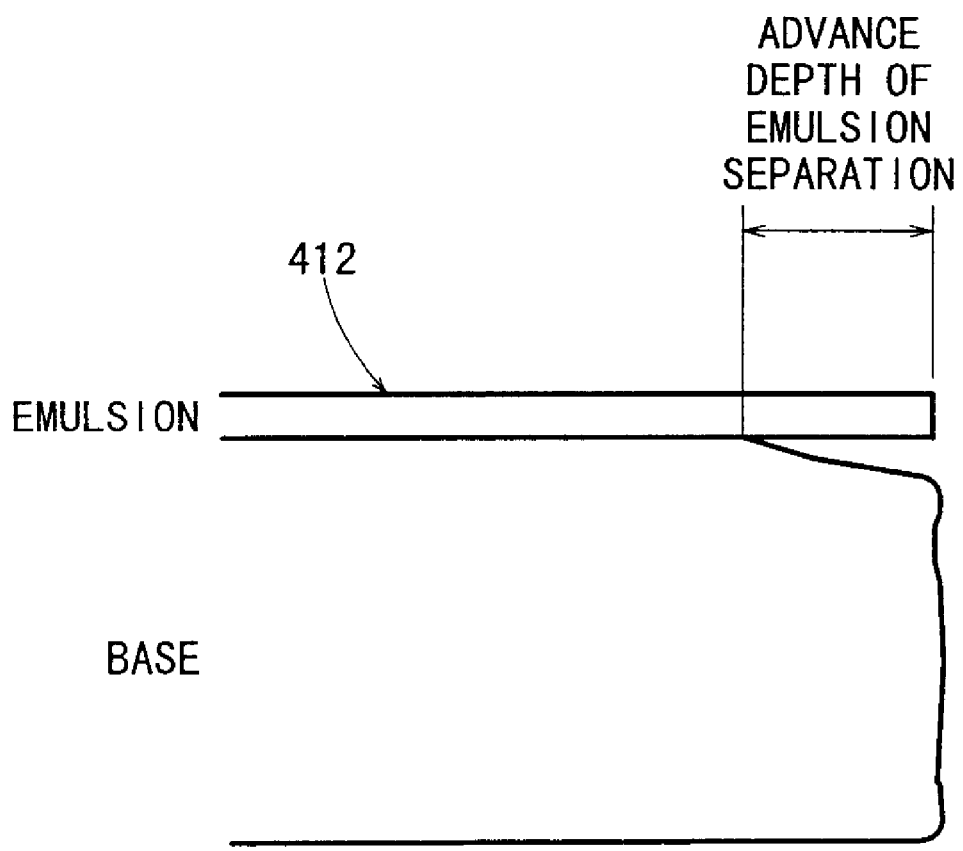
FIG. 63 is an explanatory view for explaining an emulsion separation of the thermal imaging material.

FIG. 62 plots the cutting temperature condition and the results of Test 1. The cutter unit used was of the punching die type. When the thermal imaging material was cut, the advance depth of the emulsion separation at the cut face was evaluated in relation to the cutting temperature, as plotted in FIG. 63. On the other hand, the cutting temperature was changed at the surface temperature on the emulsion side from 25° C. (or the room temperature) to 100° C. by blowing a hot wind to the thermal imaging material. These experimental cutting data were obtained for the edge angle of 90 degrees, the shear angle of 1 degree, and the edge clearance of 5%. Here, the protecting layer and the back layer were omitted from FIG. 63.

On the other hand, Table 13 enumerates the results of the relations among the cutting temperature condition, the WS functional evaluation and the Dmin of Test 2. After the heat-cutting, the photographic material was exposed/thermally imaged (at about 120° C.) by the Fuji Medical Dry Laser Imager FM-DPL (on which a semiconductor laser of 660 nm having the maximum output of 60 mW (IIIB) is loaded), and the optical density of the unexposed portion of the image obtained was metered by a density meter.

TABLE 13

| Materials | Surface Temp. (° C.) on Cut Emulsion Side | WS Functional Evaluation | Dmin | Remarks |
|---|---|---|---|---|
| ① | 10 | X | 100 | Compared |
| ① | 30 | X | 100 | Compared |
| ① | 35 | Δ | 100 | Invention |
| ① | 40 | ○ | 100 | Invention |
| ① | 100 | ○ | 102 | Invention |
| ① | 110 | ○ | 121 | Compared |
| ② | 10 | X | 100 | Compared |
| ② | 25 | Δ | 100 | Invention |
| ② | 30 | ○ | 100 | Invention |
| ② | 70 | ○ | 100 | Invention |
| ② | 100 | ○ | 104 | Invention |
| ② | 110 | ○ | 123 | Compared |

The WS functional evaluation and the Dmin evaluation were standardized by setting the Dmin of the thermal imaging material ①, as cut at the emulsion side surface temperature of 25° C., to 100, and the WS functional evaluation was made at three stages of "○" at the level having no problem on the imaging, "Δ" at the level having little problem on the imaging, and "X" at the level having a trouble on the imaging.

Here will be described the results of Test 1.

At the instant of the emulsion side surface temperature of 25° C., as seen from the results of FIG. 62, the advance depth of separation is the smaller for the thermal imaging material ② having the lower Tg. In any of the materials, however, the advance depth is drastically reduced as the surface temperature is raised by the heating, so that the thermal imaging material ① has no separation at about 50° C. whereas the thermal imaging material ② has no separation at about 40° C.

The degrees of the effects are similar for both the thermal imaging material ① and the thermal imaging material ②, but the thermal imaging material ② has a separation of 0 m by the less heating because the advance depth at 25° C. is the smaller.

By thus setting the surface temperature on the emulsion side at the cutting time to the value Tg or higher, the emulsion separation is drastically reduced or absolutely eliminated.

Here will be described the results of Test 2.

As seen from Table 13, in the case of the thermal imaging material ① having the Tg at 35° C., when the cutting was made at a Tg or lower temperature as in the Comparisons where the emulsion side surface temperatures at the cutting time were at 10° C. and 30° C., the WS functional evaluation stage was "X" to trouble the imaging. In the Comparison where the emulsion side surface temperature at the cutting time was at 110° C., the WS functional evaluation stage was "○" and satisfactory, but the Dmin was at 121 to deteriorate the photographic characteristics.

In the Examples of 35° C., 40° C. and 100° C. within the cutting condition temperature range of the invention, on the other hand, excellent results were obtained at the WS functional evaluation and the Dmin.

In the case of the thermal imaging material ① of the Tg of 35 degrees, too, the Examples within the cutting condition temperature range of the invention were excellent for both the WS functional evaluation and the Dmin.

The cutting method of the thermal imaging material of the invention can be applied without any problem to: the commercially available thermal imaging materials DI-AL and CR-AL of Fuji Shashin Film (KK); the thermal imaging materials SD-P and DR-P of Konika (KK); or the thermal imaging materials Dry View DVB and Dry View DVC of Kodak (KK). Here, the DI-AL and CR-AL were effective in the heat-cutting at 30° C., and the SD-P, DR-P, DVB and DVC were found effective in the heat-cutting at 75° C.

In the sheet material deformation correcting method and apparatus according to the invention, the recording carrier is subjected to the heating treatment at a constant temperature exceeding the glass transition temperature of the support for a constant time period, so that the recording carrier can be smoothly decurled without being influenced by the change in its transfer velocity while causing the drop in the characteristics of the recording layer. Moreover, the recording carrier after heated is cooled to the glass transition temperature or lower while keeping a predetermined shape, so that the recording carrier is not curled again to improve the tranferability and stackability effectively.

In the invention, on the basis of the sheet material information of the rolled sheet material, the heating temperature of the heating roller is preset so that the lapping time for the rolled sheet material to overlap on the circumference of the heating roller is determined according to the curl of the rolled sheet material while the heating roller being kept at the preset heating temperature. This makes it unnecessary to change the heating temperature of the heating roller which is difficult to control in the aspects of responsiveness and precision. By changing the heating time (or the lapping time) highly responsively and precisely according to the curl of the rolled sheet material, moreover, this rolled sheet material can be efficiently decurled. Since the heating roller is kept at the constant temperature, moreover, the rolled sheet material is not degraded even when excessively heated, so that the decurl treatments of the various rolled sheet materials can be efficiently performed at the simple steps and with the simple construction.

In the invention, moreover, on the basis of the kind of the recording medium, the heating conditions including the heating temperature and time for the heating medium are preset so that the recording medium is heated along the heating conditions according to itself to be decurled. Even when the recording layer of the recording medium has a different heat resistance, therefore, no problem arises in the quality, but the recording media of different kinds can be decurled highly efficiently and precisely.

In the invention, still moreover, the deformed position of the polymer sheet material is calculated on the basis of the deformed position information and the remainder information of the sheet material, and the polymer sheet material is subjected to the heating treatment on the basis of the preset deformation correcting heating conditions when the calculated deformed position reaches the deformation correcting position. Therefore, the deformed position of the polymer sheet material is reliably detected, and the desired heating treatment is smoothly executed on that deformed position, so that the polymer sheet material can be flattened in its entirety. As a result, the production yield can be effectively improved without dumping the deformed portion of the polymer sheet material, and the various polymer sheet materials can be treated under the optimum heating conditions, to prevent the quality drop such as the elongation reliably.

In the invention, the length for the sheet material to contact with the heating means when the transfer velocity of the sheet material changes is changed to control the time period for the sheet material to contact with the heating means to a constant, so that the sheet material can be decurled efficiently and precisely while preventing the fluctuation in the heating time period.

In the invention, moreover, the thermal imaging material can be cut without separating the image forming layer or deteriorating the photographic performance, independently of the cutting blade shape or the adjusting conditions of the paired edges.

What is claimed is:

1. A sheet material deformation correcting method for decurling a recording carrier having a recording layer on a support, comprising the steps of:

conveying said recording carrier from a roll film to a heating assembly;

by said heating assembly, subjecting said recording carrier to a heating treatment at a constant temperature exceeding the glass transition temperature of said support and for a constant time period;

forwarding said recording carrier to a cooling assembly; and by said cooling assembly, cooling said recording carrier after the heating treatment to a temperature equal to or lower than said glass transition temperature while keeping said recording carrier in a predetermined shape;

wherein said recording carrier is not conveyed back from said heating assembly to said roll film.

2. A sheet material deformation correcting method according to claim 1, wherein said recording carrier is lapped on the circumference of a heating roller which is heated to a temperature exceeding the glass transition temperature, and wherein the heating conditions of said recording carrier are adjusted to be constant by changing the lapping angle of said recording carrier with respect to the circumference of said heating roller, on the basis of the transfer velocity of said recording carrier.

3. A sheet material deformation correcting method according to claim 2, wherein said heating treatment is performed by the heat transfer of said heating roller at a roller surface temperature exceeding said glass transition temperature by 10 to 30° C. and for a heating time of 0.1 to 3 secs.

4. A sheet material deformation correcting method according to claim 3, wherein in synchronism with the change in the lapping angle of said recording carrier with respect to the circumference of said heating roller, the path length of said recording carrier is adjusted upstream of said heating roller.

5. A sheet material deformation correcting method according to claim 4, wherein the lapping angle of said recording carrier to the circumference of said heating roller and the path length of said recording carrier are adjusted by controls based on spline curve data.

6. A sheet material deformation correcting method according to claim 1, wherein when said recording carrier has said recording layer only on one side of said support, the heating treatment is performed from the other side of said support.

7. A sheet material deformation correcting method according to claim 1, wherein said recording carrier is made of a photosensitive material having at least a polymer material as its support.

8. A sheet material deformation correcting method for decurl a rolled sheet material by lapping said rolled sheet material on the circumference of a heating roller, comprising the steps of:

presetting a heating temperature of said heating roller on the basis of the sheet material information including the quality of said rolled sheet material;

detecting curl amount of said rolled sheet material;

setting a lapping time, for which said rolled sheet material is lapped on the circumference of said heating roller, in a manner to correspond to said detected curl amount; and lapping said rolled sheet material on the circumference of said heating roller for said set lapping time, while said heating roller being kept at said heating temperature.

9. A sheet material deformation correcting method according to claim 8, wherein the curl amount of said rolled sheet material is detected in terms of the roll diameter of said rolled sheet material.

10. A sheet material deformation correcting method according to claim 8, wherein said lapping time is set by controlling the lapping angle of a swing roller for lapping said rolled sheet material on the circumference of said heating roller.

11. A sheet material deformation correcting method for decurl a recording medium having a polymer support, comprising the steps of:

presetting heating conditions including a heating temperature and a heating time of said recording medium, on the basis of the kind of said recording medium; and subjecting said recording medium to a heating treatment along said heating conditions preset according to said kind, when the kind of said recording medium to be decurled is inputted.

12. A sheet material deformation correcting method according to claim 11, wherein said recording medium is subjected to the heating treatment by bringing said recording medium into contact with heating means, and wherein the temperature of said heating means is controlled as said heating temperature and the time of said heating treatment of said recording medium is controlled as said heating time.

13. A sheet material deformation correcting method according to claim 11, wherein said heating means includes a heating roller for lapping said recording medium on the circumference of said heating roller, and wherein on the basis of said heating time and the transfer velocity of said recording medium, the lapping angle by a swing roller for lapping said recording medium on the circumference of said heating roller is controlled.

14. A sheet material deformation correcting method for correcting the deformation of a polymer sheet material formed in a roll, to flatten said polymer sheet material, comprising the steps of:

setting deformation correcting heating conditions including the heating temperature and the heating time of said polymer sheet material, on the basis of the kind of said polymer sheet material;

calculating the deformed position of said polymer sheet material on the basis of the deformation position information and the remainder information of said polymer sheet material; and subjecting said polymer sheet material to a heating treatment on the basis of said deformation correcting heating conditions when said deformed position calculated reaches the deformation correcting position.

15. A sheet material deformation correcting method according to claim 14, wherein there is provided a heating roller for lapping said polymer sheet material on its circumference, and wherein when said deformed position calculated reaches said heating roller, the lapping angle for lapping said polymer sheet material on the circumference of said heating roller through a swing roller is controlled.

16. A sheet material deformation correcting method according to claim 15, wherein the lapping angle by said swing roller is calculated on the basis of the line velocity of said polymer sheet material and said set heating time.

17. A sheet material deformation correcting method for decurl a sheet material by bringing said sheet material into contact with heating means kept at a constant temperature, comprising the steps of:

bringing said sheet material into contact with said heating means over a predetermined length when said sheet material is moved at a predetermined transfer velocity; and controlling the time period for said sheet material to contact with said heating means, to a constant, when the transfer velocity of said sheet material changes, by changing the length for said sheet material to contact with said heating means.

18. A sheet material deformation correcting method according to claim 17, further comprising the steps of:

accelerating said sheet material to a predetermined transfer velocity, before the start of the transfer of said sheet material, while said sheet material being in contact over a predetermined length with said heating means; and changing the length for said sheet material to contact with said heating means.

19. A sheet material deformation correcting method according to claim 17, wherein after the start of the transfer of said sheet material, said sheet material is accelerated to a predetermined transfer velocity, and wherein the changing rates of the length, over which said sheet material contacts with said heating means, are switched and controlled to at least two stages.

20. A sheet material deformation correcting method according to claim 17, further comprising the step of:

reducing the length, over which said sheet material contacts with said heating means, along a predetermined changing rate when said sheet material is decelerated to a preset transfer velocity or lower.

21. A sheet material deformation correcting method according to claim 20, wherein while the transfer velocity of said sheet material is decelerated, the changing rates of the length, over which said sheet material contacts with said heating means, are switched and controlled to at least two stages.

22. A sheet material deformation correcting method according to claim 17, wherein said heating means includes a heating roller for lapping said sheet material on its circumference, and wherein the length over which said sheet material contacts with the circumference of said heating roller is changed by controlling the lapping angle at which said sheet material is lapped on the circumference of said heating roller through a swing roller.

23. A sheet material deformation correcting apparatus for decurling a recording carrier having a recording layer on its support, comprising:

conveying means for conveying said recording carrier from a roll film;

heating means for receiving said recording carrier conveyed from the roll film and for subjecting said recording carrier to a heating treatment at a constant temperature exceeding the glass transition temperature of said support and for a constant time period; and cooling means for cooling said recording carrier, after heated, to the glass transition temperature or lower, while keeping said recording carrier in a predetermined shape;

wherein said conveying means are adapted not to convey said recording carrier from said heating means back to said roll film.

24. A sheet material deformation correcting apparatus according to claim 23, wherein said heating means includes:

a heating roller to be heated to a temperature exceeding said glass transition temperature; and holding rollers for lapping said recording carrier on the circumference of said heating roller and for changing the lapping angle of said recording carrier with respect to the circumference of said heating roller on the basis of the transfer velocity of said recording carrier.

25. A sheet material deformation correcting apparatus according to claim 24, further comprising:

holding roller displacing means for turning or moving back and forth said holding rollers with respect to said heating roller so as to change the lapping angle of said recording carrier.

26. A sheet material deformation correcting apparatus according to claim 24, further comprising:

heating roller displacing means for moving back and forth said heating roller with respect to said holding rollers so as to change the lapping angle of said recording carrier.

27. A sheet material deformation correcting apparatus according to claim 24, wherein said heating roller includes:

first and second heating rollers adapted to be heated to a temperature exceeding said glass transition temperature and spaced at a predetermined distance from each other, for lapping said recording carrier in the shape of letter S; and drive means for turning said first and second heating rollers integrally on the middle point of the straight line joining the centers of said first and second heating rollers.

28. A sheet material deformation correcting apparatus according to claim 23, further comprising:

path length adjusting means for adjusting the path length of said recording carrier upstream of said heating roller in synchronism with the change in the lapping angle of said recording carrier with respect to the circumference of said heating roller.

29. A sheet material deformation correcting apparatus according to claim 28, further comprising:

controllers for adjusting the lapping angle of said recording carrier with respect to the circumference of said heating roller and the path length of said recording carrier, by the control based on the spline curve data.

30. A sheet material deformation correcting apparatus according to claim 23,
wherein said:recording carrier is made of a photosensitive material having at least a polymer material as its support.

31. A sheet material deformation correcting apparatus for decurl a rolled sheet material by lapping said rolled sheet material on the circumference of a heating roller, comprising:
heating temperature setting means for setting the heating temperature of said heating roller in advance on the basis of sheet material information including the material of said rolled sheet material;
curl amount detecting means for detecting curl amount of said rolled sheet material;
heating time setting means for setting the lapping time for which said rolled sheet material is lapped on the circumference of said heating roller, in accordance with said detected curl amount; and
lapping means for lapping said rolled sheet material on the circumference of said heating roller for said set lapping time while said heating roller being kept at said heating temperature.

32. A sheet material deformation correcting apparatus according to claim 31, further comprising:
roll diameter detecting means for detecting the curl amount of said rolled sheet material from the roll diameter of said rolled sheet material.

33. A sheet material deformation correcting apparatus according to claim 31,
wherein said lapping means includes:
a swing roller for lapping said rolled sheet material on the circumference of said heating roller; and
swing roller drive means for changing the lapping angle of said rolled sheet material with respect to the circumference of said heating roller.

34. A sheet material deformation correcting apparatus according to claim 33,
wherein the rocking axis of said swing roller is aligned with the rotating axis of said heating roller.

35. A sheet material deformation correcting apparatus for decurl a recording medium having a polymer support, comprising:
heating means for subjecting a recording medium to a heating treatment by contacting said sheet material with said heating means;
heating condition determining means for setting heating conditions including the heating temperature and the heating time of said recording medium in advance on the basis of the kind of said recording medium;
heating temperature control means for controlling the temperature of said heating means as said heating temperature; and
heating time control means for controlling the time of said heating treatment as said heating time.

36. A sheet material deformation correcting apparatus according to claim 35,
wherein said heating means includes:
a heating roller for lapping said recording medium on its circumference;
a swing roller for lapping said recording medium on the circumference of said heating roller; and
swing roller drive means for changing the lapping angle of said recording medium with respect to the circumference of said heating roller, on the basis of said heating time and the transfer velocity of said recording medium.

37. A sheet material deformation correcting apparatus according to claim 36,
wherein the rocking axis of said swing roller is aligned with the rotating axis of said heating roller.

38. A sheet material deformation correcting apparatus for correcting the.deformation of a rolled polymer sheet material to flatten said polymer sheet material, comprising:
heating means for subjecting said polymer sheet material to a heating treatment by contacting said polymer sheet material with said heating means;
heating condition determining means for setting deformation correcting heating conditions including the heating temperature and the heating time of said polymer sheet material, on the basis of the kind of said polymer sheet material; and
deformed position operating means for calculating the deformed position of said polymer sheet material on the basis of the deformed position information and the remainder information of said polymer sheet material.

39. A sheet material deformation correcting apparatus according to claim 38,
wherein said heating means includes:
a heating roller for-lapping said polymer sheet material on its circumference;
a swing roller for lapping said polymer sheet material on the circumference of said heating roller; and
swing roller drive means for changing the lapping angle of said polymer sheet material with respect to the circumference of said heating roller by said swing roller, when said calculated deformed position reaches said heating roller.

40. A sheet material deformation correcting apparatus according to claim 39, further comprising:
swing roller position control means for calculating the lapping angle by said swing roller, on the basis of the line velocity of said polymer sheet material and said set heating time.

41. A sheet material deformation correcting apparatus for decurl a sheet material by bringing said sheet material into contact with heating means kept at a constant temperature, comprising:
line velocity detecting means for detecting the transfer velocity of said sheet material;
support means for bringing said sheet material into contact over a predetermined length with said heating means;
position detecting means for detecting the position of said support means; and
control means for driving/controlling said support means in accordance with the change in the transfer velocity of said sheet material, when the transfer velocity of said sheet material changes, so that the length of said sheet material to contact with said heating means may be changed to control the time for said sheet material to contact with said heating means, to a constant value.

42. A sheet material deformation correcting apparatus according to claim 41,
wherein said heating means includes a rotatable heating roller, and
wherein said support means includes a swing roller for lapping said sheet material on the circumference of said heating roller and for changing the lapping angle of said sheet material with respect to the circumference of said heating roller.

43. A sheet material deformation correcting apparatus according to claim 42, wherein the rocking axis of said swing roller is aligned with the rotating axis of said heating roller.

44. A sheet material deformation correcting method for decurling a recording carrier having a recording layer on a support, comprising the steps of:

subjecting said recording carrier to a heating treatment at a constant temperature exceeding the glass transition temperature of said support and for a constant time period; and cooling said recording carrier after the heating treatment, to said glass transition temperature or lower while keeping said recording carrier in a predetermined shape;

wherein said recording carrier is lapped on the circumference of a heating roller, which is heated to a temperature exceeding the glass transition temperature; and wherein the heating conditions of said recording carrier are adjusted to be constant by changing the lapping angle of said recording carrier with respect to the circumference of said heating roller, on the basis of the transfer velocity of said recording carrier.

45. A sheet material deformation correcting apparatus for decurling a recording carrier having a recording layer on its support, comprising:

heating means for subjecting said recording carrier to a heating treatment at a constant temperature exceeding the glass transition temperature of said support and for a constant time period; and cooling means for cooling said recording carrier, after heated, to the glass transition temperature or lower, while keeping said recording carrier in a predetermined shape;

wherein said heating means comprises:
a heating roller to be heated to a temperature exceeding said glass transition temperature; and holding rollers for lapping said recording carrier on the circumference of said heating roller and for changing the lapping angle of said recording carrier with respect to the circumference of said heating roller on the basis of the transfer velocity of said recording carrier.

46. A sheet material deformation correcting apparatus for decurling a recording carrier having a recording layer on its support, comprising:

heating means for subjecting said recording carrier to a heating treatment at a constant temperature exceeding the glass transition temperature of said support and for a constant time period;

cooling means for cooling said recording carrier, after heated, to the glass transition temperature or lower, while keeping said recording carrier in a predetermined shape; and path length adjusting means for adjusting the path length of said recording carrier upstream of said heating roller in synchronism with the change in the lapping angle of said recording carrier with respect to the circumference of said heating roller.

47. A sheet material deformation correcting apparatus for decurling a recording carrier having a recording layer on its support, comprising:

heating means for subjecting said recording carrier to a heating treatment at a constant temperature exceeding the glass transition temperature of said support and for a constant time period;

cooling means for cooling said recording carrier, after heated, to the glass transition temperature or lower, while keeping said recording carrier in a predetermined shape; and controllers for adjusting the lapping angle of said recording carrier with respect to the circumference of said heating means and a path length of said recording carrier, wherein control of the controllers is based on spline curve data.

* * * * *

UNITED STATES PATENT AND TRADEMARK OFFICE
CERTIFICATE OF CORRECTION

PATENT NO.     : 6,613,253 B1
DATED          : September 2, 2003
INVENTOR(S)    : Masami Nakagame et al.

It is certified that error appears in the above-identified patent and that said Letters Patent is hereby corrected as shown below:

<u>Title page,</u>
Item [75], Inventors, replace the names listed with the following names:
-- Masami NAKAGAME, Hiroyuki NISHIDA, Seiji KANADA, Keisuke ENDO, Yoshihisa NEGISHI, Takayoshi OYAMADA, Takayoshi NAKASEKO --

Signed and Sealed this

Thirteenth Day of April, 2004

JON W. DUDAS
*Acting Director of the United States Patent and Trademark Office*